US012812632B2

(12) United States Patent
Wang et al.

(10) Patent No.: US 12,812,632 B2
(45) Date of Patent: Nov. 24, 2026

(54) SYSTEMS AND METHODS OF POWER HEADROOM REPORTING

(71) Applicant: Intel Products IP LLC, Santa Clara, CA (US)

(72) Inventors: Yi Wang, Beijing (CN); Toufiqul Islam, Santa Clara, CA (US); Sergey Panteleev, Maynooth (IE); Debdeep Chatterjee, San Jose, CA (US); Salvatore Talarico, Los Gatos, CA (US); Yingyang Li, Beijing (CN)

(73) Assignee: Intel Products IP LLC, Santa Clara, CA (US)

( * ) Notice: Subject to any disclaimer, the term of this patent is extended or adjusted under 35 U.S.C. 154(b) by 271 days.

(21) Appl. No.: 18/288,662

(22) PCT Filed: Nov. 18, 2022

(86) PCT No.: PCT/US2022/050408
§ 371 (c)(1),
(2) Date: Oct. 27, 2023

(87) PCT Pub. No.: WO2023/129299
PCT Pub. Date: Jul. 6, 2023

(65) Prior Publication Data
US 2024/0215018 A1 Jun. 27, 2024

Related U.S. Application Data

(60) Provisional application No. 63/297,641, filed on Jan. 7, 2022, provisional application No. 63/295,248, filed
(Continued)

(51) Int. Cl.
*H04W 72/1268* (2023.01)
*H04B 7/06* (2006.01)
(Continued)

(52) U.S. Cl.
CPC ...... *H04W 72/1268* (2013.01); *H04B 7/0626* (2013.01); *H04L 1/1812* (2013.01); *H04W 72/21* (2023.01); *H04W 72/566* (2023.01)

(58) Field of Classification Search
CPC ............. H04W 72/1268; H04W 72/21; H04W 72/566; H04W 52/365; H04W 72/23;
(Continued)

(56) References Cited

U.S. PATENT DOCUMENTS

2022/0132537 A1* 4/2022 Wang .................... H04L 1/0061
2022/0225360 A1* 7/2022 Yi ......................... H04W 72/21
(Continued)

FOREIGN PATENT DOCUMENTS

WO WO-2023129299 A1 7/2023

OTHER PUBLICATIONS

"International Application Serial No. PCT/US2022/050408, International Search Report mailed Mar. 21, 2023", 4 pgs.
(Continued)

*Primary Examiner* — Shah M Rahman
(74) *Attorney, Agent, or Firm* — Schwegman Lundberg & Woessner, P.A.

(57) ABSTRACT

An apparatus and system of supporting simultaneous physical uplink control channel (PUCCH) and physical uplink shared channel (PUSCH) transmission are described. A user equipment (UE) that supports service types with different priority levels is configured by a 5th generation NodeB (gNB) to multiplex transmissions with different priorities on different serving cells in different bands. The UE multiplexes and prioritizes high priority (HP) and low priority (LP) uplink transmissions with and without simultaneous PUCCH and PUSCH transmissions based on repetition and scheduling request (SR).

20 Claims, 49 Drawing Sheets

Related U.S. Application Data on Dec. 30, 2021, provisional application No. 63/295,245, filed on Dec. 30, 2021.

(51) Int. Cl.

| | |
|---|---|
| ***H04L 1/1812*** | (2023.01) |
| ***H04W 72/21*** | (2023.01) |
| ***H04W 72/566*** | (2023.01) |

(58) Field of Classification Search

CPC .. H04W 72/232; H04W 72/53; H04B 7/0626; H04L 1/1812; H04L 1/1664; H04L 1/1671; H04L 1/1854; H04L 1/1858

See application file for complete search history.

(56) References Cited

U.S. PATENT DOCUMENTS

| | | | | |
|---|---|---|---|---|
| 2023/0008664 | A1* | 1/2023 | Matsumura | H04W 72/21 |
| 2023/0087223 | A1* | 3/2023 | Jang | H04L 1/1896<br>370/329 |
| 2023/0189273 | A1* | 6/2023 | Fu | H04L 5/0044<br>370/329 |
| 2023/0224133 | A1* | 7/2023 | Yang | H04L 5/0058<br>370/329 |
| 2023/0284227 | A1* | 9/2023 | Choi | H04L 1/1861<br>370/329 |
| 2023/0291451 | A1* | 9/2023 | Su | H04B 7/0626 |
| 2023/0292320 | A1* | 9/2023 | Yang | H04L 1/1812 |
| 2023/0344570 | A1* | 10/2023 | Jung | H04L 5/0055 |
| 2023/0354313 | A1* | 11/2023 | Yin | H04L 1/1671 |
| 2023/0379962 | A1* | 11/2023 | Andersson | H04W 72/02 |
| 2024/0048319 | A1* | 2/2024 | Yang | H04W 72/21 |
| 2024/0089970 | A1* | 3/2024 | Jung | H04W 72/21 |
| 2024/0146466 | A1* | 5/2024 | Yin | H04L 1/1614 |
| 2024/0306154 | A1* | 9/2024 | Wang | H04L 1/0026 |
| 2024/0373428 | A1* | 11/2024 | Yin | H04W 72/569 |
| 2024/0389097 | A1* | 11/2024 | Yang | H04W 72/04 |
| 2025/0089085 | A1* | 3/2025 | Yin | H04L 1/1864 |

OTHER PUBLICATIONS

"International Application Serial No. PCT/US2022/050408, Written Opinion mailed Mar. 12, 2023", 4 pgs.

Apple Inc., "On Multi-TRP Reliability Enhancement", R1-2110014, 3GPP RAN WG1 Meeting #106b-e, (Jan. 2, 2021), 1-18.

CATT, "Intra-UE multiplexing and prioritization", R1-2111250, 3GPP RAN WG1 Meeting #107-e, (Nov. 6, 2021).

Nokia, et al., "Summary #1 of Multi-TRP PUCCH and PUSCH Enhancements", Moderator, RI-2112583, 3GPP RAN WG1 Meeting #107-e, (Nov. 15, 2021), 1-43.

Qualcomm Incorporated, "Harq-Ack enhancement for IOT and URLLC", R1-2112209, 3GPP RAN WG1 Meeting #107-e, (Nov. 6, 2021), 1-31.

Qualcomm Incorporated, "Intra-UE multiplexing and prioritization for IOT and URLLC", R1-2112211, 3GPP RAN WG1 Meeting #107-e, (Nov. 6, 2021), 1-25.

"International Application Serial No. PCT US2022 050408, International Preliminary Report on Patentability mailed Jul. 11, 2024", 6 pgs.

* cited by examiner

SYSTEMS AND METHODS OF POWER HEADROOM REPORTING

PRIORITY CLAIM

This application is a U.S. National Stage Filing under 35 U.S.C. 371 from International Application No. PCT/US2022/050408, filed Nov. 18, 2022 and published in English as WO 2023/129299 on Jul. 6, 2023, which claims the benefit of priority to U.S. Provisional Patent Application Ser. No. 63/295,245, filed Dec. 30, 2021, U.S. Provisional Patent Application Ser. No. 63/295,248, filed Dec. 30, 2021, and U.S. Provisional Patent Application Ser. No. 63/297,641, filed Jan. 7, 2022, each of which is incorporated herein by reference in its entirety.

TECHNICAL FIELD

Embodiments pertain to next generation (NG) wireless networks. In particular, some embodiments relate to power headroom report (PHR) transmission. In addition, some embodiments relate to intra-user equipment (UE) prioritization or multiplexing for uplink (UL) channels.

BACKGROUND

The use and complexity of NG or NR wireless systems, which include 5G networks and are starting to include sixth generation (6G) networks among others, has increased due to both an increase in the types of UEs using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology, including complexities related to multiplexed transmissions.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
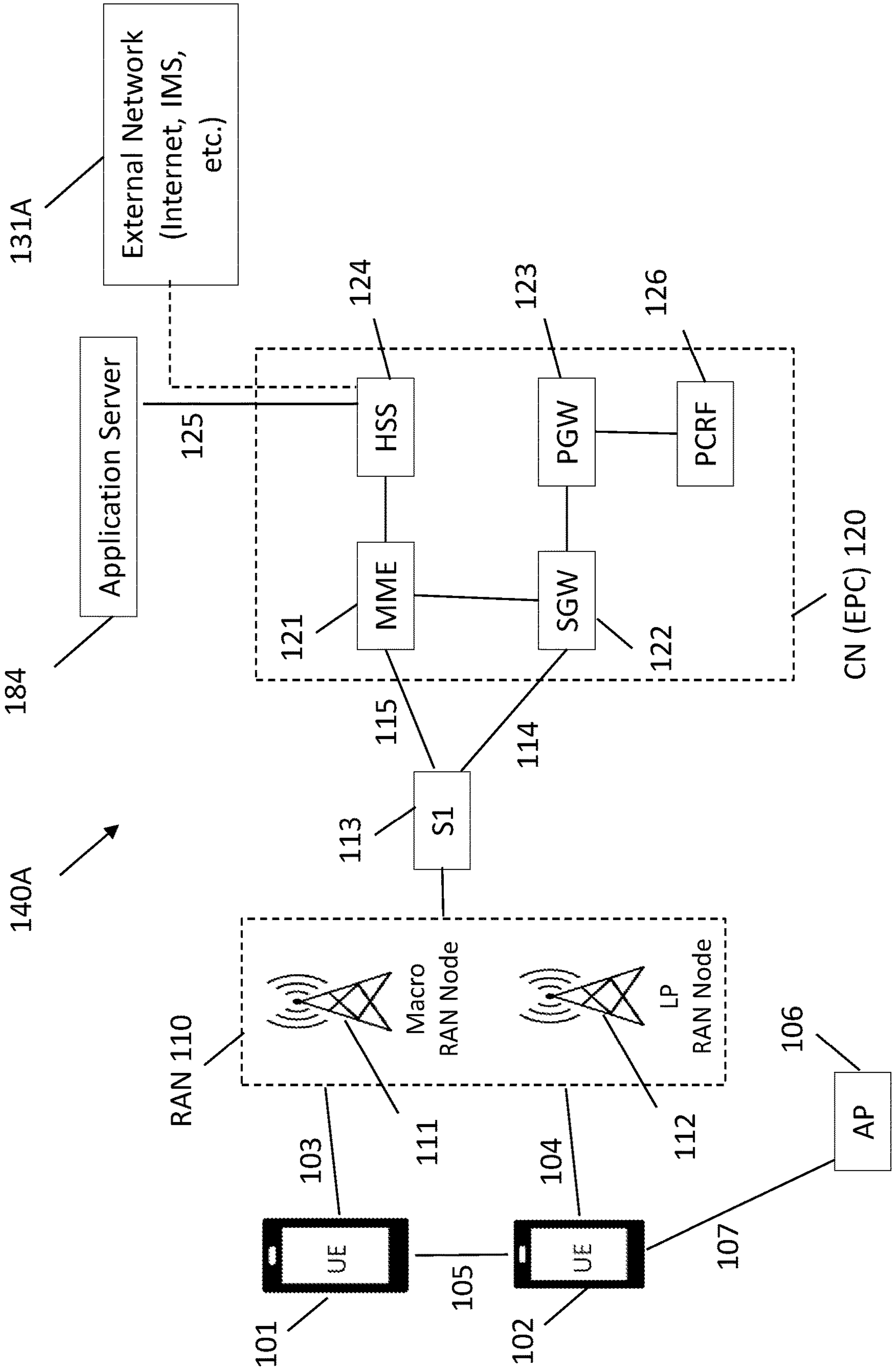
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G and later generation functions. Accordingly, although 5G will be referred to, it is to be understood that this is to extend as able to 6G (and later) structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHZ, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The RAN 110 may contain one or more gNBs, one or more of which may be implemented by multiple units. Note that although gNBs may be referred to herein, the same aspects may apply to other generation NodeBs, such as $6^{th}$ generation NodeBs—and thus may be alternately referred to as next generation NodeB (xNB).

Each of the gNBs may implement protocol entities in the 3GPP protocol stack, in which the layers are considered to be ordered, from lowest to highest, in the order Physical (PHY), Medium Access Control (MAC), Radio Link Control (RLC), Packet Data Convergence Control (PDCP), and Radio Resource Control (RRC)/Service Data Adaptation Protocol (SDAP) (for the control plane/user plane). The protocol layers in each gNB may be distributed in different units—a Central Unit (CU), at least one Distributed Unit (DU), and a Remote Radio Head (RRH). The CU may provide functionalities such as the control the transfer of user data, and effect mobility control, radio access network sharing, positioning, and session management, except those functions allocated exclusively to the DU.

The higher protocol layers (PDCP and RRC for the control plane/PDCP and SDAP for the user plane) may be implemented in the CU, and the RLC and MAC layers may be implemented in the DU. The PHY layer may be split, with the higher PHY layer also implemented in the DU, while the lower PHY layer is implemented in the RRH. The CU, DU and RRH may be implemented by different manufacturers, but may nevertheless be connected by the appropriate interfaces therebetween. The CU may be connected with multiple DUs.

The interfaces within the gNB include the E1 and front-haul (F) F1 interface. The E1 interface may be between a CU control plane (gNB-CU-CP) and the CU user plane (gNB-CU-UP) and thus may support the exchange of signalling information between the control plane and the user plane through E1AP service. The E1 interface may separate Radio Network Layer and Transport Network Layer and enable exchange of UE associated information and non-UE associated information. The E1AP services may be non UE-associated services that are related to the entire E1 interface instance between the gNB-CU-CP and gNB-CU-UP using a non UE-associated signalling connection and UE-associated services that are related to a single UE and are associated with a UE-associated signalling connection that is maintained for the UE.

The F1 interface may be disposed between the CU and the DU. The CU may control the operation of the DU over the F1 interface. As the signalling in the gNB is split into control plane and user plane signalling, the F1 interface may be split into the F1-C interface for control plane signalling between the gNB-DU and the gNB-CU-CP, and the F1-U interface for user plane signalling between the gNB-DU and the gNB-CU-UP, which support control plane and user plane separation. The F1 interface may separate the Radio Network and Transport Network Layers and enable exchange of UE associated information and non-UE associated information. In addition, an F2 interface may be between the lower and upper parts of the NR PHY layer. The F2 interface may also be separated into F2-C and F2-U interfaces based on control plane and user plane functionalities.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission-reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signalling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VOIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a core network (CN) 120. The NG-RAN 110 can include a plurality of nodes, such as gNBs and NG-eNBs. The CN 120 (e.g., a 5G core network (5GC)) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
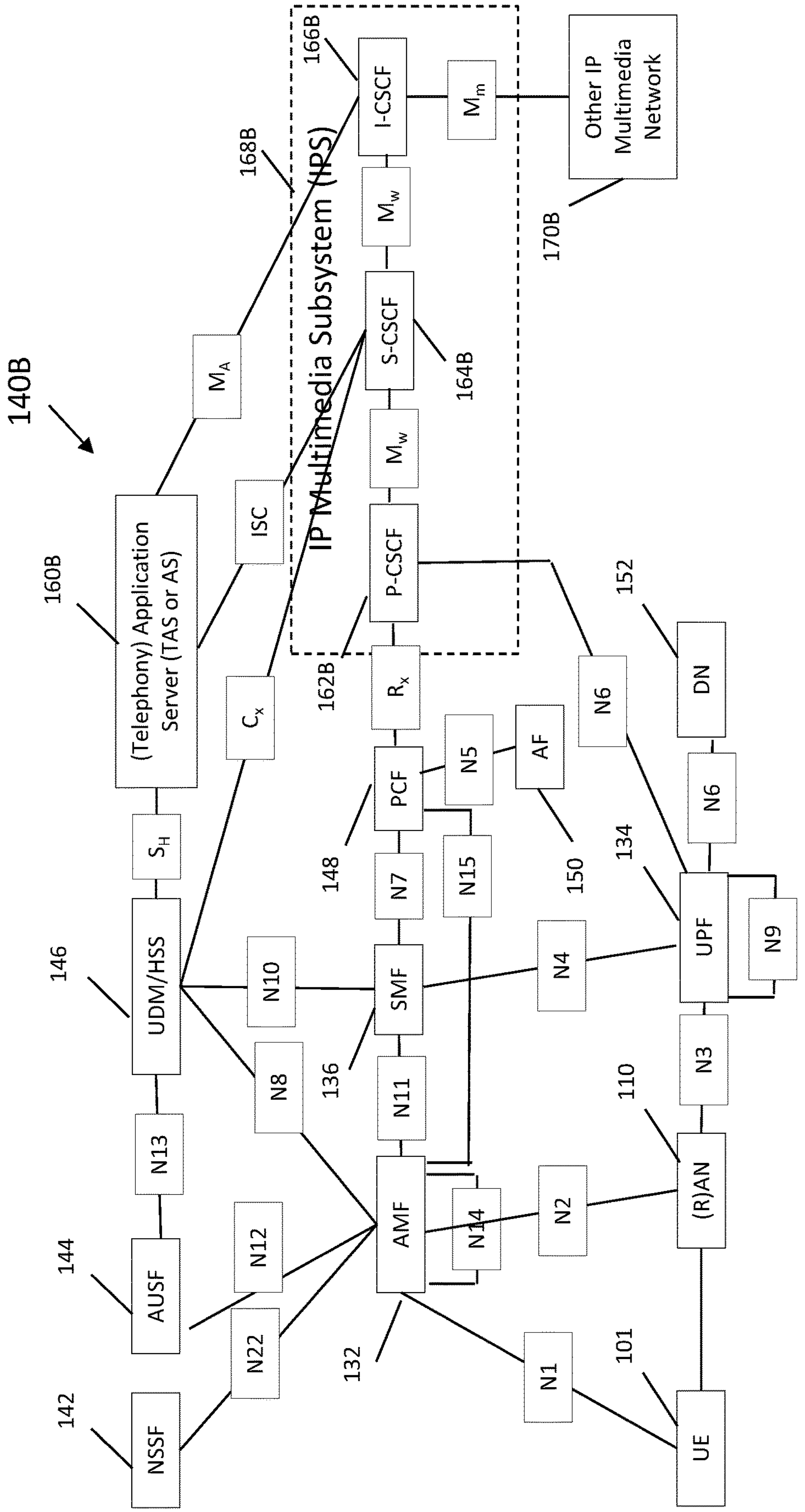
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other CN network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170B, e.g. an IMS operated by a different network operator.

In some aspects, the UDM/HSS 146 can be coupled to an application server (AS) 160B, which can include a telephony application server (TAS) or another application server. The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
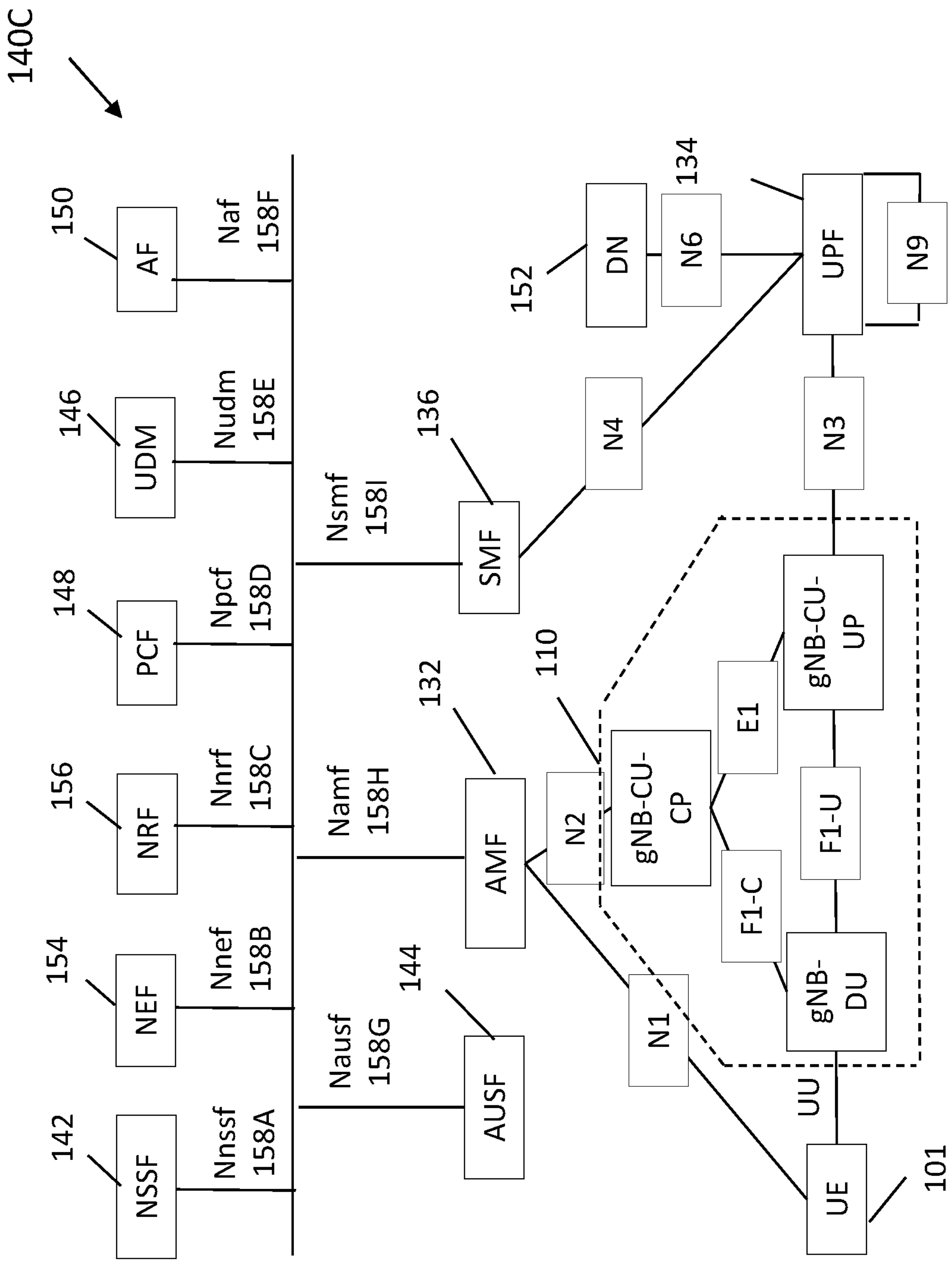
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
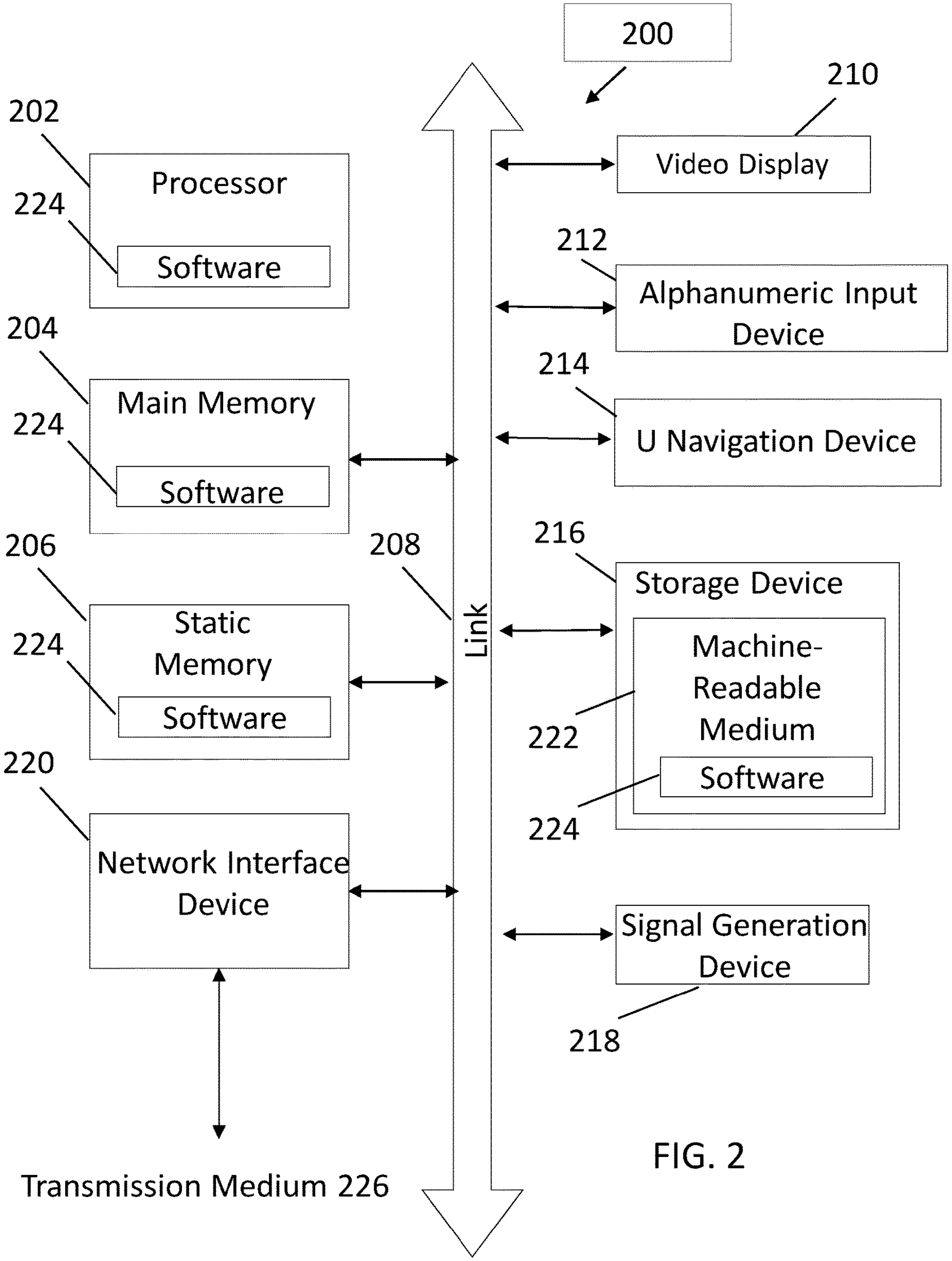
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5th generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, “car radio phone”), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V21) and Infrastructure-to-Vehicle (12V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHZ), ITS-G5C (i.e., Operation of ITS applications in the frequency range 5,470 GHz to 5,725 GHZ)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHZ and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHZ, 1710-2025 MHz, 2110-2200 MHz, 2300-2400 MHZ, 2.4-2.4835 GHz (note: it is an ISM band with global availability and it is used by Wi-Fi technology family (11b/g/n/ax) and also by Bluetooth), 2500-2690 MHZ, 698-790 MHZ, 610-790 MHz, 3400-3600 MHZ, 3400-3800 MHz, 3800-4200 MHz, 3.55-3.7 GHZ (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHZ, 3800-4200 MHz, 3.5 GHz bands, 700 MHz bands, bands within the 24.25-86 GHz range, etc.), spectrum made available under FCC's “Spectrum Frontier” 5G initiative (including 27.5-28.35 GHz, 29.1-29.25 GHz, 31-31.3 GHZ, 37-38.6 GHZ, 38.6-40 GHz, 42-42.5 GHZ, 57-64 GHz, 71-76 GHz, 81-86 GHz and 92-94 GHZ, etc), the ITS (Intelligent Transport Systems) band of 5.9 GHZ (typically 5.85-5.925 GHZ) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHZ) and WiGig Band 4 (63.72-65.88 GHZ), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

5G networks extend beyond the traditional mobile broadband services to provide various new services such as internet of things (IoT), industrial control, autonomous driving, mission critical communications, etc. that may have ultra-low latency, ultra-high reliability, and high data capacity requirements due to safety and performance concerns. Some of the features in this document are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

As above, NR UE may support one or more service types with different priority level (e.g., ‘high’ and ‘low’ priority). The gNB may configure the UE or indicate to the UE to multiplex transmissions with different priorities, or not to multiplex transmissions with different priorities. In embodiments in which a NR UE supports UL carrier aggregation (CA), the UE may support simultaneous transmission of a physical uplink control channel (PUCCH) and physical uplink shared channel (PUSCH), for example, simultaneous transmission of PUCCH and PUSCH with different priorities on different serving cells in different bands. Hence, efficient multiplexing of UL transmissions of 'high' and 'low' priority for a given UE, and efficient simultaneous transmission of PUCCH and PUSCH is desired. UL power control is one of the factors that impact the efficiency of UL transmission, and the power headroom report is one of the procedures used for UL power control.

The embodiments discussed below include licensed or unlicensed spectrum, frequency domain duplexing (FDD) or time domain duplexing (TDD) or flexible duplex system frame structures, frequency range 1 (FR1) and/or FR2 spectrum. The PUCCH transmission may contain uplink control information (UCI) such as one or more of: scheduling request (SR), Hybrid Automatic Repeat Request Acknowledgment (HARQ-ACK), Channel State Information (CSI). The PUSCH transmission can be based on a dynamic UL grant or without a UL grant, i.e., a configured grant. The PUCCH transmission can be based on a dynamic DL assignment or without a DL assignment. The PUCCH or PUSCH transmission can be of high priority (HP) or low priority (LP). If no priority is configured or indicated, then the transmission may be regarded as a low priority transmission. Here, a smaller priority index is associated with lower priority, and a larger priority index is associated with higher priority.

One or more of the embodiments below consider prioritization/cancellation of a LP UL channel, if the LP UL channel overlaps with a HP UL channel. One or more of the embodiments below consider multiplexing of UCI onto a PUSCH with different priorities, if a UE is configured with UCI multiplexing for different priorities, for example, by RRC parameter UCI-MuxWithDifferentPriority.

One or more of the embodiments below consider simultaneous PUCCH and PUSCH transmission. For example, a UE can simultaneously transmit a PUCCH and PUSCH with different priorities on serving cells in different bands.

For UL transmission, typically, the gNB controls the UL transmission power by configuring open loop power control parameters and close loop power control parameters. The gNB can adjust these parameters according to the detection performance, e.g., Block Error Rate (BLER), and the interference coordination between different gNBs or transmission-reception points (TRPs). In some cases, the gNB may not exactly know the actual UL transmission power, and the gNB may not exactly know how much additional power the UE can increase to transmit next UL channel compared with the current UL channel. Therefore, the power headroom report (PHR) is supported in the LTE and NR systems to provide the information of the additional power the UE can increase. When a UE is configured with UL CA, the UE may report the PHR for each UL serving cell. The UE generates PHR for the UL serving cells and choses one PUSCH to carry the PHR for the serving cells. In some scenarios, it is beneficial for the UE to report both the PHR for the PUSCH and PUCCH to help the gNB to make a proper scheduling decision for the PUSCH and PUCCH.

In one embodiment, to assist proper power control for UL channels, the UE can be configured to provide PHRs for dynamically scheduled or higher-layer configured UL channels. The types of UE PHRs include at least following: A Type 1 UE power headroom that is valid for PUSCH transmission occasion i on an active UL bandwidth part (BWP) b of carrier f of serving cell C; A Type 2 UE power headroom that is valid for PUCCH transmission occasion i on active UL BWP b of carrier f of serving cell c.

A UE determines whether a power headroom report for an activated serving cell C is based on an actual transmission or a reference format according to at least one of the following mechanisms: based on the higher layer signaling of a configured grant, periodic/semi-persistent PUCCH, a UL grant for PUSCH or DL assignment for the PUCCH the UE received until and including the PDCCH monitoring occasion where the UE detects a first DCI format scheduling an initial transmission of a transport block since a power headroom report was triggered, if the power headroom report is reported on a PUSCH triggered by the first DCI format; based on the higher layer signaling of a configured grant, a periodic/semi-persistent PUCCH, a UL grant for PUSCH or DL assignment for the PUCCH the UE received until the first uplink symbol of a configured PUSCH transmission minus $$T'_{proc,2}=T_{proc,2},$$

if the power headroom report is reported on the PUSCH using the configured grant; or based on the result of multiplexing/prioritization/cancellation between a PUCCH and PUSCH with same or different priorities, PUCCHs with different priorities, or a PUSCH with different priorities.

In one example, if a UE provides a PHR in a PUSCH transmission in a slot m on serving cell $C_j$, the UE generates a type 2 PHR based on a reference PUCCH of serving cell $C_i$, for at least one of the following cases:

Case 1: the UE does not transmit a PUCCH in a slot n that overlaps with the slot m.

Case 1-1: the UE is not scheduled or configured to transmit a PUCCH in the slot n.

Case 1-2: the UE is scheduled or configured to transmit a PUCCH in the slot n, but the UE multiplexes the UCI of the PUCCH onto a PUSCH, and the UE does not transmit the PUCCH.

Case 1-3: the UE is scheduled or configured to transmit a LP PUCCH in the slot n, but the LP PUCCH is cancelled, due to prioritization or cancellation between the LP PUCCH and an HP PUSCH.

For case 1-1, the UE has no information for the PUCCH due to no scheduling or configuration, the UE can only generate a PHR according to a reference PUCCH.

For case 1-2, because the UE finally does not transmit the PUCCH, the UE reports the PHR according to a reference PUCCH, though the UE already gets scheduled or configured parameters for the PUCCH. Here, DCI for a PUSCH on which the PUCCH is multiplexed comes no later than the UL grant for the PUSCH carrying the PHR, or the PUSCH on which the PUCCH is multiplexed is not after the first uplink symbol of the PUSCH carrying the PHR minus $$T'_{proc,2}=T_{proc,2},$$

if the PUSCH is a CG PUSCH. Otherwise, the UE generates the PHR based on scheduled or configured parameters of the LP PUCCH rather than based on a reference LP PUCCH, because the UE may not know the PUCCH cannot be transmitted due to the later presence of the PUSCH, when the UE starts to prepare the type-2 PHR for the PUCCH, if the DCI for the PUSCH comes later than the UL grant for the PUSCH carrying the PHR, or the PUSCH on which the PUCCH is multiplexed is after the first uplink symbol of the PUSCH carrying the PHR minus $$T'_{proc,2} = T_{proc,2},$$

if the PUSCH is a CG PUSCH.

For case 1-3, because the UE finally does not transmit the LP PUCCH, the UE reports the PHR according to a reference PUCCH, though the UE already gets scheduled or configured parameters for the PUCCH. Here, DCI for the HP PUSCH that cancels the LP PUCCH comes no later than the UL grant for the PUSCH carrying the PHR, or the HP PUSCH or HP PUCCH is not after the first uplink symbol of the PUSCH carrying the PHR minus $$T'_{proc,2} = T_{proc,2},$$

if the PUSCH is a CG PUSCH. Otherwise, the UE generates the PHR based on scheduled or configured parameters of the LP PUCCH rather than based on a reference LP PUCCH, because the UE may not know the LP PUCCH can not be transmitted due to the later presence of the HP PUSCH, when the UE starts to prepare the type-2 PHR for the LP PUCCH, if the DCI for the HP PUSCH or HP PUCCH comes later than the UL grant for the PUSCH carrying the PHR, or the HP PUSCH or HP PUCCH is after the first uplink symbol of the PUSCH carrying the PHR minus $$T'_{proc,2} = T_{proc,2},$$

if the PUSCH is a CG PUSCH.

In one special case, if a LP PUCCH is cancelled by a HP PUCCH or multiplexed onto a HP PUCCH, and the DCI for HP PUCCH comes no later than the UL grant for the PUSCH carrying the PHR, the UE reports PHR for the HP PUCCH. If the DCI for the HP PUCCH comes later than the UL grant for the PUSCH carrying the PHR, the UE reports the PHR for the LP PUCCH, because the UE may not know the LP PUCCH can not be transmitted due to the later presence of the HP PUCCH, when the UE starts to prepare the type-2 PHR for the LP PUCCH.

In another special case, if a first PUCCH is multiplexed on a second PUCCH, while the DCI for the first PUCCH comes no later than the UL grant for the PUSCH carrying the PHR but the DCI for the second PUCCH comes later than the UL grant, the UE reports the PHR for the first PUCCH. If both DCIs for the first and the second PUCCHs come no later than the UL grant for the PUSCH carrying the PHR, the UE reports the PHR for the second PUCCH.

Case 2: the UE transmits a PUCCH in a slot n that overlaps with slot m and the DL assignment for the PUCCH comes later than the UL grant for the PUSCH carrying the PHR. For example, if a PDCCH monitoring occasion of the DL assignment is after a PDCCH monitoring occasion for the UL grant, it is considered as if the DL assignment comes later than the UL grant.

Case 3: the UE transmits a PUCCH in a slot n that overlaps with slot m and the PUCCH is after the first uplink symbol of the PUSCH carrying the PHR minus $$T'_{proc,2} = T_{proc,2},$$

if the PUSCH is a CG PUSCH.

For case 2 and 3, because the UE may not know about the presence of the PUCCH when the UE starts to prepare type-2 PHR, the UE can only generate the PHR according to a reference PUCCH.

In one example, if the UE provides a PHR in a PUSCH transmission in a slot m on serving cell $C_j$, the UE generates a type 2 PHR based on an actual PUCCH of serving cell $C_i$, for at least one of the following cases:

Case 4: the UE actually transmits a PUCCH in a slot n that overlaps with the slot m, and the DL assignment for the PUCCH comes no later than the UL grant for the PUSCH carrying the PHR, or the PUCCH is not after the first uplink symbol of the PUSCH carrying the PHR minus $$T'_{proc,2} = T_{proc,2},$$

if the PUSCH is a CG PUSCH.

For case 4, when the UE generates the PHR, the UE has already obtained the information for the PUCCH, and the UE transmits the PUCCH, so the UE can generate the PHR according to the actual PUCCH.

Case 5: the UE is scheduled or configured to transmit the PUCCH in a slot n that overlaps with the slot m, and the DL assignment for the PUCCH comes no later than the UL grant for the PUSCH carrying the PHR, or the PUCCH is not after the first uplink symbol of the PUSCH carrying the PHR minus $$T'_{proc,2} = T_{proc,2},$$

if the PUSCH is a CG PUSCH.

Case 5-1: the UE is scheduled or configured to transmit the PUCCH in the slot n, but the UE multiplexes the UCI of the PUCCH onto a PUSCH, and the UE does not transmit the PUCCH.

Case 5-2: the UE is scheduled or configured to transmit the PUCCH in the slot n, but the UE multiplexes the UCI of the PUCCH onto a PUSCH on the same serving cell with the PUCCH, and the UE does not transmit the PUCCH.

Case 5-3: the UE is scheduled or configured to transmit the PUCCH in the slot n, but the PUCCH is cancelled, due to prioritization or cancellation between the LP PUCCH and HP PUSCH.

For case 5, though the UE does not transmit the PUCCH, when the UE generates the PHR, the UE has already obtained the information for the PUCCH, it would be beneficial to report a type-2 PHR based on the scheduled or configured parameters for the PUCCH. Therefore, the UE reports the PHR based on actual parameters for the PUCCH.

In one option, the UE reports both a type-1 and type-2 PHR for serving cell $C_i$, if the serving cell $C_i$ is a Pcell, or Spcell, or Pscell, or PUCCH cell, or candidate PUCCH cell. In another option, the gNB configures the UE to report type-1, or type-1 and type-2 the PHR for serving cell $C_i$. In another option, if the UE is configured with simultaneous PUCCH and PUSCH transmissions, the UE reports both type-1 and type-2 PHR for the serving cell $C_i$. In another example case, if the UE is configured with PUCCH cell switching, the UE reports both type-1 and type-2 PHR for the serving cell $C_i$.

Figure 3A:
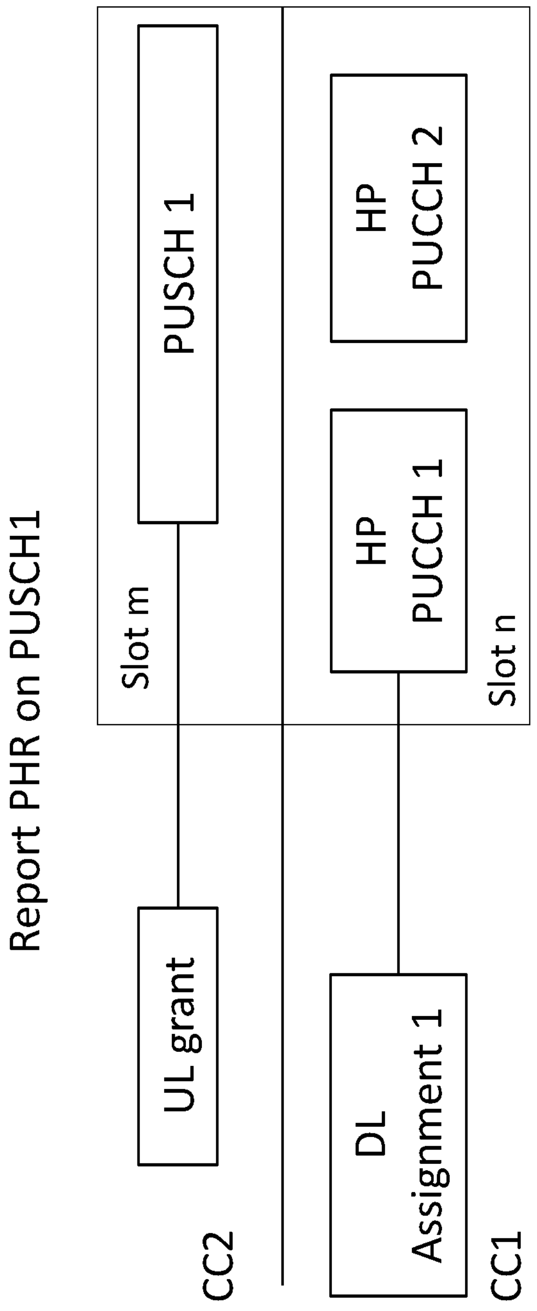
FIG. 3A illustrates a Type 2 PHR on a high priority (HP) physical uplink shared channel (PUSCH) in accordance with some embodiments.

If the UE is configured with multiple cells for the PUSCH and/or the PUCCH transmissions, where the same SCS configuration on an active UL BWP $b_1$ of carrier $f_1$ of serving cell $c_1$ and active UL BWP $b_2$ of carrier $f_2$ of serving cell $c_2$, and the PUCCH is configured with a slot-based PUCCH resource, if the UE provides the PHR in a PUSCH transmission in a slot on the active UL BWP $b_1$, the UE provides a Type-2 PHR for the first PUCCH, if any, on the slot on the active UL BWP $b_2$ that overlaps with the slot on the active UL BWP $b_1$. For one special case, the PUCCH and PUSCH is on the same cell, the same rule is also applied. FIG. 3A illustrates a Type 2 PHR on a HP PUSCH in accordance with some embodiments. In FIG. 3A, the type-2 PHR for HP the PUCCH1 in slot n is reported.

Figure 3B:
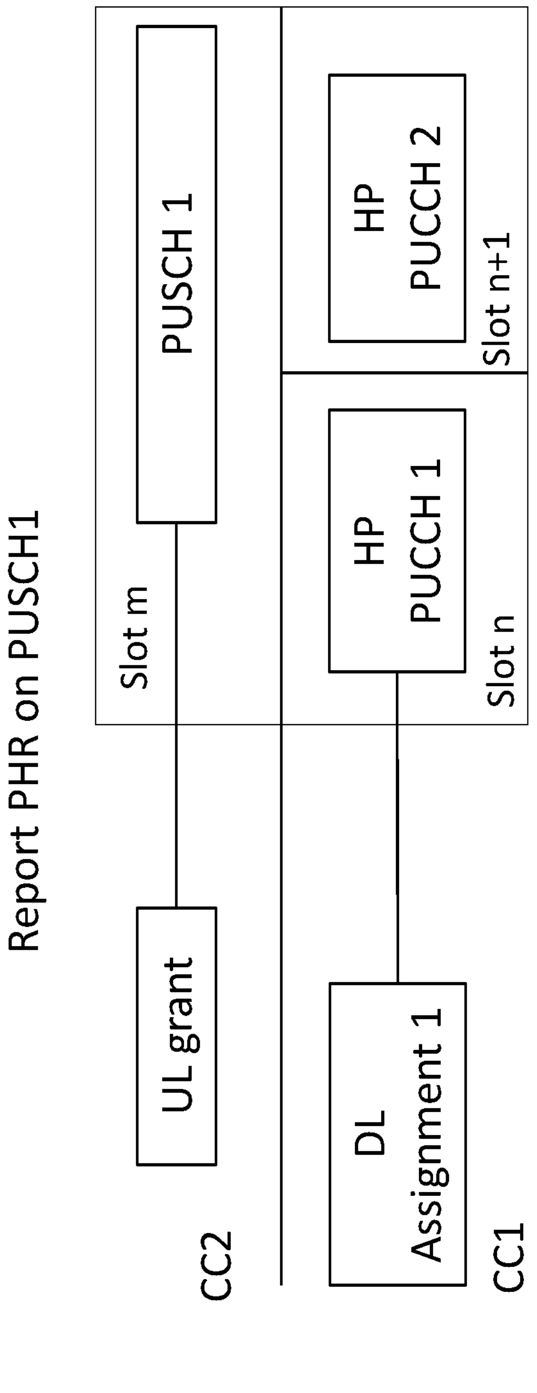
FIG. 3B illustrates another Type 2 PHR on a HP PUSCH in accordance with some embodiments.

If the UE is configured with multiple cells for PUSCH and/or the PUCCH transmissions, where a SCS configuration $\mu_1$ on the active UL BWP $b_1$ of carrier $f_1$ of serving cell $c_1$ is smaller than a SCS configuration $\mu_2$ on the active UL BWP $b_2$ of carrier $f_2$ of serving cell $c_2$, and the PUCCH is configured with a slot-based the PUCCH resource, and if the UE provides the PHR in a PUSCH transmission in a slot on active UL BWP $b_1$ that overlaps with multiple slots on active UL BWP $b_2$, the UE provides a Type-2 the PHR for the first PUCCH, if any, on the first slot of the multiple slots on active UL BWP $b_2$ that fully overlaps with the slot on active UL BWP $b_1$. FIG. 3B illustrates another Type 2 PHR on a HP PUSCH in accordance with some embodiments. In FIG. 3B, the type-2 PHR for the PUCCH in slot n is reported.

Figure 3C:
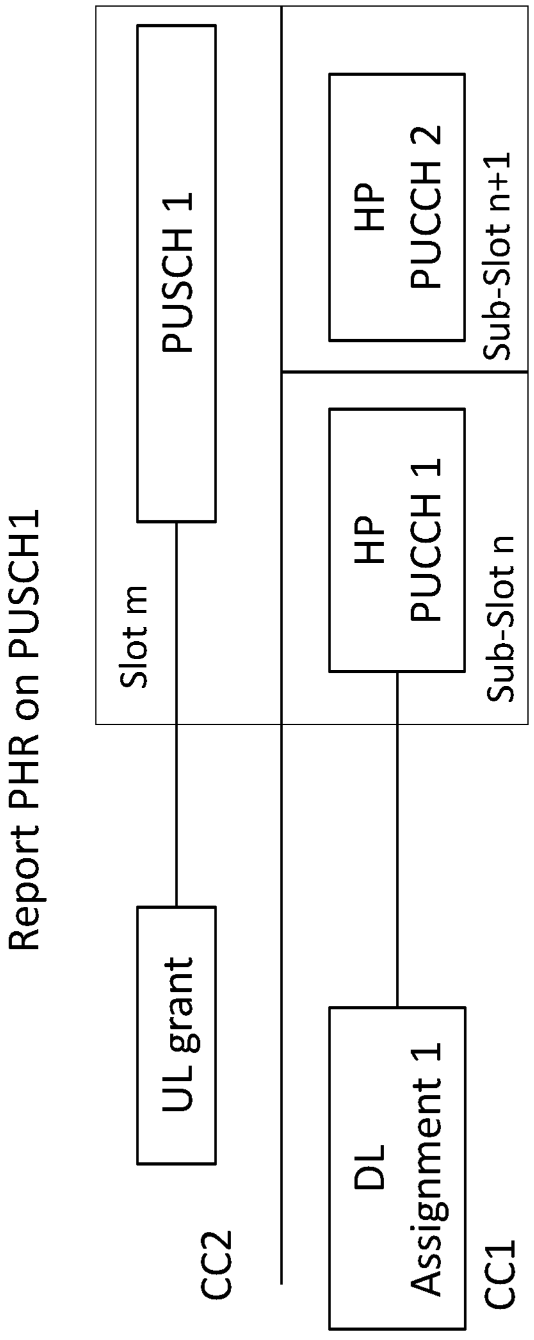
FIG. 3C illustrates a Type 2 PHR on a HP physical uplink control channel (PUCCH) in accordance with some embodiments.
Figure 3D:
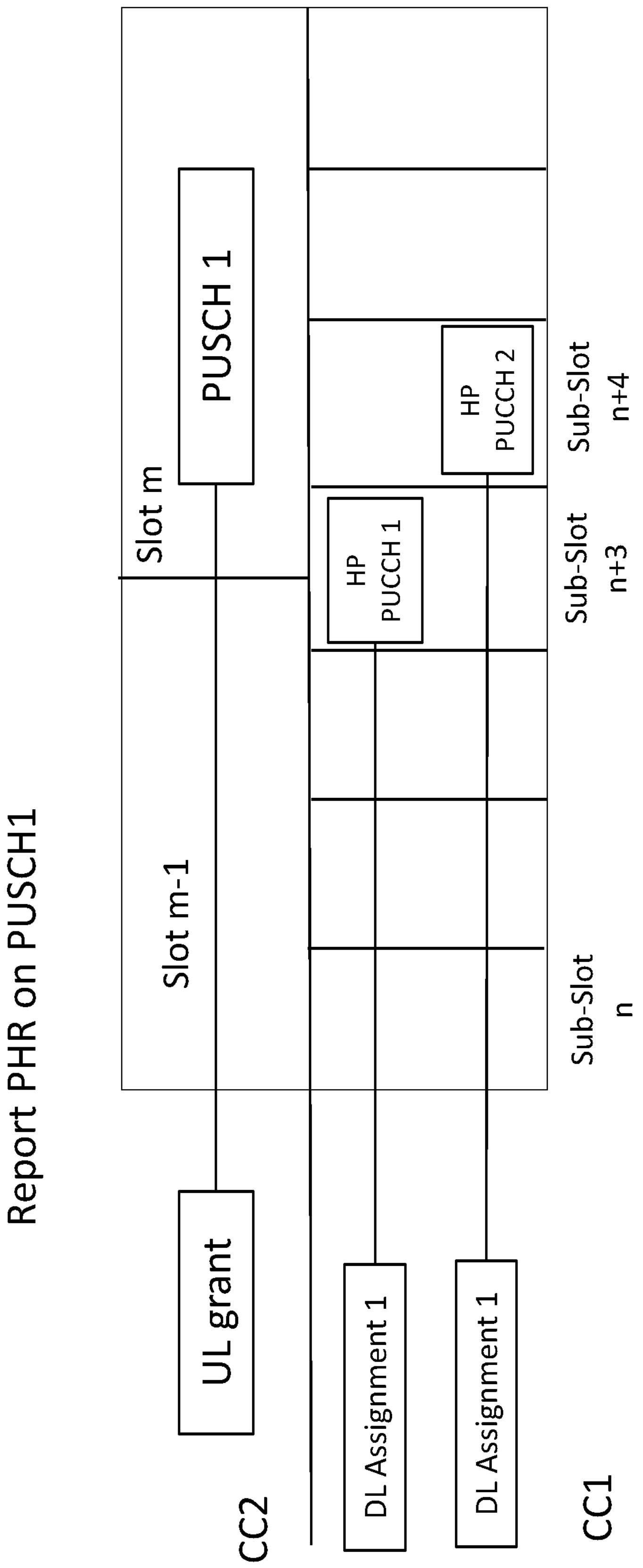
FIG. 3D illustrates another Type 2 PHR on a HP PUCCH in accordance with some embodiments.

If the UE is configured with a sub-slot-based PUCCH, and if the UE provides the PHR in a PUSCH transmission in a slot n on active UL BWP $b_1$ of carrier $f_1$ of serving cell $c_1$, and the slot for the PUSCH overlaps with more than one sub-slot, the UE provides a Type-2 PHR for the first PUCCH, if any, on the first sub-slot of the multiple sub-slots that fully overlaps with the slot on active UL BWP $b_1$. FIG. 3C illustrates a Type 2 PHR on a HP PUCCH in accordance with some embodiments. In FIG. 3C, the type-2 PHR for the PUCCH in sub-slot n is reported. FIG. 3D illustrates another Type 2 PHR on a HP PUCCH in accordance with some embodiments. For one special case, a sub-slot may overlap with two slots, as shown in FIG. 3D. Then, the first sub-slot that fully overlaps with the slot of the PUSCH carrying the PHR is used to determine the type-2 PHR for the PUCCH, i.e., the HP PUCCH2 in sub-slot n+4. Alternatively, the UE provides a Type-2 PHR for the first the PUCCH, if any, on the first sub-slot of the multiple sub-slots that overlaps with the slot on active UL BWP $b_1$. Then, for the case in FIG. 3C, the UE reports the type-2 PHR for the PUCCH in sub-slot n+3 rather than sub-slot n+4.

Type 1 PHR

A UE generates a Type 1 PHR according to at least one of the methods:

If a UE determines that a Type 1 PHR for an activated serving cell C is based on an actual PUSCH transmission, the PHR for PUSCH transmission occasion i on active UL BWP b of carrier f of serving cell C is, $$PH_{type1b,f,c}(i, j, q_d, l) = P_{CMAX,f,c}(i) - \left\{P_{O\_PUSCH2,f,c}(j) + 10\log_{10}\left(2^{\mu} \cdot M^{PUSCH}_{RB,b,f,c}(i)\right) + \propto_{b,f,c}(j) \cdot PL_{b,f,c}(q_d) + \Delta_{TF,b,f,c}(i) + f_{b,f,c}(i, l)\right\}[\mathrm{dB}] \quad (1)$$

where $$P_{CMAX,f,c}(i),\ P_{O\_PUSCH,b,f,c}(j),\ M^{PUSCH}_{RB,b,f,c}(i),\ \alpha_{b,f,c}(j),\ PL_{b,f,c}(q_d),\ \Delta_{TF,b,f,c}(i) \text{ and } f_{b,f,c}(i, l)$$

are defined as below $P_{CMAX,f,c}(i)$ is the UE configured maximum output power defined for carrier f of serving cell c in PUSCH transmission occasion i.

$P_{O\_PUSCH,b,f,c}(j)$ and $\alpha_{b,f,c}(j)$ are open loop power control parameters configured by high-layer signaling. $PL_{b,f,c}(q_d)$ is a downlink pathloss estimate in dB calculated by the UE using reference signal (RS) index $q_d$ for the active DL BWP. $\Delta_{IF,b,f,c}(i)$ is close loop power control.

$$M^{PUSCH}_{RB,b,f,c}(i)$$

is the bandwidth of the PUSCH resource assignment expressed in number of resource blocks for PUSCH transmission occasion i on active UL BWP b of carrier f of serving cell c and μ is a Subcarrier spacing (SCS).

$$\Delta_{TF,b,f,c}(i) = 10\log_{10}\left(\left(2^{BPRE \cdot K} - 1\right) \cdot \beta^{PUSCH}_{offset}\right) \text{ for } K_S = 1.25$$

and $\Delta_{IF,b,f,c}(i)=0$ for $K_S=0$ where $K_S$ is provided by deltaMCS for each UL BWP b of each carrier f and serving cell c. If the PUSCH transmission is over more than one layer, $\Delta_{IF,b,f,c}(i)=0$. Bits per resource element (BPRE) is determined by effective coding rate for PUSCH, and $$\beta^{PUSCH}_{offset}$$

is determined by the offset for the effective coding rate for UCI or PUSCH.

If a UE determines that a Type 1 PHR for an activated serving cell C is based on a reference PUSCH transmission, the PHR for PUSCH transmission occasion i on active UL BWP b of carrier f of serving cell c is, $$PH_{type1,b,f,c}(i, j, q_d, l) = \tilde{P}_{CMAX,f,c}(i) - \{P_{O\_PUSCH,b,f,c}(j) + \alpha_{b,f,c}(j) \cdot PL_{b,f,c}(q_d) + f_{b,f,c}(i, l)\}[\mathrm{dB}] \quad (2)$$

where $\tilde{P}_{CMAX,f,c}(i)$ is computed assuming MPR=0 dB, A-MPR=0 dB, P-MPR=0 dB. $\Delta T_C$=0 dB. where $P_{O\_PUSCH,b,f,c}(j)$ and $\alpha_{b,f,c}(j)$ are obtained using $P_{O\_NOMINAL\_PUSCH,f,c}(0)$ and p0-PUSCH-AlphaSetId=0, $PL_{b,f,c}(q_d)$ is obtained using pusch-PathlossReferenceRS-Id=0, and l=0 for $f_{b,f,c}(i,l)$.

Type 2 PHR

A UE generates Type 2 PHR for a special cell C according to at least one of the methods:

The special cell C is Pcell, or Spcell, or Pscell, or PUCCH cell, or candidate PUCCH cell, or a serving cell configured by higher-layer signaling.

If a UE determines that a Type 2 power headroom report for an activated serving cell C based on an actual PUCCH transmission, the PHR for PUCCH transmission occasion i on active UL BWP b of carrier f of special cell C is, $$PH_{PUCCH,b,f,c}(i, q_u, q_d, l) = P_{CMAX,f,c}(i) - \hat{P}_{PUCCH,b,f,c}(i, q_u, q_d, l) \text{ where} \tag{3}$$

$$\hat{P}_{PUCCH,b,f,c}(i, q_u, q_d, l) = P_{O\_PUCCH,b,f,c}(q_u) + 10\log_{10}\left(2^{\mu} \cdot M_{RB,b,f,c}^{PUCCH}(i)\right) + PL_{b,f,c}(q_d) + \Delta_{F\_PUCCH}(F) + \Delta_{TF,b,f,c}(i) + g_{b,f,c}(i, l) \tag{4}$$

where, $$P_{O\_PUCCH,b,f,c}(q_u),\ M_{RB,b,f,c}^{PUCCH}(i),\ \Delta_{F\_PUCCH}(F),\ \Delta_{TF,b,f,c}(i) \text{ and } g_{b,f,c}(i, l)$$

are defined as below $P_{O\_PUCCH,b,f,c}(q_u)$ is an open loop power control parameter configured by higher-layer signaling, which is composed of the sum of a component $P_{O\_NOMINAL\_PUCCH}$ and a component $P_{O\_UE\_PUCCH}(q_u)$.

$$M_{RB,b,f,c}^{PUCCH}(i)$$

is a bandwidth of the PUCCH resource assignment expressed in number of resource blocks for PUCCH transmission occasion i on active UL BWP b of carrier f of special cell c and μ is a SCS $\Delta_{F\_PUCCH}(F)$ is a value configured by high-layer signaling. For example, $\Delta_{F\_PUCCH}(F)$ is deltaF-PUCCH-f0 for PUCCH format 0, deltaF-PUCCH-f1 for PUCCH format 1, deltaF-PUCCH-f2 for PUCCH format 2, deltaF-PUCCH-f3 for PUCCH format 3, and deltaF-PUCCH-f4 for PUCCH format 4, if provided; otherwise $\Delta_{F\_PUCCH}(F)=0$.

$\Delta_{TF,b,f,c}(i)$ is a PUCCH transmission power adjustment component on active UL BWP b of carrier f of special cell c.

$g_{b,f,c}(i,l)$ is the PUCCH power control adjustment state (close loop power control) for active UL BWP b of carrier f of special cell c and PUCCH transmission occasion i.

If a UE determines that a Type 2 PHR for an activated serving cell based on a reference PUCCH transmission, the PHR for PUCCH transmission occasion i on active UL BWP b of carrier f of special cell c is, $$PH_{PUCCH,b,f,c}(i, q_u, q_d, l) = \hat{P}_{CMAX,f,c}(i) - \hat{P}_{PUCCH,b,f,c}(i, q_u, q_d, l) \tag{5}$$

Where $\hat{P}_{CMAX,f,c}(i)$ and $\hat{P}_{PUCCH,b,f,c}(i, q_u, q_d, l)$ are defined as below $\hat{P}_{CMAX,f,c}(i)$ is computed assuming MPR=0 dB, A-MPR=0 dB, P-MPR=0 dB. $\Delta T_C$=0 dB. Alternatively, $\hat{P}_{CMAX,f,c}(i)=P_{CMAX,f,c}(i)$.

$$\hat{P}_{PUCCH,b,f,c}(i, q_u, q_d, l) = P_{O\_PUCCH,b,f,c}(q_u) + PL_{b,f,c}(q_d) + g_{b,f,c}(i, l) \tag{6}$$

where $P_{O\_PUCCH,b,f,c}(q_u)$ is the sum of $P_{O\_NOMINALPUCCH}$ and $P_{O\_UE\_PUCCH}(q_u)$. $P_{O\_NOMINALPUCCH}$ is determined by p0-nominal or $P_{O\_NOMINAL\_PUCCH}$=0. $P_{O\_UE\_PUCCH}(q_u)$ is obtained according to p0-PUCCH-Id and associated p0-PUCCH-Value configured by high layer signaling (e.g., MAC CE, RRC signaling), or $P_{O\_UE\_PUCCH}(q_u)$=0.

$PL_{b,f,c}(q_d)$ is obtained according to index $q_d$, or according to a pre-defined value, e.g., $PL_{b,f,c}(q_d)$ is obtained using pucch-PathlossReferenceRS-Id=0.

$$l = 0 \text{ for } g_{b,f,c}(i, l).$$

Alternatively, if a UE determines that a Type 2 power headroom report for an activated serving cell based on an actual PUCCH transmission, the PHR for PUCCH transmission occasion i on active UL BWP b of carrier f of special cell c is, $$PH_{PUCCH,b,f,c}(i, q_u, q_d, l) = P_{CMAX,f,c}(i) - 10\log_{10}\left(10^{\frac{\hat{P}_{PUSCH,b,f,c}(i,j,q_d,l)}{10}} + 10^{\frac{\hat{P}_{PUCCH,b,f,c}(i,q_u,q_d,l)}{10}}\right) \text{ where} \tag{7}$$

$$\hat{P}_{PUCCH,b,f,c}(i, q_u, q_d, l) = P_{O\_PUCCH,b,f,c}(q_u) + 10\log_{10}\left(2^{\mu} \cdot M_{RB,b,f,c}^{PUCCH}(i)\right) + PL_{b,f,c}(q_d) + \Delta_{F\_PUCCH}(F) + \Delta_{TF,b,f,c}(F) + g_{b,f,c}(i, l) \tag{8}$$

$$\hat{P}_{PUSCH,b,f,c}(i, j, q_d, l) = \{P_{O\_PUSbCfH}(j) + \alpha_{b,f,c}(j) \cdot PL_{b,f,c}(q_d) + f_{b,f,c}(i, l)\} \tag{9}$$

if a UE determines that a Type 2 PHR for an activated serving cell based on a reference PUCCH transmission, the PHR for PUCCH transmission occasion i on active UL BWP b of carrier f of special cell c is, $$PH_{PUCCH,b,f,c}(i, q_u, q_d, l) = \hat{P}_{CMAX,f,c}(i) - 10\log_{10}\left(10^{\frac{\hat{P}_{PUSCH,b,f,c}(i,j,q_d,l)}{10}} + 10^{\frac{\hat{P}_{PUCCH,b,f,c}(i,q_u,q_d,l)}{10}}\right)$$

where $\hat{P}_{PUCCH,b,f,c}(i, q_u, q_d, l)=P_{O\_PUCCH,b,f,c}(q_u)+$ $$PL_{b,f,c}(q_d) + g_{b,f,c}(i, l) \tag{10}$$

$$\hat{P}_{PUSCH,b,f,c}(i, j, q_d, l) = \{P_{O\_PUSCfH}(j) + \alpha_{b,f,c}(j) \cdot PL_{b,f,c}(q_d) + f_{b,f,c}(i, l)\} \tag{11}$$

Figure 4A:
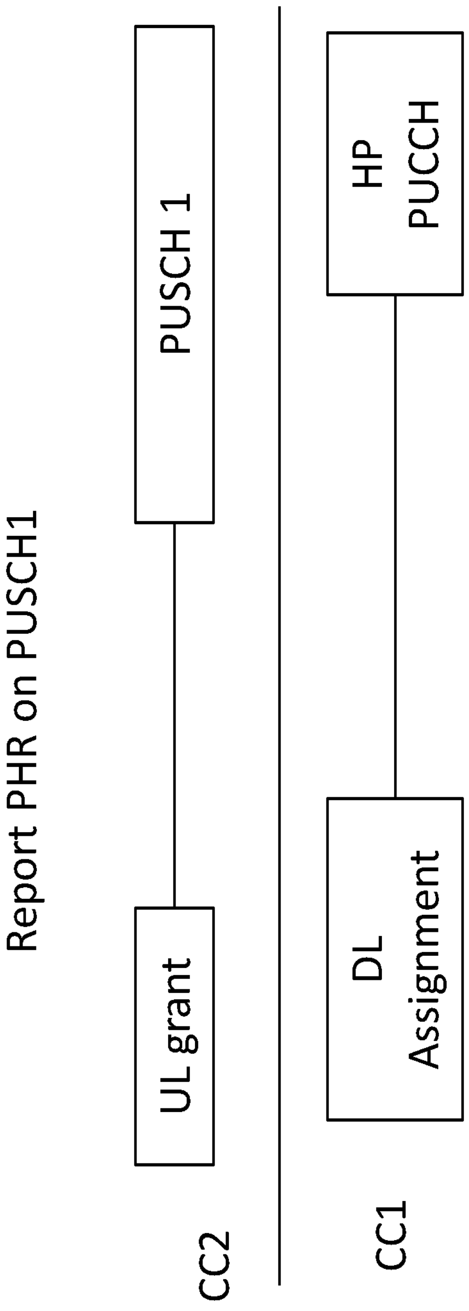
FIG. 4A illustrates a Type 2 PHR for a HP PUCCH based on a reference PUCCH in accordance with some embodiments.
Figure 4B:
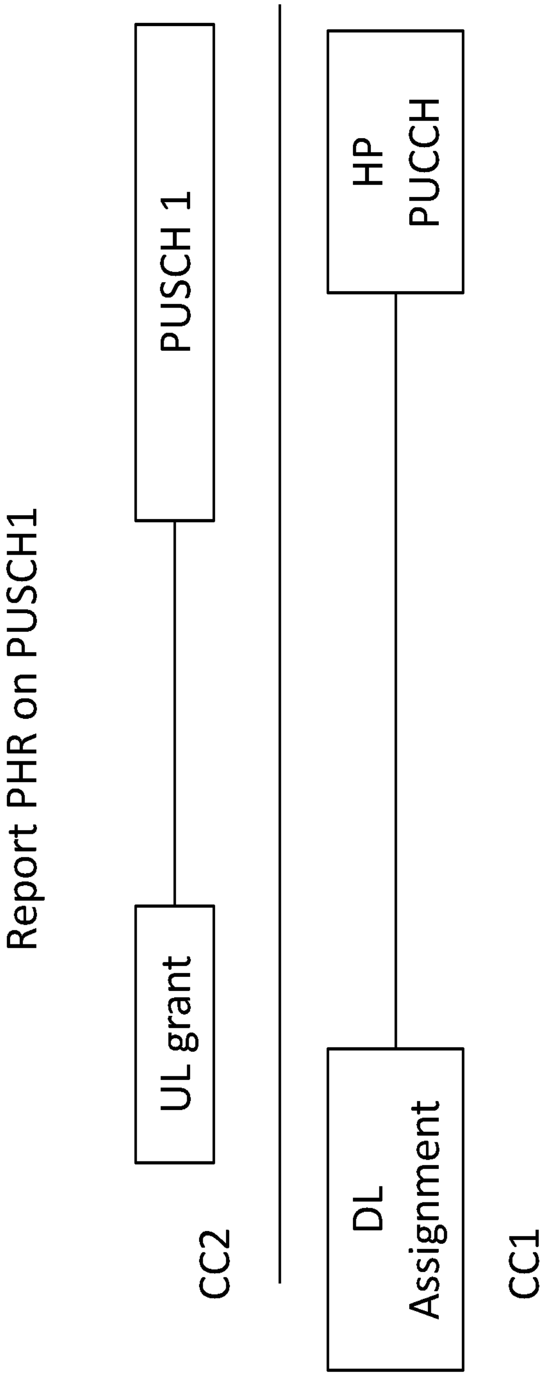
FIG. 4B illustrates a Type 2 PHR for a HP PUCCH based on an actual PUCCH in accordance with some embodiments.

FIG. 4A illustrates a Type 2 PHR for a HP PUCCH based on a reference PUCCH in accordance with some embodiments. FIG. 4B illustrates a Type 2 PHR for a HP PUCCH based on an actual PUCCH in accordance with some embodiments. A UE is configured with 2 UL CCs in different bands, and the UE is configured with simultaneous PUCCH/

PUSCH transmission. The UE reports type-1 PHR for CC2, the UE reports type-1 PHR and type-2 PHR for CC1. PUSCH1 on CC2 carries all PHR reports. In FIG. 4A, the DL assignment for the HP PUCCH comes later than the UL grant for PUSCH1, therefore, according to case 2 discussed above, the UE reports the type-2 PHR based on the reference PUCCH. Because there is no PUSCH on CC1, the UE reports the type-1 PHR based on the reference PUSCH. When PUSCH1 is on CC2, the UE reports the type-1 PHR based on the actual PUSCH. In FIG. 4B, the DL assignment for the HP PUCCH comes no later than the UL grant for PUSCH1, therefore, according to case 4 discussed above, the UE reports the type-2 PHR based on the actual PUCCH. Because no PUSCH is on CC1, the UE reports the type-1 PHR based on the reference PUSCH. When PUSCH1 is on CC2, the UE reports the type-1 PHR based on the actual PUSCH.

Figure 5A:
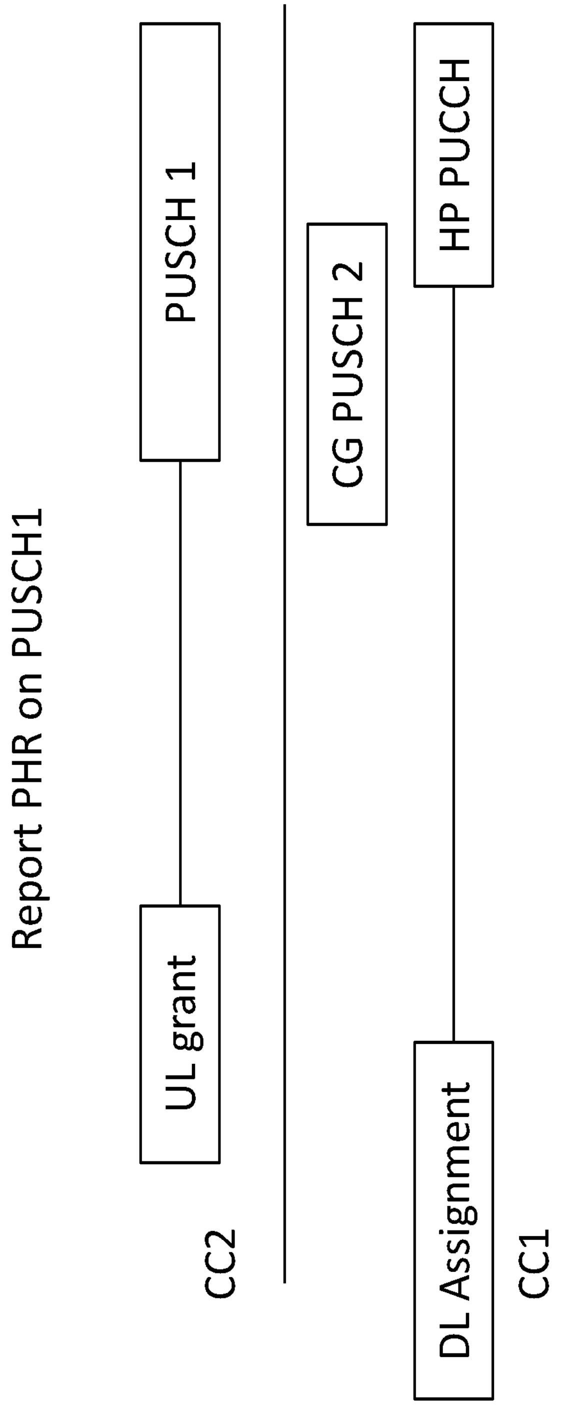
FIG. 5A illustrates a Type 2 PHR for a HP PUCCH based on a reference PUCCH in accordance with some embodiments.
Figure 5B:
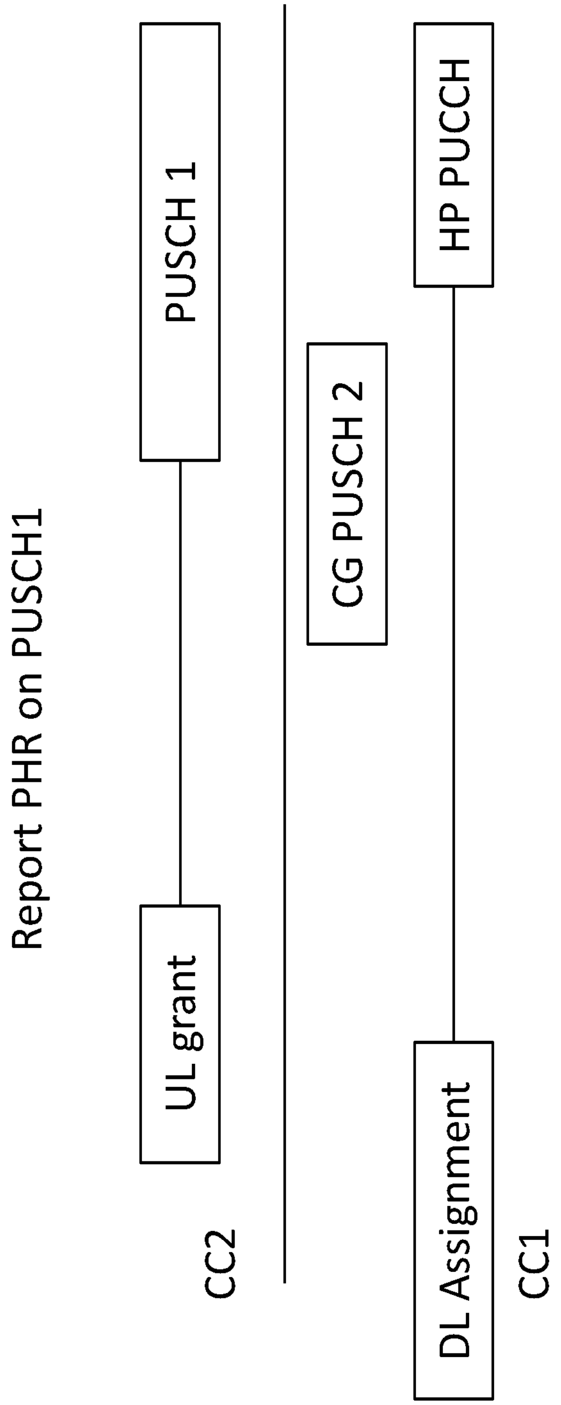
FIG. 5B illustrates a Type 2 PHR for a HP PUCCH based on an actual PUCCH in accordance with some embodiments.

FIG. 5A illustrates a Type 2 PHR for a HP PUCCH based on a reference PUCCH in accordance with some embodiments. FIG. 5B illustrates a Type 2 PHR for a HP PUCCH based on an actual PUCCH in accordance with some embodiments. A UE is configured with 2 UL CCs in different bands, and the UE is configured with simultaneous PUCCH/PUSCH transmission. The UE reports the type-1 PHR for CC2, the UE reports the type-1 PHR for CC1 and type-2 PHR for CC1. The PUSCH1 on CC2 carries all PHR. In FIG. 5A, the DL assignment for the HP PUCCH comes no later than the UL grant for PUSCH1. The HP PUCCH overlaps with CG PUSCH2 on CC1. Assuming the multiplexing timeline is met, the HP PUCCH is multiplexed onto CG PUSCH2. Therefore, the UE transmits the CG PUSCH2 with UCI on CC1, and PUSCH1 on CC2. According to case 1 discussed above, because the UE does not transmit the PUCCH, the UE reports the type-2 PHR based on the reference PUCCH. The UE reports the type-1 PHR based on the actual PUSCH2. The PUSCH1 is on CC2, the UE reports the type-1 PHR based on the actual PUSCH1. In FIG. 5B, the DL assignment for the HP PUCCH comes no later than the UL grant for PUSCH1. The HP PUCCH does not overlap with the CG PUSCH2 on CC1. The UE transmits the CG PUSCH2 and HP PUCCH in different symbols on CC1, and PUSCH1 on CC2. According to case 4 discussed above, the UE reports the type-2 PHR based on the actual PUCCH. The UE reports the type-1 PHR based on the actual PUSCH2, and the UE reports the type-1 PHR based on the actual PUSCH 1.

Figure 6A:
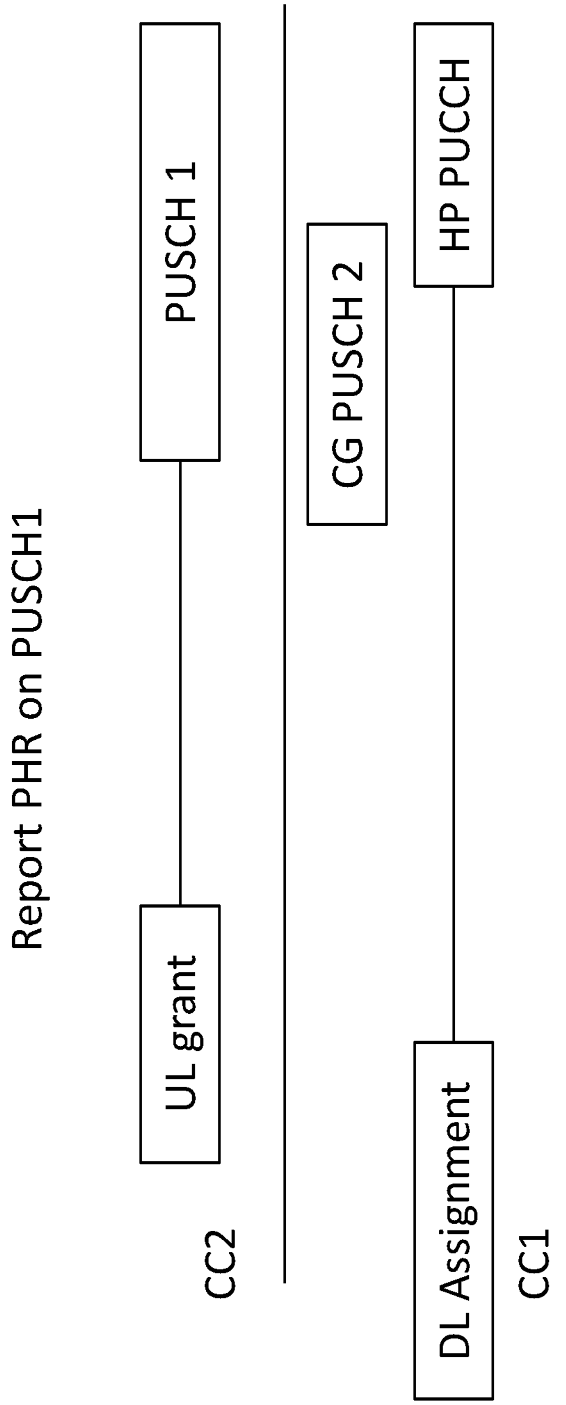
FIG. 6A illustrates a Type 2 PHR for a HP PUCCH based on an actual PUCCH in accordance with some embodiments.
Figure 6B:
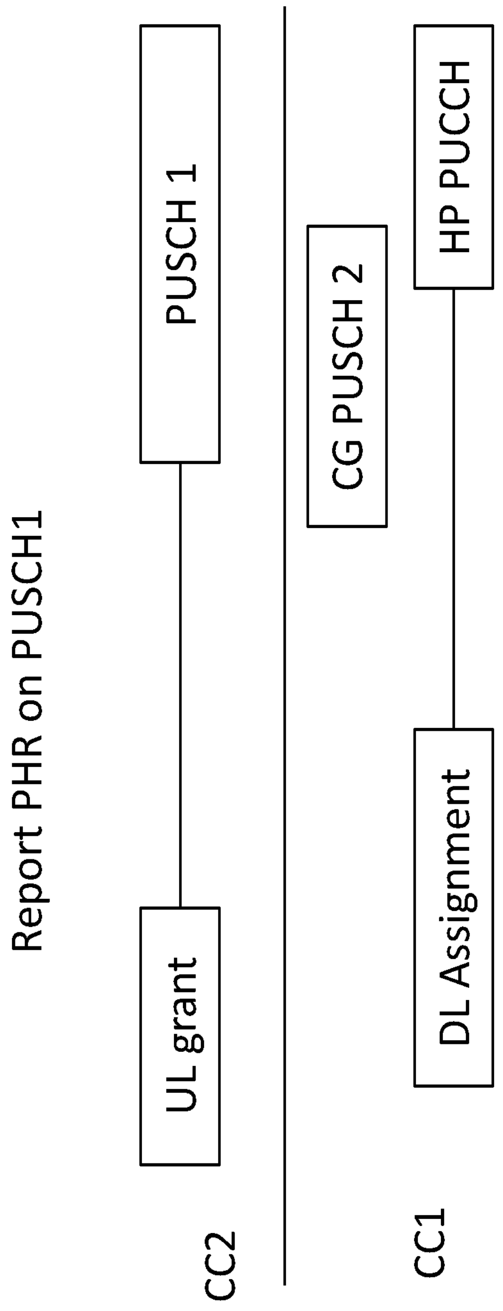
FIG. 6B illustrates a Type 2 PHR for a HP PUCCH based on a reference PUCCH in accordance with some embodiments.

FIG. 6A illustrates a Type 2 PHR for a HP PUCCH based on an actual PUCCH in accordance with some embodiments. FIG. 6B illustrates a Type 2 PHR for a HP PUCCH based on a reference PUCCH in accordance with some embodiments. A UE is configured with 2 UL CCs in different bands, and the UE is configured with simultaneous PUCCH/PUSCH transmission. The UE reports the type-1 PHR for CC2, the UE reports the type-1 PHR for CC1 and type-2 PHR for CC1. The PUSCH1 on CC2 carries all PHR. FIG. 5A is same as FIG. 4A, but according to the method in case 5, even though the UE does not transmit the PUCCH, the UE already gets the parameters for the PUCCH before the UL grant for PUSCH1. Therefore, the UE still reports the type-2 PHR based on the actual HP PUCCH, the type-1 PHR based on actual PUSCH2, and the type-1 PHR based on the actual PUSCH1. In FIG. 5B, because the DL assignment for the HP PUCCH comes later than the UL grant, according to case 2, the UE reports the type-2 PHR based on the reference HP PUCCH, the type-1 PHR based on the actual PUSCH2, and the type-1 PHR based on the actual PUSCH1.

In addition to PHR, different methods of multiplexing and prioritization of HP and LP UL transmissions with and without simultaneous transmission of PUCCH and PUSCH is presented. One or more of the embodiments below consider multiplexing of HARQ-ACKs of different priorities. In particular, multiplexing of one or more HARQ-ACKs based on a first codebook and one or more HARQ-ACKs based on a second codebook may be used, where the first codebook is associated with high priority and the second codebook is associated with low priority and for the two codebooks, following options are possible: one is slot-based and one is sub-slot-based, both are slot-based, or both are sub-slot-based.

Here, slot or sub-slot-based implies PUCCH resources for HARQ transmission based on a codebook that spans a slot or sub-slot, respectively. Here, it is assumed that if a UE is configured with two codebooks, the codebooks are configured/associated with different priorities. For example, if the first (second) codebook is indicated to be used for a HARQ-ACK transmission, it is assumed priority index 0, i.e., low priority (priority index 1, i.e., high priority). An indication of which codebook to use can be conveyed by an explicit indication in a field in a DCI format providing a DL scheduling assignment. For a Semi Persistent Scheduling Physical Downlink Shared Channel (SPS-PDSCH), codebook identification can be provided by higher layer signaling. Below, multiplexing HARQ-ACKs based on two HARQ-ACK codebooks and multiplexing two HARQ-ACK codebooks are used interchangeably and have similar meaning.

In one embodiment, a NR UE can be configured with multiplexing between different priorities by high layer signaling, for example, by RRC parameter UCI-MuxWithDifferentPriority. A NR UE can be indicated for multiplexing between different priorities by a dynamic indication in a DL assignment or UL grant DCI. For example, if a UE is configured with dynaIndicationOfCrossPriMux, the UE expects a bit field in the DCI that can explicitly or implicitly enable/disable multiplexing between different priorities. For example, the UE expects a separate bit field in the DCI to enable/disable multiplexing between different priorities. If the bit field indicates '1', the UE expects multiplexing between different priorities, and if the bit field indicates '0', the UE expects no multiplexing between different priorities, or vice versa. For another example, the UE can derive the indication from another bit field in the DCI, e.g., the bit field of beta offset for an UCI with priority i onto a PUSCH with priority j wherein beta_offset=0 implies no multiplexing, while beta_offset≠0 implies multiplexing between LP and HP, or vice versa. For UL transmission without DCI or without the bit field to derive multiplexing, e.g., DCI 0_0 or DCI 1_0, or UL transmission with DCI without the bit field, it is treated as an indication of no multiplexing. Alternatively, it is treated as an indication of multiplexing, if UCI-MuxWithDifferentPriority is configured.

For handling overlapping PUCCHs/PUSCHs with different priorities when UCI-MuxWithDifferent Priority is configured, the UE performs step 1 and step 2:

Step 1: Resolve overlapping PUCCHs and/or PUSCHs with the same priority;

Step 2: Resolve overlapping PUCCHs and/or PUSCHs with different priorities:

Step 2.1: Resolve collision of LP PUCCHs and HP PUCCHs.

Step 2.2: Resolve collision of PUCCHs and PUSCHs of different priorities.

Details for Step 2.1 and step 2.2 operation can be different, depending on whether or not dynamic indication of enable/disable multiplexing is configured.

A NR UE may support simultaneous PUCCH and PUSCH transmission. For example, the UE can support simultaneous PUCCH and PUSCH transmission for different priorities on different serving cells in different frequency bands. When a PUCCH and PUSCH with different priorities on different serving cells overlap, in some cases, it may be beneficial to support multiplexing, e.g., to save UL Tx power, while in some cases, it may be beneficial to support simultaneous transmission, e.g., to avoid impact on the HP channel. Or it may be beneficial to drop a LP channel, e.g., to avoid impact on HP channel. A UE may determine the behavior according to pre-defined rules, or a semi-static configuration, or according to a dynamic indication. The UE may perform differently in step 2.2 when a UE is configured with simultaneous PUCCH and PUSCH transmission.

A NR UE may be configured with repetitions, e.g., for coverage. In this case, there could be both LP and HP UL channels with or without nominal repetition overlapping. The UE may determine the multiplexing or dropping according to the nominal repetition, and a UE may perform differently in step 2.1 and/or 2.2 when UE is configured with or without repetition.

In some embodiments, a UE can be configured with simultaneous PUCCH and PUSCH transmission, e.g., for inter-band carrier aggregation and for different priorities. And the UE is also configured with a dynamic indication for multiplexing and no multiplexing for different priorities.

In the following, if a UL channel is in serving cell X and another UL channel is in serving cell Y, and the serving cell X and Y operate in different bands, these two UL channels is not in the same serving cell group A. In other words, a serving cell group A has one or multiple UL serving cells within the same frequency band if a UE is configured with simultaneous PUCCH and PUSCH transmissions with different priorities for inter-band carrier aggregation.

If a UE is configured with simultaneous PUCCH and PUSCH transmission and is configured with dynamic indication for multiplexing and no multiplexing for different priorities, when a UE performs step 2.2, the UE resolves overlapping PUCCH/PUSCH transmission for different priorities according to at least one of the following methods.

1) If the UE identifies a PUCCH and an overlapped PUSCH with different priorities are not in the same serving cell group A, the dynamic indication for multiplexing/no multiplexing for the PUCCH and PUSCH does not apply. The UE transmits the PUCCH and PUSCH simultaneously.

Figure 7:
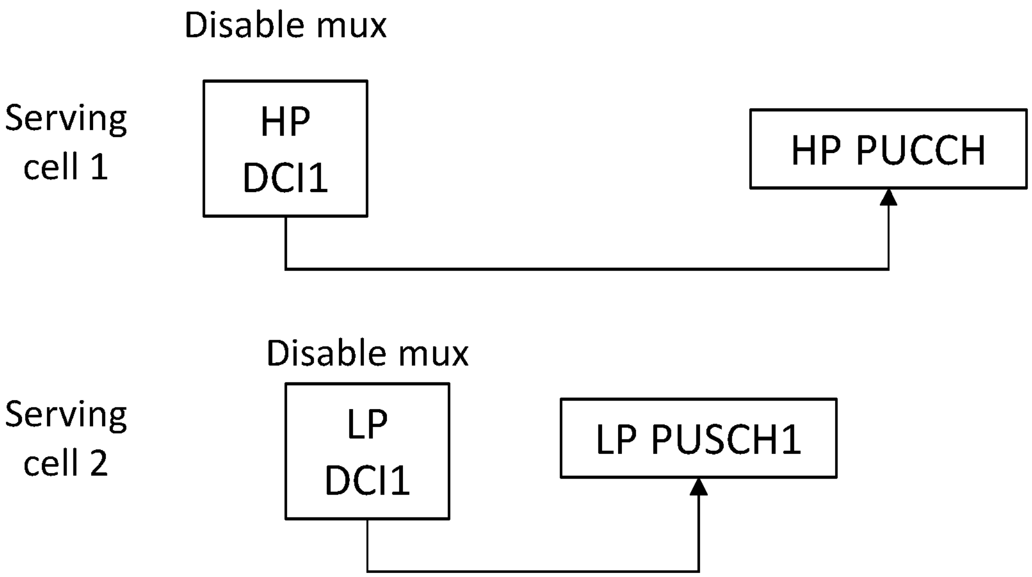
FIG. 7 illustrates a PUCCH and an overlapped PUSCH with different priorities in accordance with some embodiments.

FIG. 7 illustrates a PUCCH and an overlapped PUSCH with different priorities in accordance with some embodiments. For example, as shown in FIG. 7, the gNB transmits a HP PUCCH on serving cell 1 (CC1), and a LP PUSCH1 on CC2. These 2 CCs are in different bands. The DCI for these 2 channels indicates disabling multiplexing in each DCI. If the UE is configured with simultaneous transmission for PUSCH/PUCCH with different priorities in different bands, then the UE transmits both the HP PUCCH and LP PUSCH1 on serving cell 1 and serving cell 2 without relying on a dynamic indication. If the UE is not configured with simultaneous transmission for PUSCH/PUCCH with different priorities in different bands, then the UE drops LP PUSCH1 and transmits HP PUCCH according to a dynamic indication.

2) The UE does not expect DCIs to indicate multiplexing and to schedule overlapped PUSCH/PUCCH with different priorities not in the same serving cell group A.

3) If a PUCCH with priority i overlaps with a PUSCH with priority j, and the PUSCH is with a DCI with dynamic indication, the UE determines multiplexing or no multiplexing for overlapping PUCCH and PUSCH according to the dynamic indication, no matter the PUCCH and the PUSCH is in the same or different serving cell group A.

In one example, if a LP PUCCH overlaps with HP PUSCHs with DCI, the UE determines whether to multiplex and which HP PUSCH to be multiplexed onto according to the dynamic indication in the HP DCI.

In another example, if a HP PUCCH overlaps with LP PUSCHs with DCI, the UE determines whether to multiplex and which LP PUSCH to be multiplexed onto according to the dynamic indication in the LP DCI.

For example, the gNB transmits a HP PUCCH on serving cell 1 (CC1), and a LP PUSCH1 on CC2. The 2 CCs are in different bands. The DCI for these 2 channels indicates multiplexing in each DCI. Then, the UE multiplexes the HP UCI into the LP PUSCH1.

If a PUCCH with priority i overlaps with a PUSCH with priority j, and the PUSCH is without dynamic indication, and if the PUCCH and the PUSCH is not in the same serving cell A, the UE transmits the PUCCH and PUSCH simultaneously; otherwise, the UE may perform multiplexing according to a pre-defined rule.

In one embodiment, if a UE is configured to multiplex or cancel one or more of an overlapping PUCCH and PUSCH of different priorities by a higher layer signaling, e.g., RRC parameter UCI-MuxWithDifferentPriority, a UE may need to resolve the overlapping between PUCCH and PUSCH with different priorities in step 2.2. For example, the UE may multiplex a HP PUCCH HARQ-ACK onto a LP PUSCH, or a UE may drop a LP PUSCH if the LP PUSCH overlaps with a HP SR.

After step 2.1, if there are more than one LP PUSCH overlapping with a HP PUCCH with HP HARQ-ACK, a UE may select one of the LP PUSCH to carry the HP HARQ-ACK. For example, a UE chooses one of the LP PUSCH from a set X and/or a set M (the set X and set M is defined for each case and option as provided below) following the priorities (sequentially from high to low or potentially vice versa) as shown below:

First priority: PUSCH with aperiodic Channel State Information (A-CSI) that overlaps with the HP PUCCH.

Second priority: earliest PUSCH slot(s) based on the start of the slot(s).

If there are still multiple PUSCHs that overlap with the HP PUCCH in the earliest PUSCH slot(s), follow the following priorities (sequentially from high to low).

Third priority: Dynamic grant PUSCHs>Configured PUSCH.

Fourth priority: PUSCHs on serving cell with smaller serving cell index>PUSCHs on serving cell with larger serving cell index.

Fifth priority: Earlier PUSCH transmission>later PUSCH transmission.

It is noted that a LP PUSCH from LP PUSCHs that the HP PUCCH multiplexes with are in the same serving cell group A with the HP PUCCH. The serving cell group A has one or multiple UL serving cells, or one or multiple UL serving cells within the same frequency band if a UE is configured with simultaneous PUCCH and PUSCH transmission with different priorities for inter-band carrier aggregation.

Case 1: a LP PUSCH overlaps with one HP PUCCH with HP HARQ-ACK and at least one HP PUCCH with HP SR.

In one option, the set X includes LP PUSCHs overlapping with the HP PUCCH with HP HARQ-ACK, and the LP PUSCH does not overlap with a HP PUCCH resource for a SR, set Y includes LP PUSCHs overlapping with the HP PUCCH with HP HARQ-ACK. Set X is the subset of set Y.

If set X={Ø}, while set Y≠{Ø}, the UE drops the LP PUSCH(s) in set Y. The UE transmits the HP PUCCH with HARQ-ACK, and the UE transmits the HP PUCCH with a SR, if the SR is a positive SR (i.e., the value of the SR, which can be positive or negative, is positive). Or, the UE transmits the HP PUCCH with a HARQ-ACK, and the UE does not transmit the HP PUCCH with a SR, if the SR is negative SR.

If set X≠{Ø}, the UE selects one LP PUSCH from set X to multiplex HP HARQ-ACK onto. For example, the UE selects the LP PUSCH according to $1^{st}$-$5^{th}$ priorities discussed above.

Illustrative examples are shown in FIGS. 8A-8D. Each of FIG. 8A, 8B, 8C, 8D illustrates overlapping HP PUCCH and LP PUSCH in accordance with some embodiments.

Figure 8A:
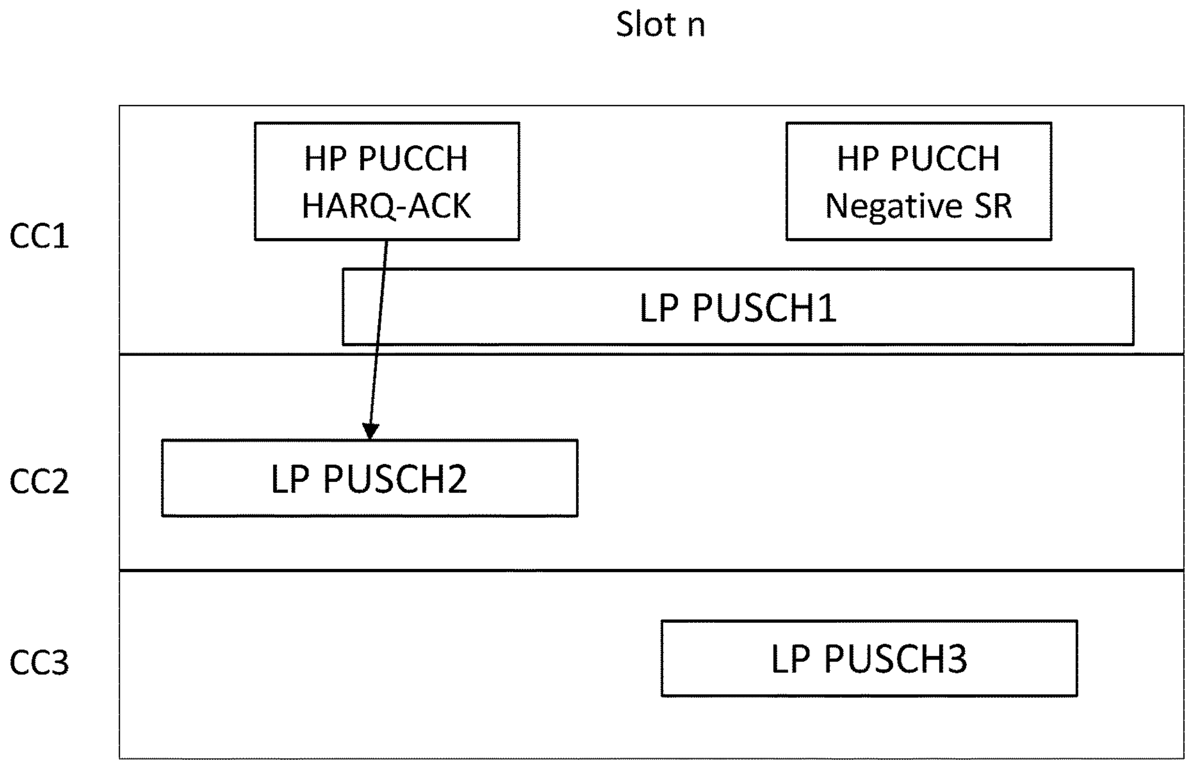
FIG. 8A illustrates an overlapping HP PUCCH and LP PUSCH in accordance with some embodiments.
Figure 8B:
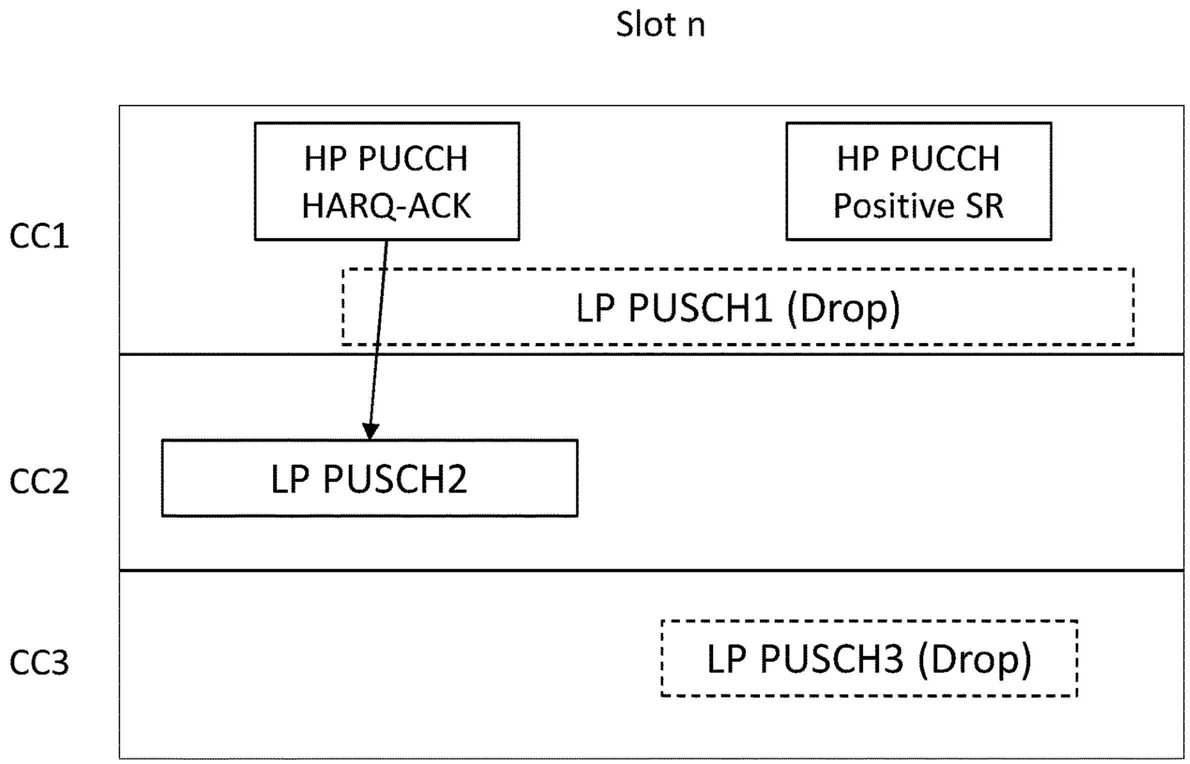
FIG. 8B illustrates an overlapping HP PUCCH and LP PUSCH in accordance with some embodiments.

In FIG. 8A, LP PUSCH1 and LP PUSCH2 is in set Y, and LP PUSCH2 is in set X. The UE selects LP PUSCH2 to multiplex the HP HARQ-ACK. LP PUSCH1 and LP PUSCH3 overlaps with the HP PUCCH for a negative SR, the UE also transmits LP PUSCH 1 and LP PUSCH 3. In FIG. 8B, LP PUSCH1 and LP PUSCH2 is in set Y, and LP PUSCH2 is in set X. The UE selects LP PUSCH2 to multiplex the HP HARQ-ACK. LP PUSCH1 and LP PUSCH3 overlaps with HP PUCCH for a positive SR, so the UE drops LP PUSCH 1 and LP PUSCH3 and transmits the HP PUCCH with the SR.

Figure 8C:
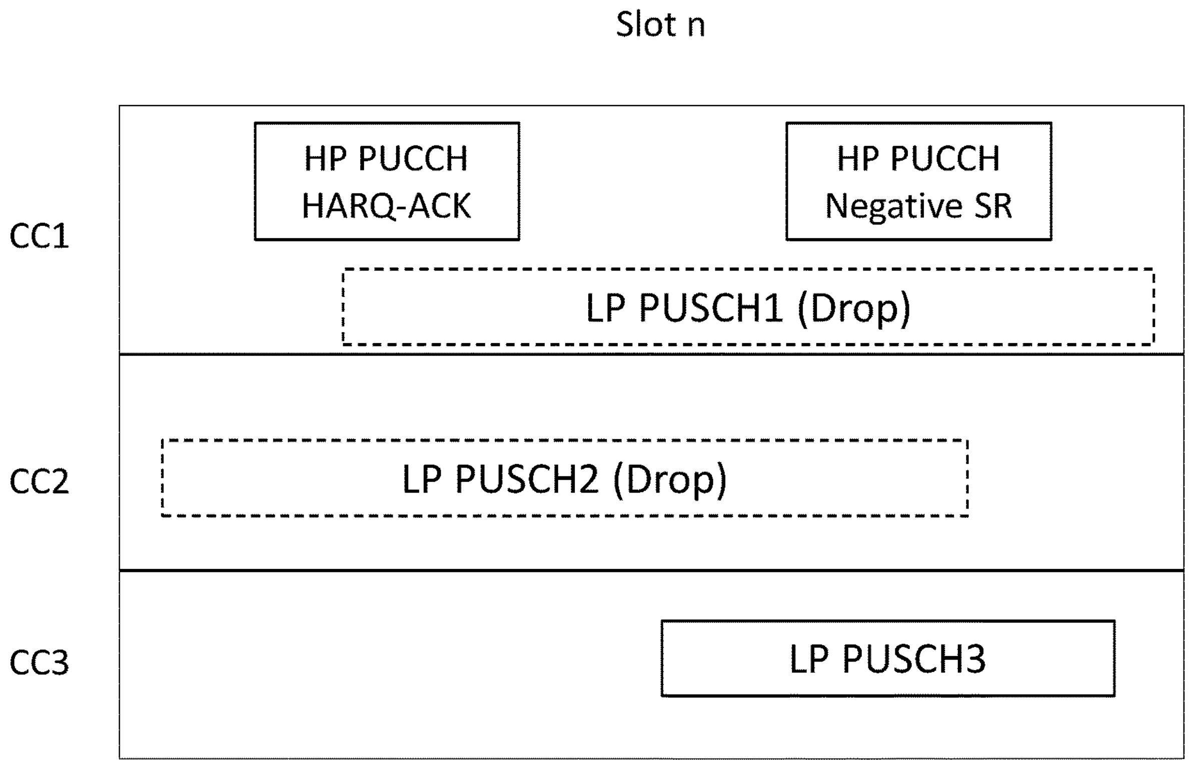
FIG. 8C illustrates an overlapping HP PUCCH and LP PUSCH in accordance with some embodiments.
Figure 8D:
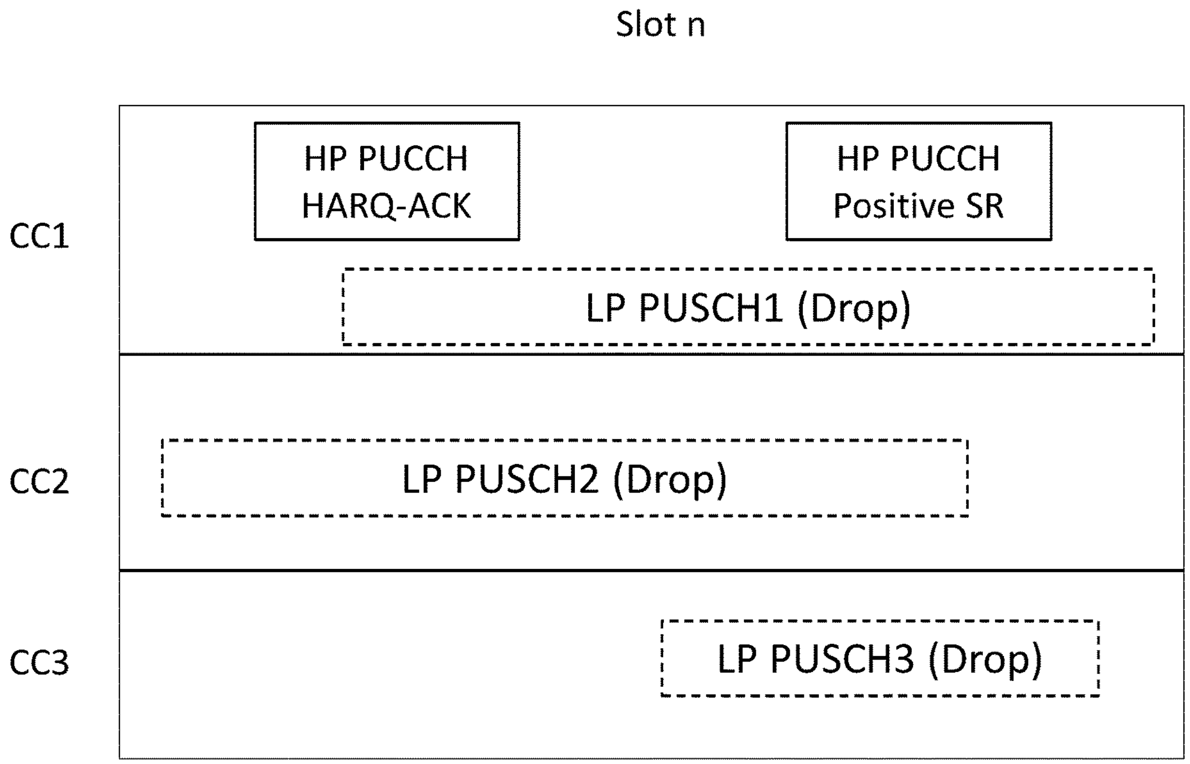
FIG. 8D illustrates an overlapping HP PUCCH and LP PUSCH in accordance with some embodiments.

In FIG. 8C, LP PUSCH1 and LP PUSCH2 is in set Y, and set X=Ø. The UE drops LP PUSCH1 and LP PUSCH2. The UE transmits the HP PUCCH HARQ-ACK. LP PUSCH3 overlaps with HP PUCCH for a negative SR, the UE also transmits LP PUSCH 3. In FIG. 8D, the UE drops LP PUSCH1 and LP PUSCH2. The UE transmits the HP PUCCH HARQ-ACK. LP PUSCH3 overlaps with the HP PUCCH for a positive SR, the UE also drops LP PUSCH 3 and transmits HP PUCCH with the SR.

In another option, the set X includes LP PUSCHs overlapping with the HP PUCCH with HP HARQ-ACK, and the LP PUSCH does not overlap with a HP PUCCH resource for a positive SR, set Y includes a LP PUSCH overlapping with the HP PUCCH with the HP HARQ-ACK. Set X is the subset of set Y.

If set X={Ø}, while set Y≠{Ø}, the UE drops the LP PUSCH(s) in set Y. The UE transmits the HP PUCCH with the HARQ-ACK, and the UE transmits the HP PUCCH with the SR.

If set X≠{Ø}, the UE selects one LP PUSCH from set X to multiplex HP HARQ-ACK onto. For example, the UE selects the LP PUSCH according to $1^{st}$-$5^{th}$ priorities discussed above.

Figure 9A:
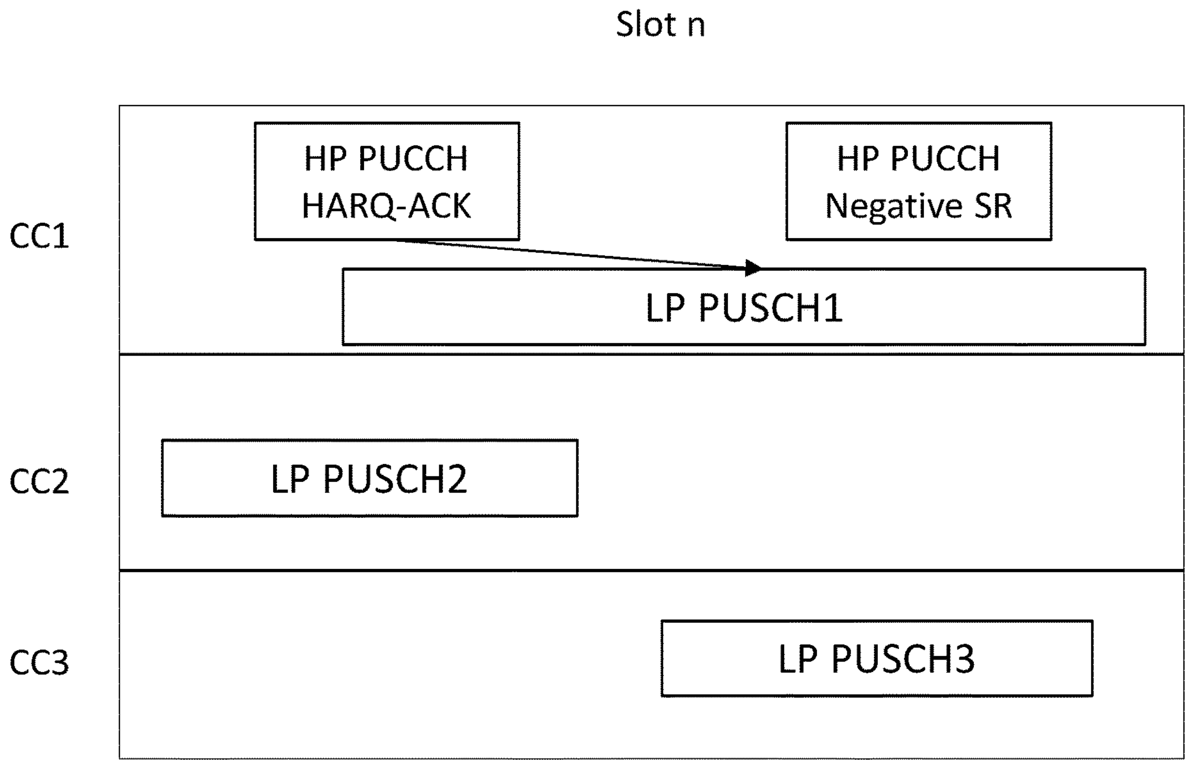
FIG. 9A illustrates an overlapping HP PUCCH and LP PUSCH in accordance with some embodiments.
Figure 9B:
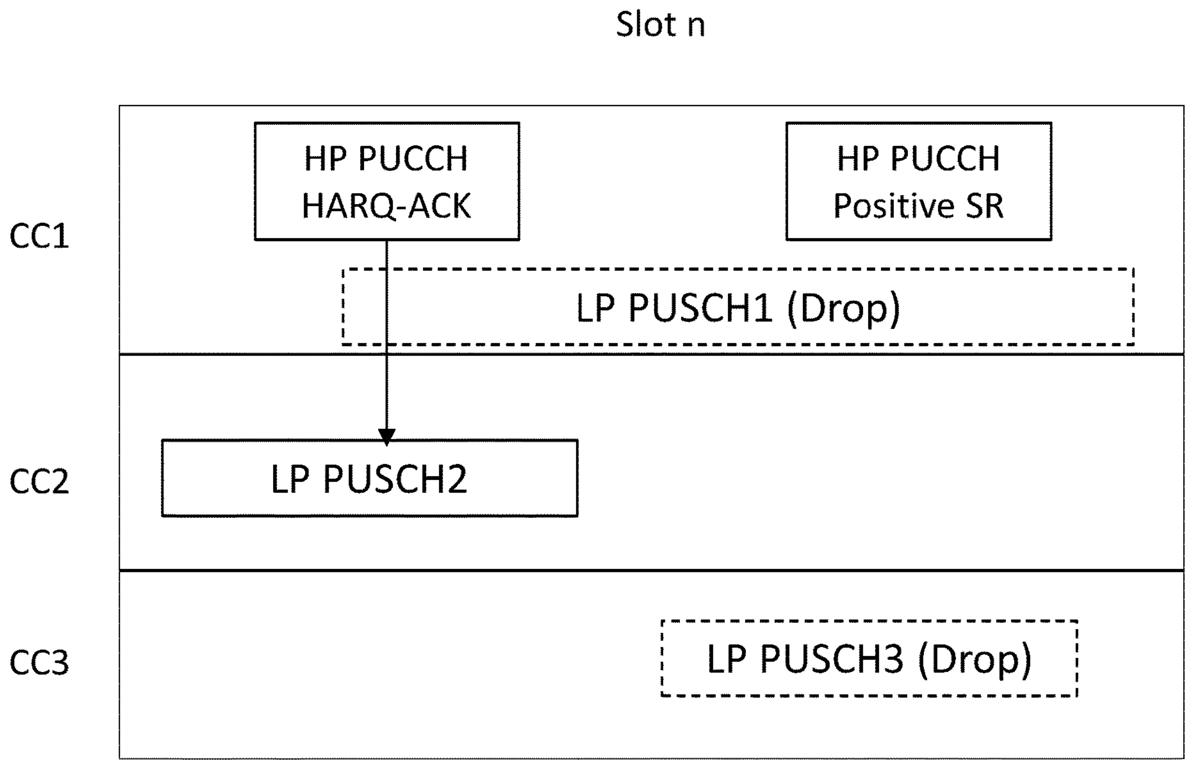
FIG. 9B illustrates an overlapping HP PUCCH and LP PUSCH in accordance with some embodiments.

Illustrative examples are shown in FIGS. 9A and 9B. FIG. 9A illustrates an overlapping HP PUCCH and LP PUSCH in accordance with some embodiments. FIG. 9B illustrates an overlapping HP PUCCH and LP PUSCH in accordance with some embodiments. In FIG. 9A, LP PUSCH1 and LP PUSCH2 are in set Y. LP PUSCH1 and LP PUSCH2 are also in set X, because no HP PUCCH with a positive SR overlaps with LP PUSCH1 or LP PUSCH 2. The UE selects one LP PUSCH from set X to multiplex the HP HARQ-ACK onto, e.g., LP PUSCH1 according to $1^{st}$-$5^{th}$ priorities discussed above. So, the UE transmits LP PUSCH1 with the HP PUCCH HARQ-ACK, LP PUSCH2 and LP PUSCH 3 respectively. In FIG. 9B, LP PUSCH1 and LP PUSCH2 is in set Y, and LP PUSCH2 is in set X. The UE selects LP PUSCH2 to multiplex the HP HARQ-ACK. LP PUSCH1 and LP PUSCH3 overlaps with HP PUCCH for a positive SR, so the UE drops LP PUSCH 1 and LP PUSCH3 and transmits the HP PUCCH with the SR.

In one example, if the HP PUCCH carries both the HP HARQ-ACK and HP SR, the UE does not multiplex the HP PUCCH onto an overlapping LP PUSCH, and the LP PUSCH(s) in set Y are dropped.

Alternatively, in case of the HP SR overlapping with the LP PUSCH, the LP PUSCH is not dropped. However, the HP SR is dropped, and the UE selects one of the LP PUSCHs from set Y to multiplex HP HARQ-ACK according to $1^{st}$-$5^{th}$ priorities discussed above.

Alternatively, in case of the HP PUCCH resource for the SR overlapping with the LP PUSCH, the LP PUSCH is not dropped. The HP SR information is multiplexed onto the HP PUSCH. And the UE selects one of the LP PUSCHs from set Y to multiplex the HP HARQ-ACK according to $1^{st}$~$5^{th}$ priorities discussed above, and then, the UE selects one of the LP PUSCHs from set Y' to multiplex the HP SR, where set Y' includes the LP PUSCH overlapping with the HP PUCCH with the HP SR.

Case 2: a LP PUSCH overlaps with more than one HP PUCCHs with HP HARQ-ACKs.

In another option, the set M includes LP PUSCHs overlapping with the HP PUCCH with a HP HARQ-ACK, and the LP PUSCHs do not overlap with another HP PUCCH resource for the HP HARQ-ACK, set N includes LP PUSCHs overlapping with the HP PUCCH with the HP HARQ-ACK. Set M is the subset of set N.

If set M≠{Ø}, while set N≠{Ø}, the UE drops the LP PUSCH(s) in set N. The UE transmits the HP PUCCHs with HARQ-ACKs.

If set M≠{Ø}, the UE selects one LP PUSCH from set M to multiplex the HP HARQ-ACK onto. For example, the UE selects the LP PUSCH according to $1^{st}$-$5^{th}$ priorities discussed above.

If a HP PUCCH with the HP HARQ-ACK overlaps with a LP PUSCH, and the HP PUCCH is not the $1^{st}$ HP PUCCH with the HP HARQ-ACK overlaps with the LP PUSCH in time domain, the previous HP PUCCHs with the HP HARQ-ACK overlapping with the LP PUSCH is not taken into account for determination of set N. The UE processes HP PUCCHs in time order.

Figure 10A:
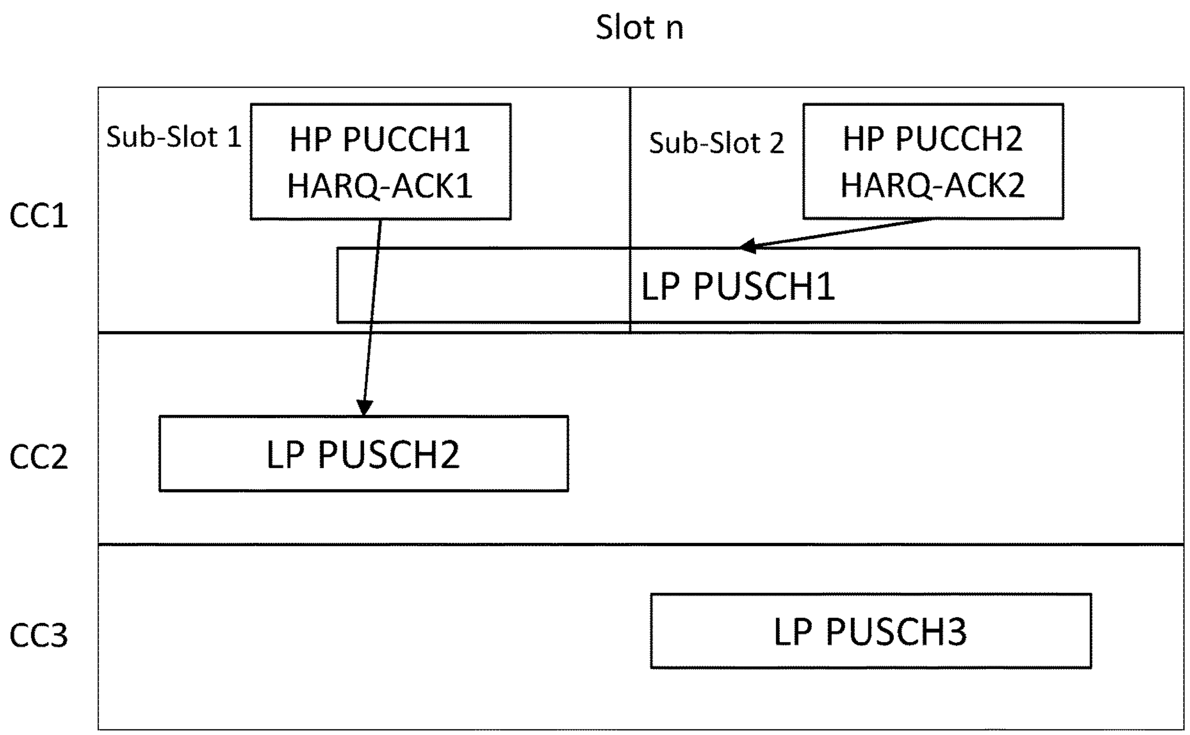
FIG. 10A illustrates overlapping HP PUCCHs and LP PUSCHs in accordance with some embodiments.
Figure 10B:
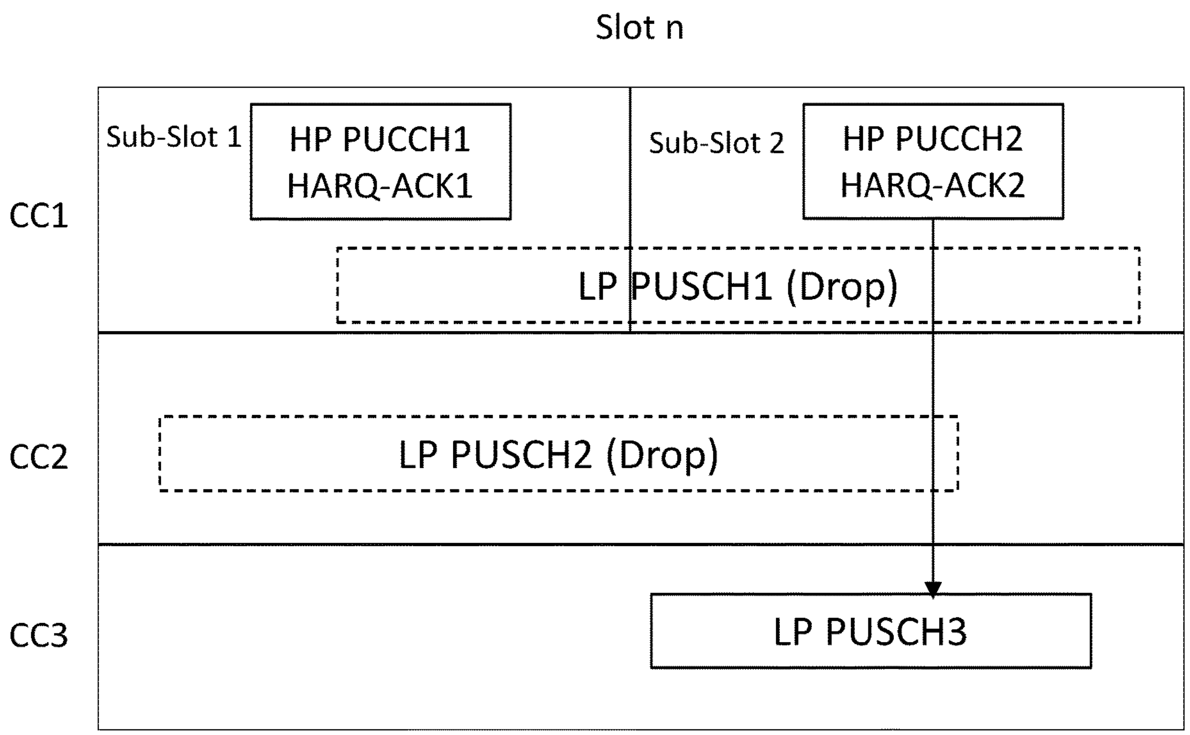
FIG. 10B illustrates an overlapping HP PUCCHs and LP PUSCHs in accordance with some embodiments.

FIG. 10A illustrates overlapping HP PUCCHs and LP PUSCHs in accordance with some embodiments. FIG. 10B illustrates an overlapping HP PUCCHs and LP PUSCHs in accordance with some embodiments. For example, as shown in FIG. 10A, for the case when HP PUCCH1, LP PUSCH2 and LP PUSCH 1 are in set M, LP PUSCH2 is in set N, the UE multiplexes the HP HARQ-ACK1 onto LP PUSCH2. Then, for HP PUCCH2, HP PUCCH1 is not taken into account. So, LP PUSCH1 and LP PUSCH3 are in set M and also in set N. The UE selects one LP PUSCH to multiplex HP PUCCH2, e.g., LP PUSCH1. Therefore, the UE transmits LP PUSCH1 with HP HARQ-ACK2, LP PUSCH2 with HP HARQ-ACK1, and LP PUSCH3. As shown in FIG. 10B, for HP PUCCH1, the set M={Ø}, while LP PUSCH 1 and LP PUSCH2 is in set N. In this case, a UE drops LP PUSCH1 and LP PUSCH2, while the UE transmits HP PUCCH1. Then, for HP PUCCH2, HP PUCCH1 is not taken into account. LP PUSCH3 is in set N and set M. The UE transmits LP PUSCH3 with HP HARQ-ACK2.

In another option, the set N includes LP PUSCHs overlapping with the HP PUCCH with the HP HARQ-ACK. The UE processes HP PUCCHs with HP HARQ-ACKs in time order. The UE selects one LP PUSCH from set L for a HP PUCCH at a time. If a LP PUSCH is already selected to multiplex a previous HP PUCCH with the HP HARQ-ACK, the LP PUSCH is not taken into account for determination of set N for next HP PUCCH. The UE does not expect set N={Ø} for a HP PUCCH, if there is a LP PUSCH overlapping with the HP PUCCH.

Figure 11A:
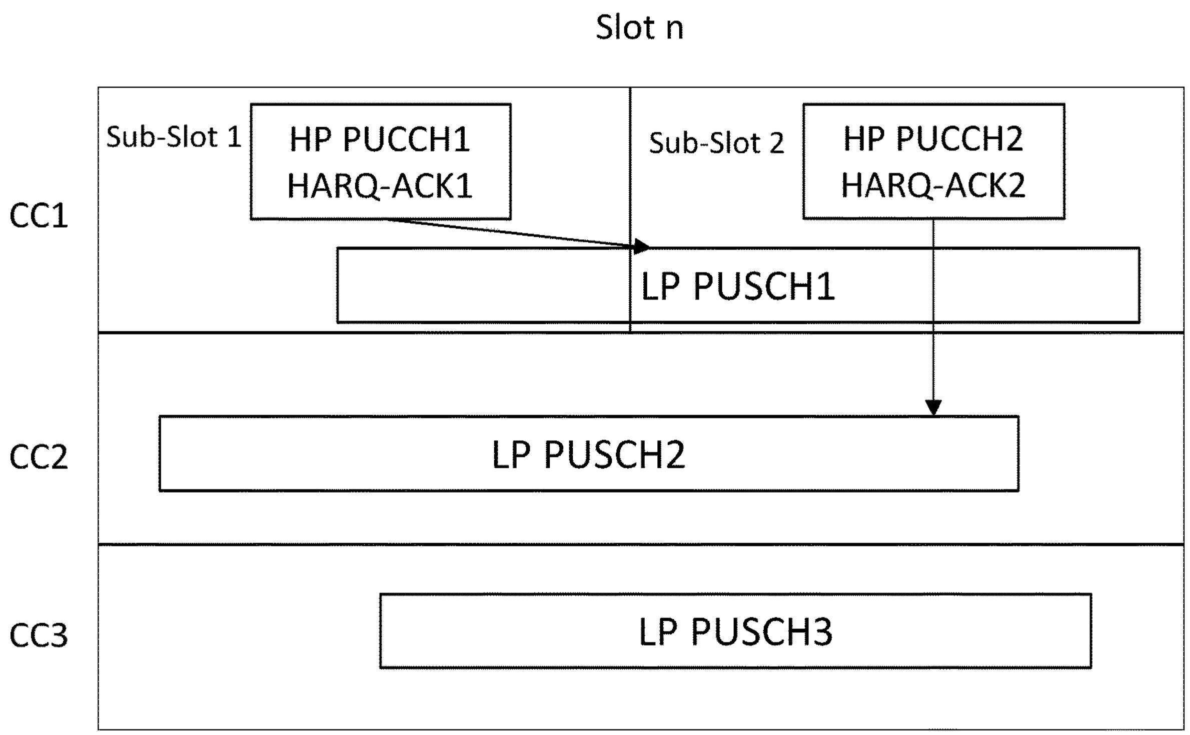
FIG. 11A illustrates HP PUCCHs with Hybrid Automatic Repeat Request Acknowledgment (HARQ-ACK) overlapping with LP PUSCHs in accordance with some embodiments.
Figure 11B:
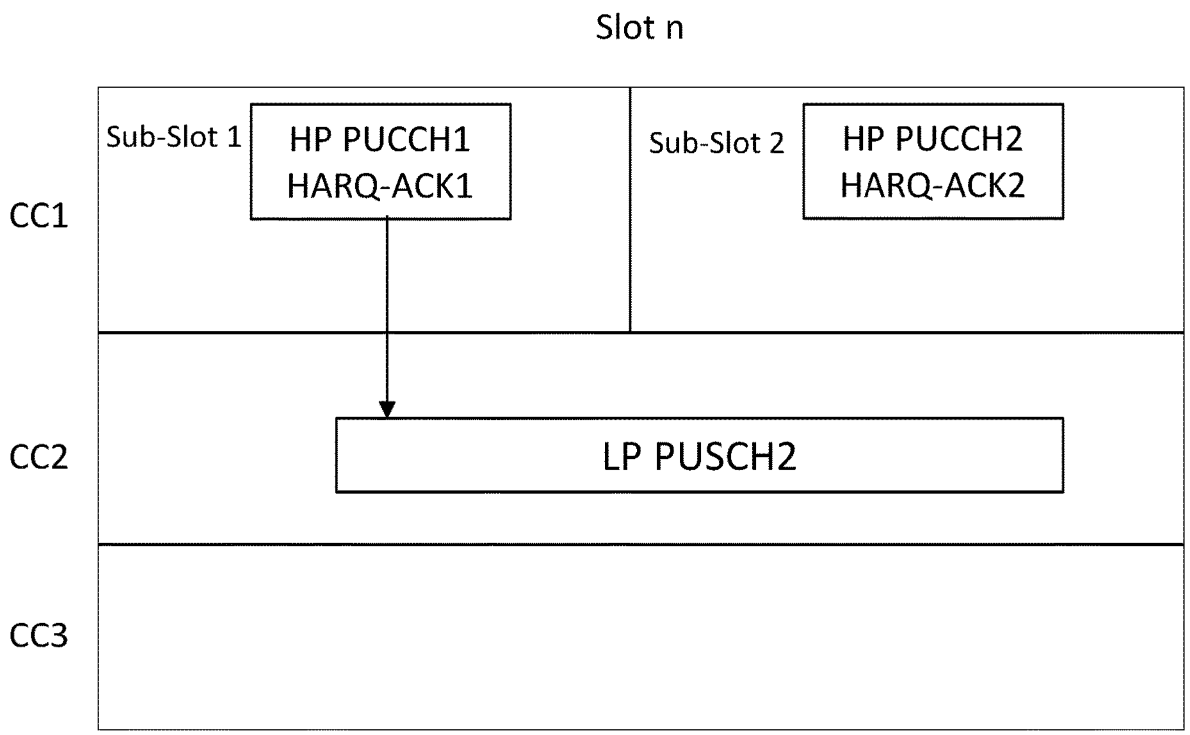
FIG. 11B illustrates HP PUCCHs with HARQ-ACK overlapping with LP PUSCHs in accordance with some embodiments.

FIG. 11A illustrates HP PUCCHs with HARQ-ACK overlapping with LP PUSCHs in accordance with some embodiments. FIG. 11B illustrates HP PUCCHs with HARQ-ACK overlapping with LP PUSCHs in accordance with some embodiments. In FIG. 11A, HP PUCCH1, LP PUSCH1 and LP PUSCH2 are in set N. The UE selects one LP PUSCH for HP HARQ-ACK1 from set N, i.e., LP PUSCH1. Then, for HP PUCCH2, LP PUSCH1 is excluded from set N. LP PUSCH2 and LP PUSCH 3 is in set N. The UE selects one LP PUSCH for HP HARQ-ACK2 from set N, i.e., LP PUSCH2. The UE transmits LP PUSCH1 with HP HARQ-ACK1, LP PUSCH2 with HP HARQ-ACK2 and LP PUSCH3.

In FIG. 11B, for HP PUCCH1, LP PUSCH2 is in set N. In this case, a UE selects LP PUSCH 2 for HP HARQ-ACK1 from set N. However, LP PUSCH 2 is not included in set N for HP PUCCH2. So, set N=Ø for HP PUCCH2, but LP PUSCH2 overlaps with the HP PUCCH2. Therefore, this is an error case.

If a UE is configured with only one UL CC, the options described above can be applied with the assumption of single CC.

In above case 1 and case 2, if a LP PUSCH would be dropped if the LP PUSCH overlaps with a HP PUSCH or with a HP PUCCH for positive SR, the LP PUSCH can be dropped firstly, and then the UE resolves the overlap between the LP PUSCH and HP PUCCH with HARQ-ACK according to options in case 1 and case 2. For example, if a LP PUSCH overlaps with more than one HP PUCCH with HARQ-ACK and at least one HP PUCCH with positive SR, the UE first removes the LP PUSCH. The UE then determines set X according to one of the options for case 1, the UE next sets set N=set X, and the UE subsequently applies one of the options for case 2 to select the LP PUSCH for multiple HP PUCCHs. For example, the UE determines set M out of set N, and selects the LP PUSCH accordingly from set M.

Alternatively, if a HP PUCCH with SR overlaps with a LP PUSCH, the HP SR is dropped. Then, if a LP PUSCH overlaps with more than one HP PUCCH with HARQ-ACK and at least one HP PUCCH with SR, the UE applies one of the options for case 2 to select a LP PUSCH for HP PUCCHs with HARQ-ACKs.

To reduce latency, the UE can prioritize the LP PUSCH that ends within Ns symbols of the overlapped HP PUCCH or the LP PUSCH that ends at or before the HP PUCCH. For example, a UE chooses one of the LP PUSCH from a set R, following the priorities (sequentially from high to low) as shown below:

First priority: LP PUSCH with A-CSI that overlaps with the HP PUCCH.

Second priority: LP PUSCH that ends within Ns symbols of the overlapped HP PUCCH at or before the end of HP PUCCH.

Third priority: earliest LP PUSCH slot(s) based on the start of the slot(s).

If there are still multiple LP PUSCHs overlap with the HP PUCCH in the earliest PUSCH slot(s), follow the following priorities (sequentially from high to low):

Fourth priority: Dynamic grant PUSCHs>Configured PUSCH.

Fifth priority: PUSCHs on serving cell with smaller serving cell index>PUSCHs on serving cell with larger serving cell index.

Sixth priority: Earlier PUSCH transmission>later PUSCH transmission.

For another example, a UE chooses one of the LP PUSCH following the priorities (sequentially from high to low) as shown below:

First priority: LP PUSCH which ends within Ns symbols of the overlapped HP PUCCH at or before the end of HP PUCCH.

Second priority: LP PUSCH with A-CSI which overlaps with the HP PUCCH.

Third priority: earliest LP PUSCH slot(s) based on the start of the slot(s).

If there are still multiple LP PUSCHs overlap with the HP PUCCH in the earliest PUSCH slot(s), follow the following priorities (sequentially from high to low):

Fourth priority: Dynamic grant PUSCHs>Configured PUSCH.

Fifth priority: PUSCHs on serving cell with smaller serving cell index>PUSCHs on serving cell with larger serving cell index.

Sixth priority: Earlier PUSCH transmission>later PUSCH transmission.

The UE does not expect a chosen LP PUSCH would be cancelled due to overlapping with other HP PUCCH or HP PUSCH.

The set R can include LP PUSCHs overlapped with the HP PUCCH. For example, the set R can be set X and/or set M for case 1 and case 2 above.

Alternatively, the set X or set M only include the PUSCH that ends at or before the overlapped HP PUCCH. Similarly, if set X or set M={Ø}, while set Y or set N≠{Ø}, the UE drops the LP PUSCH(s) in set Y or set N. The UE transmits the HP PUCCHs.

In one embodiment, if a UE is configured to multiplex or cancel one or more of overlapping PUCCH and PUSCH of different priorities by a higher layer signaling, e.g., RRC parameter UCI-MuxWithDifferentPriority, a UE may assume timeline type A, e.g., Rel-15 timeline as captured in section 9.2.5 in TS 38.213 v15.x.x for multiplexing and cancellation. In the following, such a UE is denoted as a capability #1 UE.

For some cases, a UE may assume timeline type B, which supports PUCCH/PUSCH with different priorities for multiplexing with timeline type A, while cancellation with timeline type B, e.g., rel-16 timeline for prioritization for different priorities captured in section 9 in TS 38.213 V16.x.x. In the following, such a UE is denoted as a capability #3 UE. If a UE is configured to multiplex or cancel one or more of overlapping PUCCH and PUSCH of different priorities by a higher layer signaling, or, if a UE is configured to multiplex or cancel one or more of overlapping PUCCH and PUSCH of different priorities by a higher layer signaling and the UE does not indicate the capability #3, the UE performs PUCCH/PUSCH with different priorities for multiplexing or cancellation with timeline type A. The UE resolves the overlap between one LP PUSCH with two HP UL channels or one LP PUSCH with at least one HP PUSCH, according to at least one of the following mechanisms:

1) If a LP PUSCH overlaps with at least one HP PUSCH in the same serving cell, the UE performs the cancellation of the LP PUSCH before step 1. Alternatively, the UE performs the cancellation of the LP PUSCH after step 1 and before step 2.2.

2) If a LP PUSCH is chosen to multiplex between the HP PUCCH and the LP PUSCH, and the LP PUSCH overlaps with more than one HP PUCCH in the same serving cell group A, and the HP PUCCHs are non-overlapped with each other, the UE performs the cancellation of the LP PUSCH before step 1. Alternatively, the UE performs the cancellation of the LP PUSCH after step 1 and before step 2.2.

3) If a LP PUSCH is chosen to perform multiplexing between the HP PUCCH and the LP PUSCH, and the LP PUSCH overlaps with more than one HP PUCCH with HARQ-ACKs in the same serving cell group A, the UE performs the cancellation of the LP PUSCH before step 1. Alternatively, the UE performs the cancellation of the LP PUSCH after step 1 and before step 2.2.

4) If a LP PUSCH is chosen to perform multiplexing between the HP PUCCH and the LP PUSCH, and the LP PUSCH overlaps with more than one HP PUCCH in the same serving cell group A and the HP PUCCHs are non-overlapped with each other, the UE does not expect the LP PUSCH is scheduled by a DCI. In other words, a UE does not expect to be scheduled to transmit a LP PUSCH that would overlap with more than one HP PUCCH. If the LP PUSCH is a CG PUSCH, the UE drops the LP CG PUSCH according to (2) or (3).

5) If a LP PUSCH is chosen to perform multiplexing between the HP PUCCH and the LP PUSCH, and the LP PUSCH overlaps with more than one HP PUCCH with HARQ-ACKs in the same serving cell group A, the UE does not expect the LP PUSCH is scheduled by a DCI. In other words, a UE does not expect to be scheduled to transmit a LP PUSCH that would overlap with more than one HP PUCCH with HARQ-ACKs. If the LP PUSCH is a CG PUSCH, the UE drops the LP CG PUSCH according to (2) or (3).

6) If a LP PUSCH is chosen to perform multiplexing between the HP PUCCH and the LP PUSCH, and the LP PUSCH overlaps with one HP PUCCH with HARQ-ACK in the same serving cell group A and a HP PUSCH in the same serving cell, and the HP PUCCH and HP PUSCH are non-overlapped with each other, the UE does not expect the LP PUSCH is scheduled by a DCI. In other words, a UE does not expect to be scheduled to transmit a LP PUSCH that would overlap with at least one HP PUCCH with HARQ-ACK and one HP PUSCH. If the LP PUSCH is a CG PUSCH, the UE drops the LP CG PUSCH according to (1) or (2) or (3).

Figure 12A:
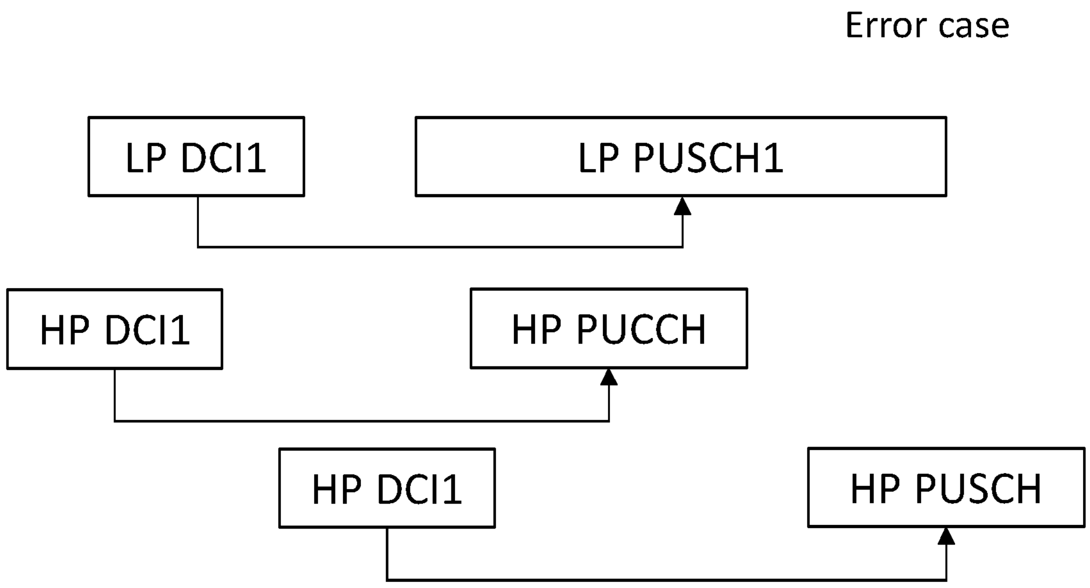
FIG. 12A illustrates multiplexing/cancellation in accordance with some embodiments.

7) If a LP PUSCH is chosen to perform multiplexing between the HP PUCCH and the LP PUSCH, and the LP PUSCH overlaps with one HP PUCCH with HARQ-ACK in the same serving cell group A and a HP PUSCH with DCI in the same serving cell, and the HP PUCCH and HP PUSCH are non-overlapped with each other, the UE does not expect the LP PUSCH is scheduled by a DCI. FIG. 12A illustrates multiplexing/cancellation in accordance with some embodiments. In other words, a UE does not expect to be scheduled to transmit a LP PUSCH that would overlap with at least one HP PUCCH with HARQ-ACK and one HP PUSCH with DCI, as shown in FIG. 12A.

Figure 12B:
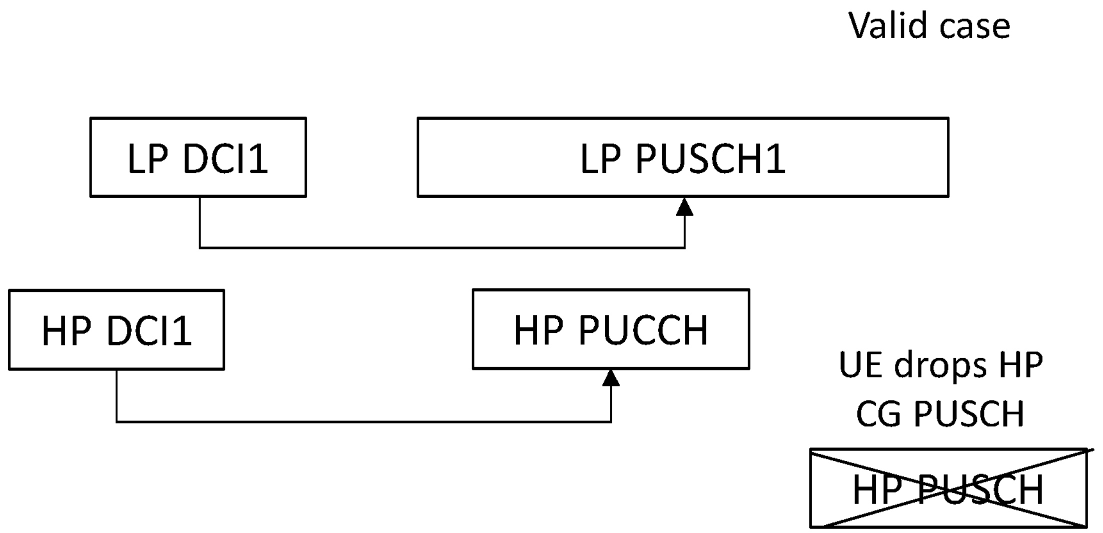
FIG. 12B illustrates multiplexing/cancellation in accordance with some embodiments.

FIG. 12B illustrates multiplexing/cancellation in accordance with some embodiments. If the LP PUSCH is scheduled by a DCI, the LP PUSCH overlaps with one HP PUCCH with HARQ-ACK, the LP PUSCH can overlap with a HP CG PUSCH occasion, and as shown in FIG. 12B, a UE cannot transmit the HP CG PUSCH, e.g., MAC PDU for a HP CG PUSCH is not generated. In this case, the UE multiplexes the HP HARQ-ACK onto the LP PUSCH.

Figure 12C:
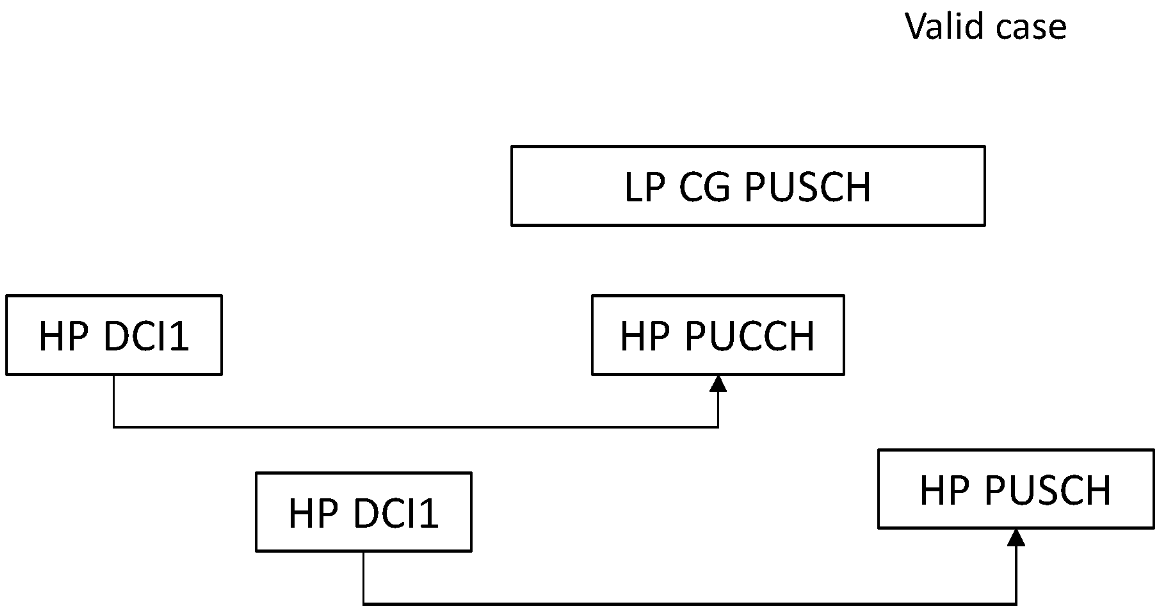
FIG. 12C illustrates multiplexing/cancellation in accordance with some embodiments.

FIG. 12C illustrates multiplexing/cancellation in accordance with some embodiments. If the LP PUSCH is a CG PUSCH, the UE drops the LP CG PUSCH according to (1) or (2) or (3), as shown in FIG. 12C.

If both the LP PUSCH and HP PUSCH are CG PUSCHs, the UE only expects to receive one MAC PDU, or the UE behavior is unspecified.

If a UE is configured with PUCCH/PUSCH with different priorities for multiplexing or cancellation enabled/disabled by DCI by high-layer signaling, e.g., RRC parameter dynaIndicationOfCrossPriMux, and a UE indicates the capability #3, the UE performs PUCCH/PUSCH with different priorities for multiplexing with timeline type A, and the UE performs PUCCH/PUSCH with different priorities for cancellation with timeline type B. The UE resolves the overlap between one LP PUSCH with two HP UL channels or one LP PUSCH with at least one HP PUSCH, according to at least one of the following mechanisms:

1) If a LP PUSCH overlaps with at least one HP PUSCH in the same serving cell, the UE performs the cancellation of the LP PUSCH before step 1. Alternatively, the UE performs the cancellation of the LP PUSCH after step 1 and before step 2.2.

Alternatively, the UE performs the cancellation of the LP PUSCH after step 2. If the LP PUSCH after step 2 carries HP UCI, the UE drops HP UCI together with the LP PUSCH, and transmits the HP PUSCH.

2) If a LP PUSCH overlaps with more than one HP PUCCH in the same serving cell group A and the HP PUCCHs are non-overlapped with each other, the UE performs the cancellation of LP PUSCH before step 1. Alternatively, the UE performs the cancellation of LP PUSCH after step 1 and before step 2.2.

Figure 13:
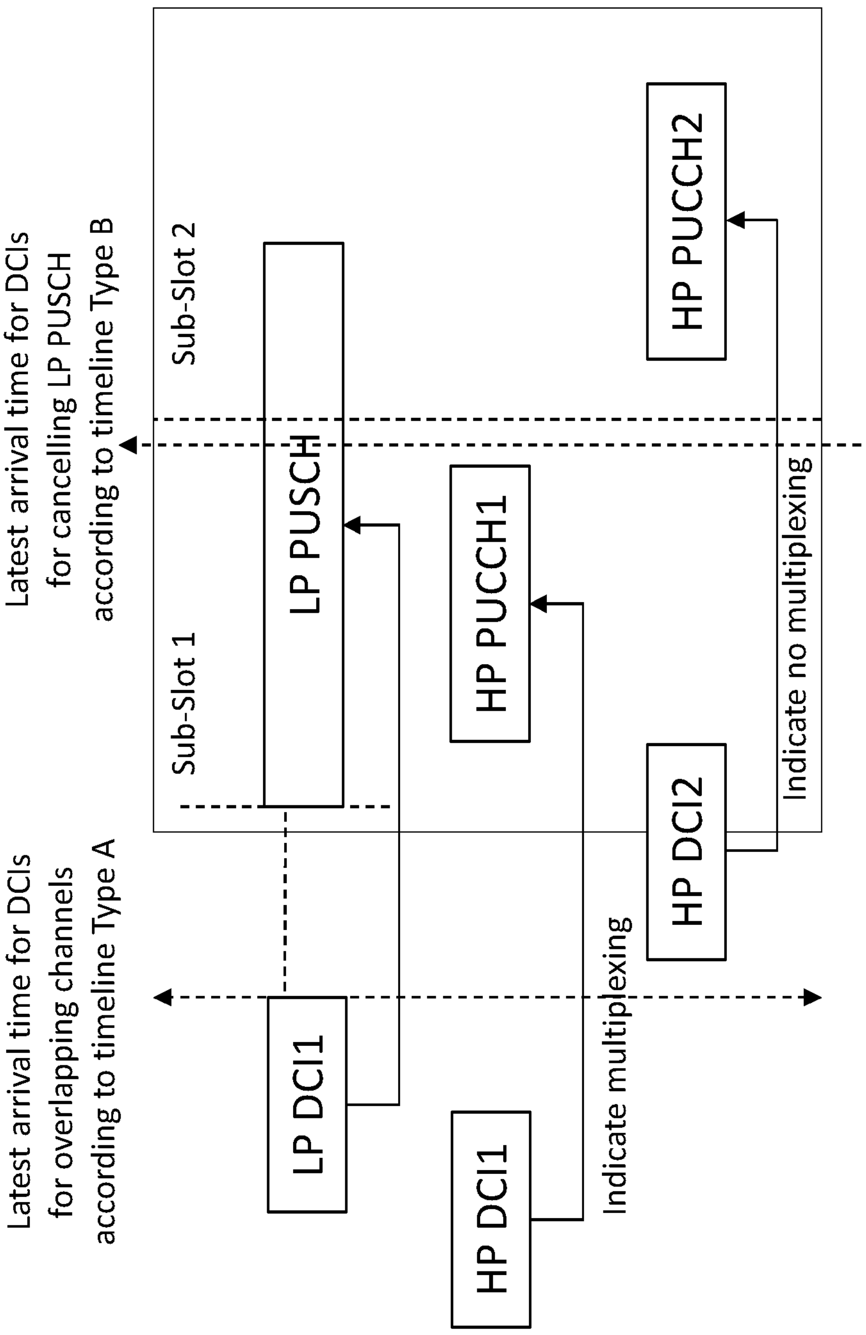
FIG. 13 illustrates dropping of a LP PUSCH in accordance with some embodiments.

Alternatively, the UE performs the cancellation of the LP PUSCH in step 2.2. The UE resolves overlapping between the HP PUCCH and LP PUSCH for each HP PUCCH in time order. If the UE multiplexes an earlier HP PUCCH onto the LP PUSCH in step 2.2, when the UE processes a later HP PUCCH overlapping with the same LP PUSCH, the UE drops the HP UCI together with the LP PUSCH, and transmits the later HP PUCCH. FIG. 13 illustrates dropping of a LP PUSCH in accordance with some embodiments. In FIG. 13, the UE receives a HP DCI2 indicating no multiplexing and the DCI comes later than the deadline for timeline Type A but before the deadline for timeline Type B. The UE drops the LP PUSCH with HP UCI1.

1) If a LP PUSCH overlaps with at least one HP PUCCH and another HP PUCCH in the same serving cell group A or a PUSCH later in the same serving cell and the HP PUCCH/PUSCHs are non-overlapped with each other, the UE does not expect the earlier HP PUCCH carries the HP HARQ-ACK. In other words, if there is an earlier PUCCH carrying the HARQ-ACK overlapping with a LP PUSCH, the UE does not except another HP PUCCH or HP PUSCH later overlapping with the LP PUSCH and the HP PUCCH/PUSCHs are non-overlapped with each other.

2) If a LP PUSCH overlaps with more than one HP PUCCHs in the same serving cell group A, or overlaps with one HP PUCCH in the same serving cell group A and a HP PUSCH in the same serving cell, and the HP PUCCH/PUSCHs are non-overlapped with each other, and if the UE already identifies the more than one HP PUCCHs, or the one HP PUCCH and the HP PUSCH, e.g., by receiving the DCI before the UE starts processing in step 2.2, the UE first drops the LP PUSCH before resolving overlapping PUCCH/PUSCH with different priorities in step 2.2, if any. Otherwise, if the UE has not identified any HP PUCCH or HP PUSCH that would cancel the LP PUSCH, the UE handles the LP PUSCH in step 2.2. If a LP PUSCH with the HP UCI after step 2.2 overlaps with another HP PUCCH or HP PUSCH, the UE drops the LP PUSCH with the HP UCI.

Figure 14A:
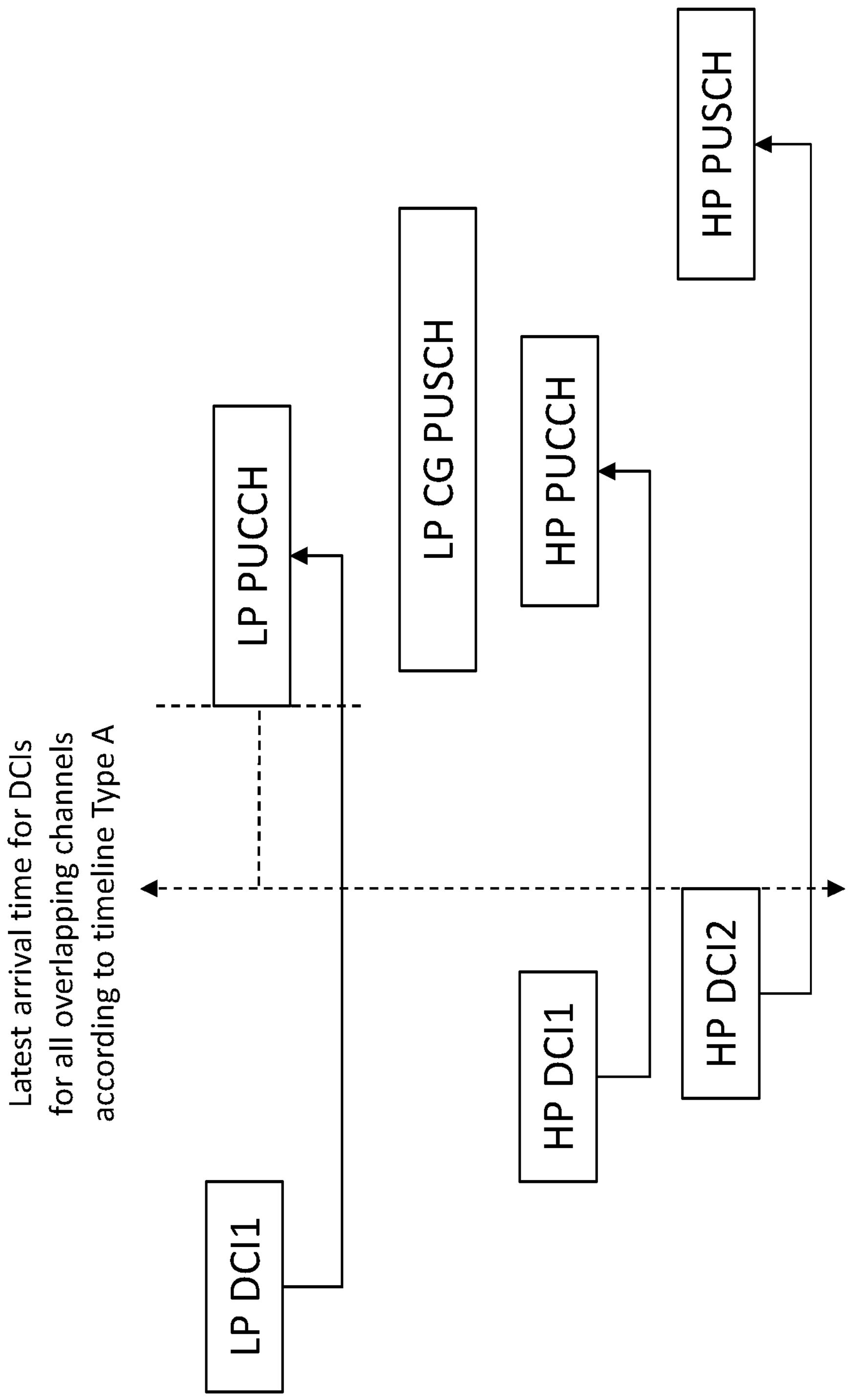
FIG. 14A illustrates multiplexing/cancellation in accordance with some embodiments.
Figure 14B:
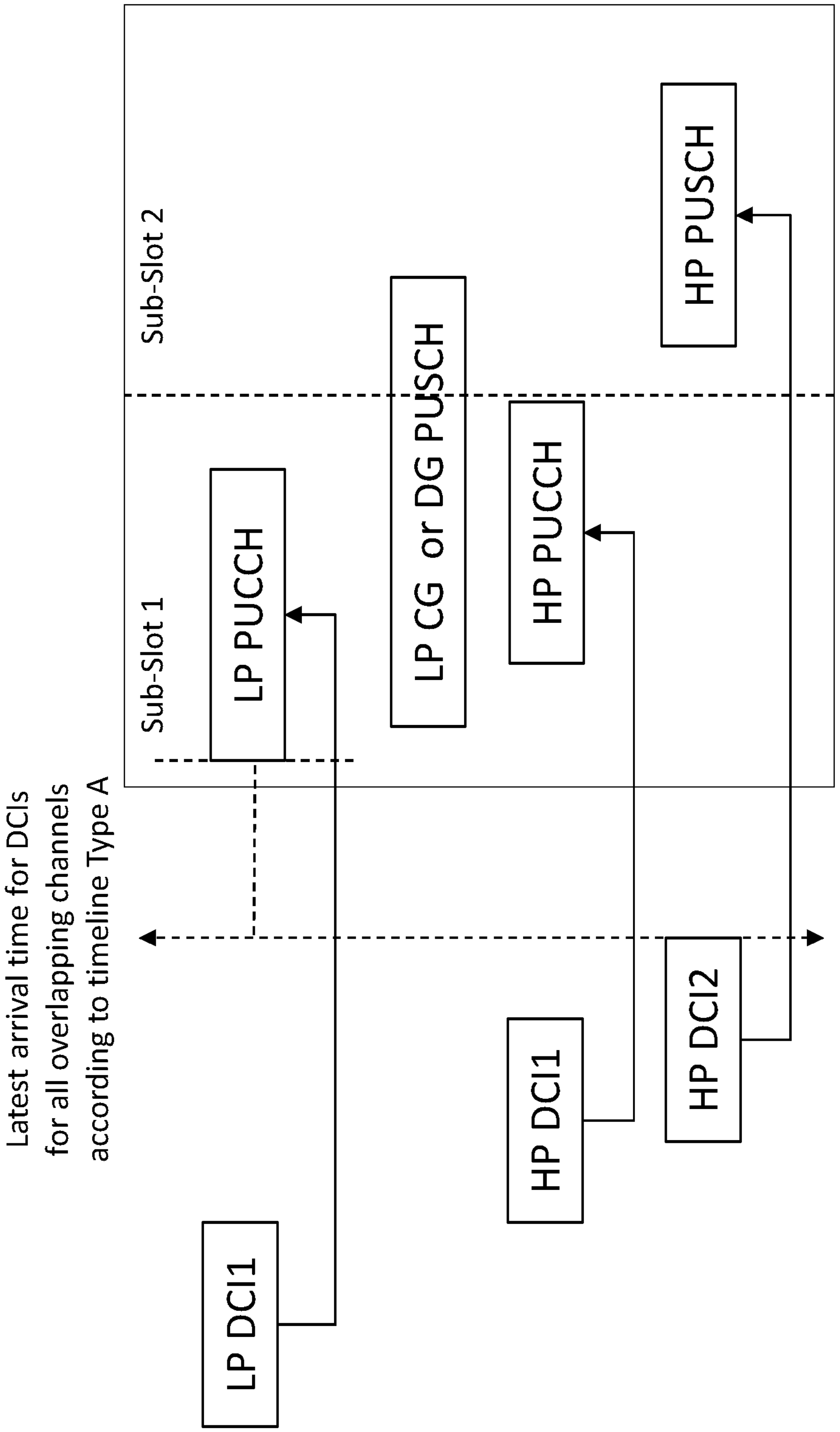
FIG. 14B illustrates multiplexing/cancellation in accordance with some embodiments.

FIG. 14A illustrates multiplexing/cancellation in accordance with some embodiments. FIG. 14B illustrates multiplexing/cancellation in accordance with some embodiments. In one example, if a UE performs the cancellation of the LP PUSCH before step 1, a UE expects the DCI for the overlapped HP PUSCH, or the DCI for the overlapped HP PUCCH, or MAC PDU for the overlapped HP CG PUSCH, to satisfy timeline Type A among all overlapping channels for LP and HP. This is shown in FIGS. 14A and 14B.

Figure 14C:
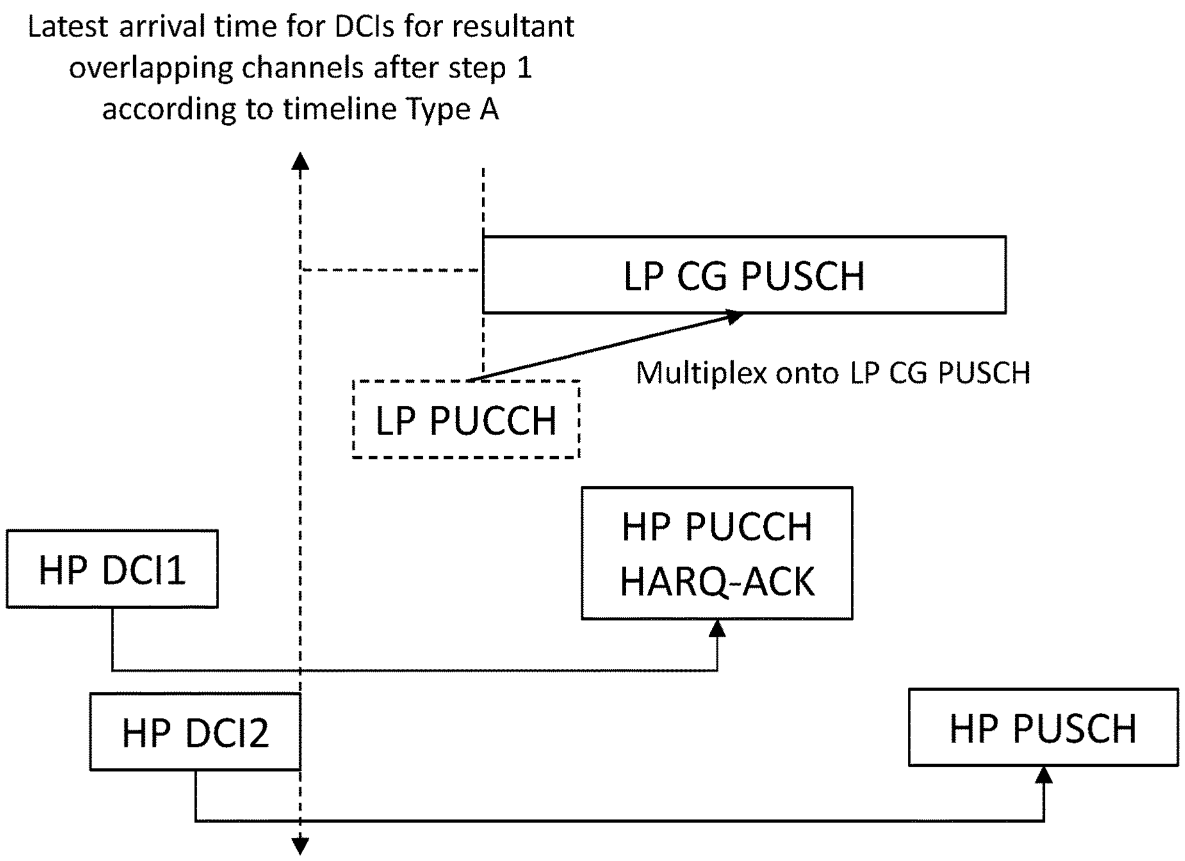
FIG. 14C illustrates multiplexing/cancellation in accordance with some embodiments.

In one example, if a UE performs the cancellation of the LP PUSCH after step 1 and before step 2.2, the UE expects the DCI for the overlapped HP PUSCH, or DCI for the overlapped HP PUCCH, or MAC PDU for the overlapped HP CG PUSCH, to satisfy timeline Type A among all overlapping resultant channels for LP and HP after step 1, or after step 2.1. FIG. 14C illustrates multiplexing/cancellation in accordance with some embodiments. As shown in FIG. 14C, the LP PUCCH may start earlier than the LP CG PUSCH. In step 1, the LP PUCCH multiplexes onto the LP CG PUSCH. The resultant channel in step 1 for LP is the LP CG PUSCH. Then, the HP DCI1 for the HP PUCCH should come before the deadline for multiplexing the HP PUCCH and LP CG PUSCH with timeline Type A. The HP DCI2 for the HP PUSCH should also come before the deadline with timeline type A to cancel the LP CG PUSCH, so the UE transmits HP PUCCH and HP PUSCH.

In another example, if a UE performs the cancellation of LP PUSCH before step 2 or step 2.2, the UE expects the DCI for the overlapped HP PUSCH, or DCI for the overlapped HP PUCCH, or MAC PDU for the overlapped HP CG PUSCH, to satisfy timeline Type A among all overlapping resultant channels for LP and HP after step 1, or after step 2.1, if a HP UCI would multiplex onto the LP PUSCH in step 2.2, otherwise, timeline type B should be satisfied.

Figure 14D:
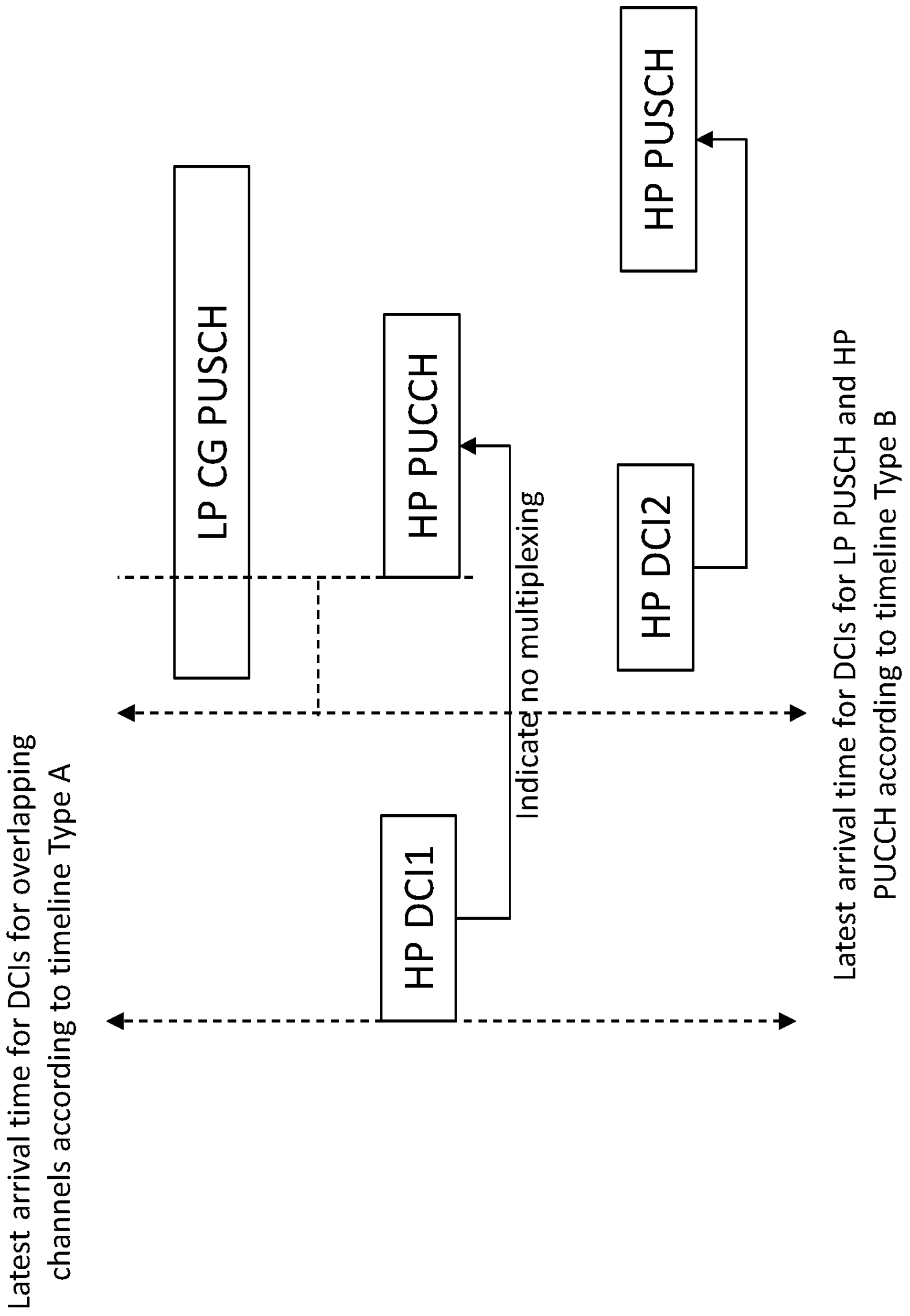
FIG. 14D illustrates multiplexing/cancellation in accordance with some embodiments.

FIG. 14D illustrates multiplexing/cancellation in accordance with some embodiments. As shown in FIG. 14D, the HP DCI1 indicates no multiplexing, and the UE cancels the LP PUSCH in step 2.2. Therefore, the HP DCI1 and HP DCI2 does not need to satisfy timeline Type A, while the HP DCI1 should satisfy timeline for Type B to cancel the LP PUSCH.

In one example, if a UE performs the cancellation of the LP PUSCH after step 1, or after step 2, the UE expects the DCI for the overlapped HP PUSCH, or DCI for the overlapped HP PUCCH, or MAC PDU for the overlapped HP CG PUSCH, to satisfy timeline Type B among the LP PUSCH and HP PUCCH, or LP PUSCH and HP PUSCH.

Figure 14E:
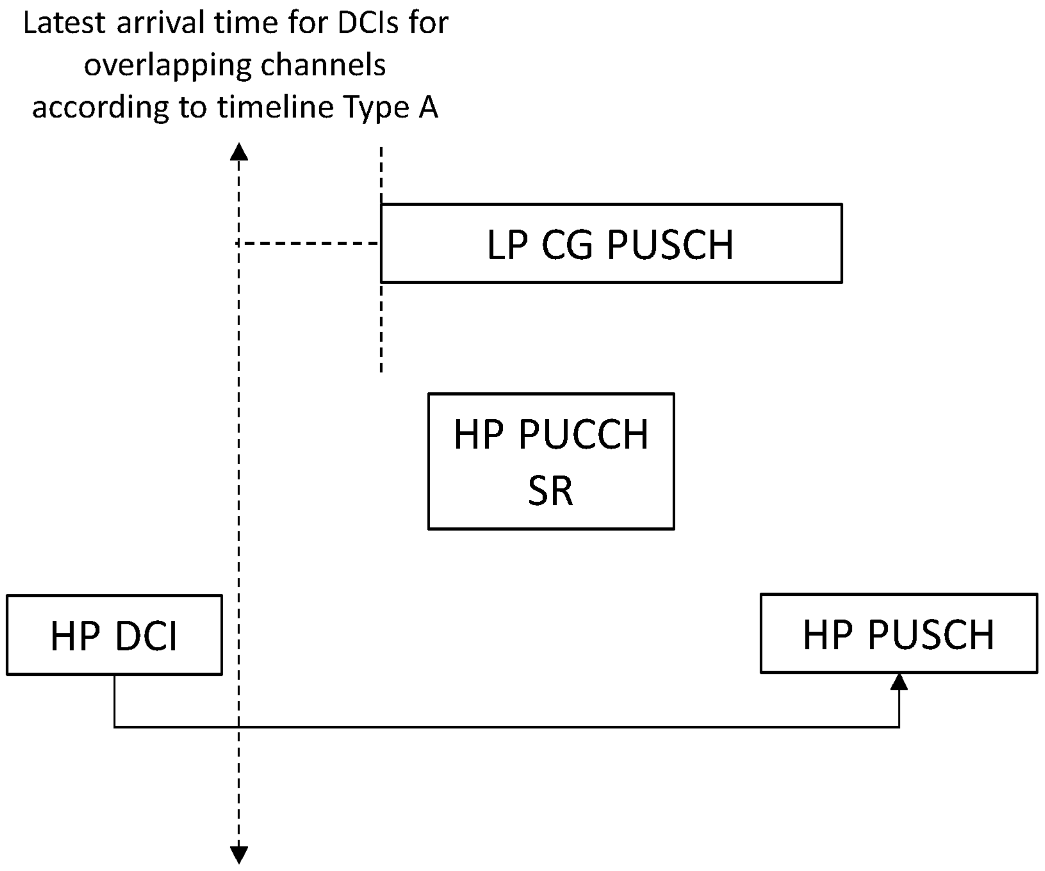
FIG. 14E illustrates multiplexing/cancellation in accordance with some embodiments.
Figure 14F:
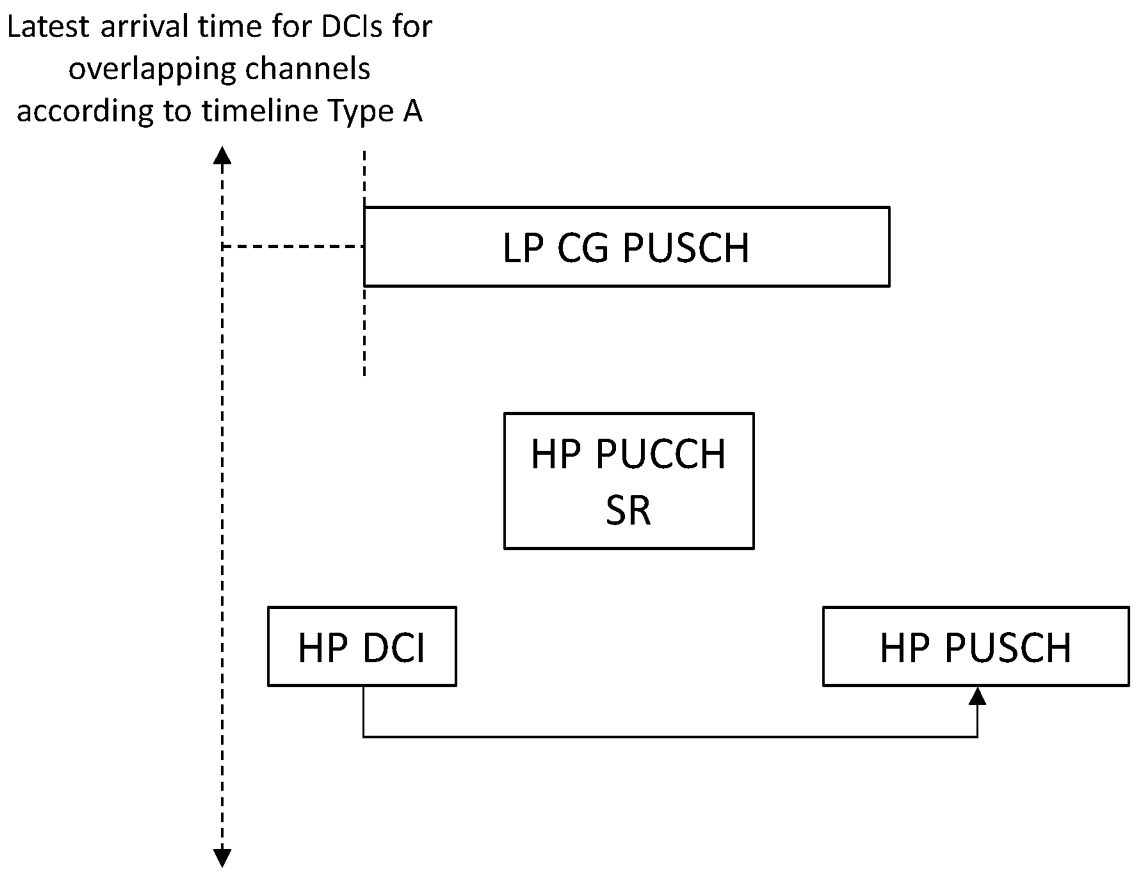
FIG. 14F illustrates multiplexing/cancellation in accordance with some embodiments.

For a UE with different capabilities and/or with different multiplexing configuration/indication (dynamic indication or not), the assumption for the DCI for the HP PUSCH, or MAC PDU for the HP CG PUSCH for the timeline as described above would be applied differently. FIG. 14E illustrates multiplexing/cancellation in accordance with some embodiments. For example, if the UE is configured with UCI-MuxWithDifferentPriority but not with dynaIndicationOfCrossPriMux, and if a LP PUSCH overlaps with both the HP PUCCH SR and HP PUSCH as shown in FIG. 14E, the HP DCI for the HP PUSCH still is to satisfy timeline Type A, even if the UE drops the LP PUSCH and the HP SR does not multiplex onto the LP PUSCH in step 2.2. FIG. 14F illustrates multiplexing/cancellation in accordance with some embodiments. Alternatively, if the UE is configured with UCI-MuxWithDifferentPriority but not with dynaIndicationOfCrossPriMux, for a UE with the capability #3, the HP DCI for the HP PUSCH does not need to satisfy timeline Type A, as shown in FIG. 14F.

The serving cell group A consists of one or multiple UL serving cells, or one or multiple UL serving cells within the same frequency band if a UE is configured with simultaneous PUCCH and PUSCH transmission with different priorities for inter-band carrier aggregation.

In one embodiment, for a UE, a PUCCH or PUSCH can be configured with repetition(s). In step 2, when the UE resolves the overlap between PUCCH/PUSCHs with different priorities, the UE may determine and select the resource for multiplexing with the consideration of repetition(s).

In step 2.1, a UE first determines a set Q that includes a set of resources for LP and HP PUCCHs in a single slot/sub-slot, and then the UE resolves the overlapping LP and HP PUCCHs within the set Q.

Before the UE resolves the overlapping LP and HP PUCCHs within the set Q, the UE should remove some of the LP PUCCHs that may not be able to multiplex with HP PUCCHs from the set Q. The LP PUCCHs to be removed include at least one of the following cases:

1) If a LP PUCCH resource only includes a LP CSI, the LP PUCCH resource is removed, if the LP PUCCH overlaps with at least one HP UL channel.

2) If a LP PUCCH resource only includes a LP SR, or only includes a LP SR and LP CSI, the LP PUCCH resource is removed, if the LP PUCCH overlaps with at least one HP UL channel.

Figure 15A:
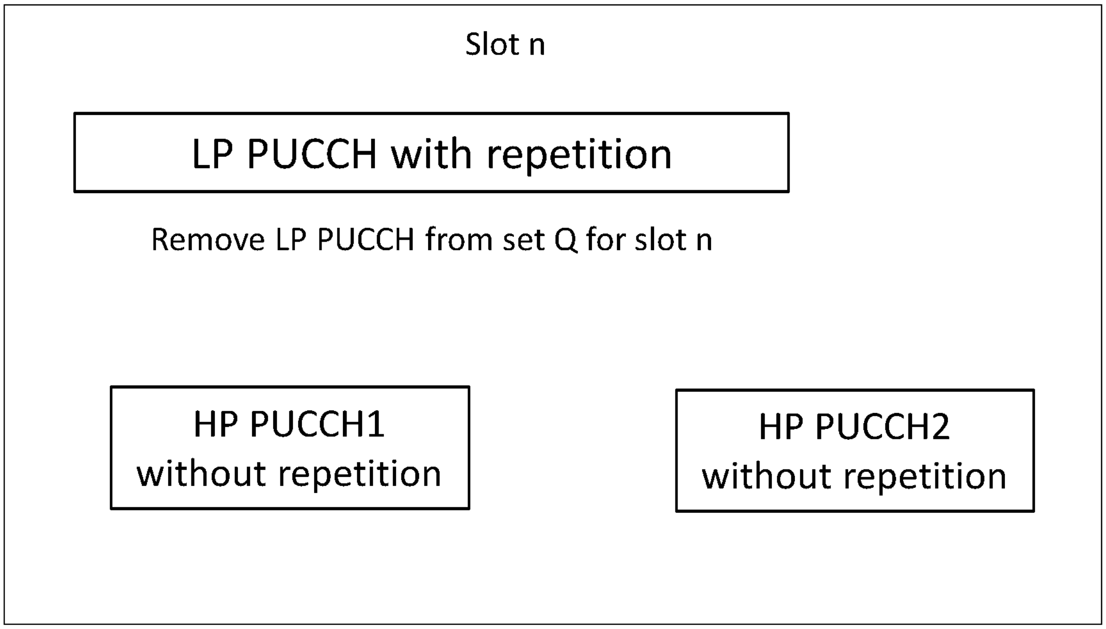
FIG. 15A illustrates LP PUCCH resource removal in accordance with some embodiments.

3) If a LP PUCCH resource in the single slot or associated with the single slot is with repetition, and the LP PUCCH resource overlaps with a HP PUCCH resource in the single slot or associated with the single slot with or without repetition, the LP PUCCH resource is removed from set Q as shown in FIG. 15A. FIG. 15A illustrates LP PUCCH resource removal in accordance with some embodiments.

Figure 15B:
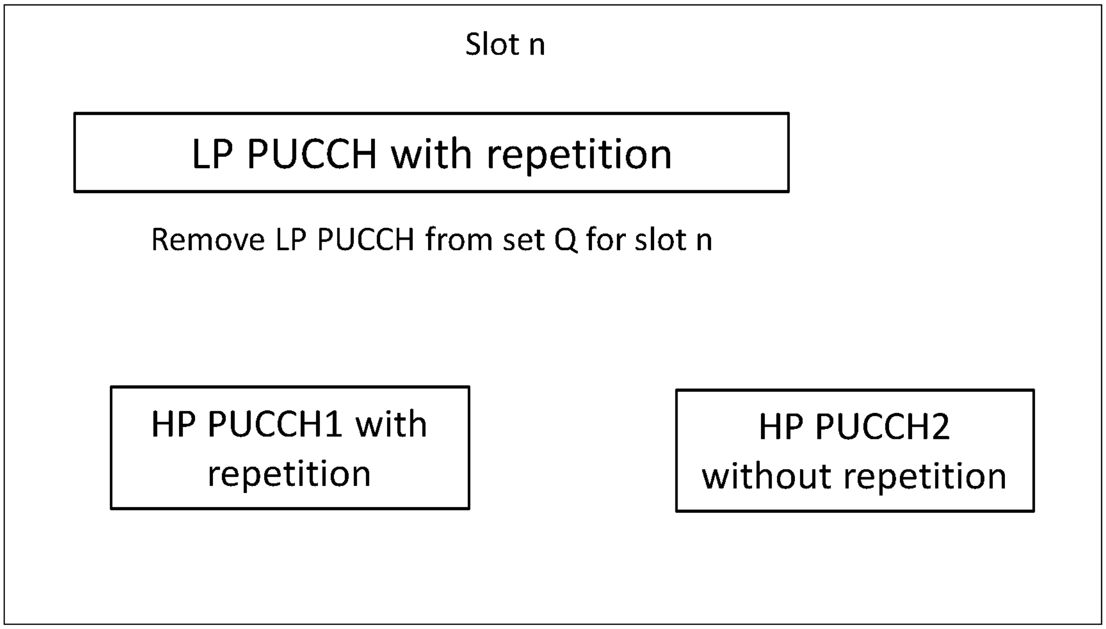
FIG. 15B illustrates LP PUCCH resource removal in accordance with some embodiments.

4) If a LP PUCCH resource in the single slot or associated with the single slot without repetition overlaps with a HP PUCCH resource in the single slot or associated with the single slot with repetition, the LP PUCCH resource is removed from set Q as shown in FIG. 15B. FIG. 15B illustrates LP PUCCH resource removal in accordance with some embodiments.

Figure 15C:
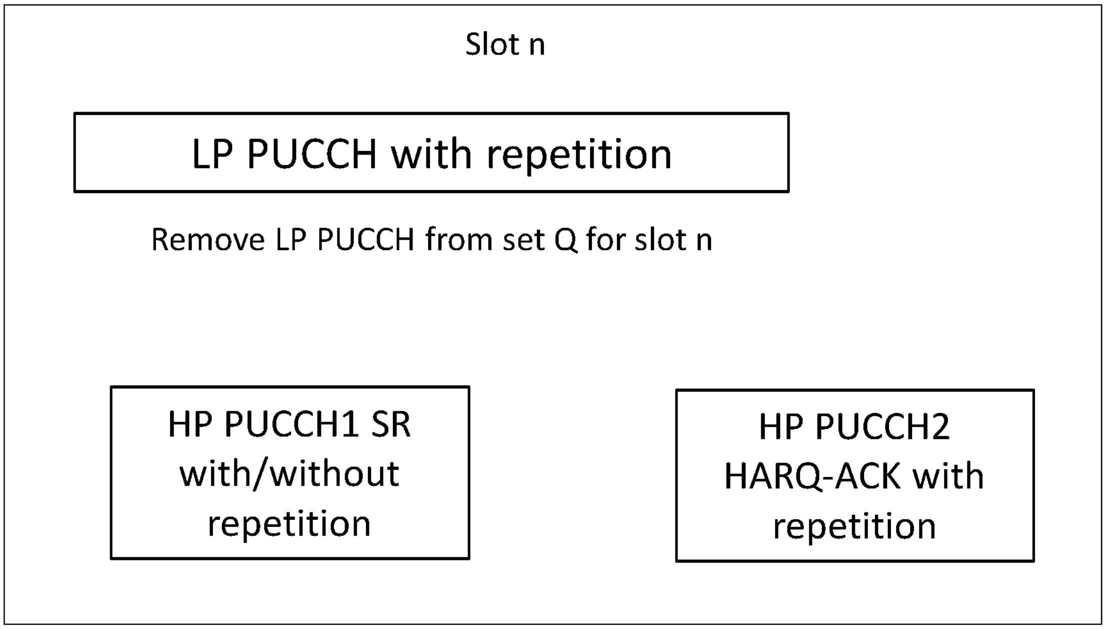
FIG. 15C illustrates LP PUCCH resource removal in accordance with some embodiments.
Figure 15D:
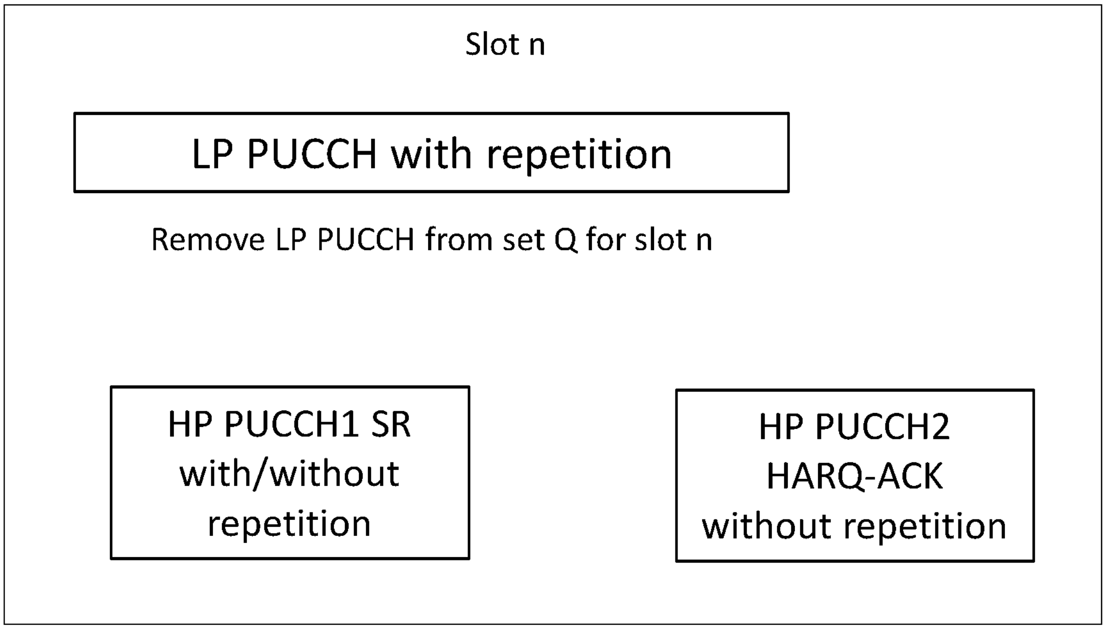
FIG. 15D illustrates LP PUCCH resource removal in accordance with some embodiments.

5) If a LP PUCCH resource in the single slot or associated with the single slot without repetition overlaps with a HP PUCCH resource for HARQ-ACK in the single slot or associated with the single slot with repetition, the LP PUCCH resource is removed from set Q. FIG. 15C illustrates LP PUCCH resource removal in accordance with some embodiments. FIG. 15D illustrates LP PUCCH resource removal in accordance with some embodiments.

Assuming the UE always prioritizes multiplexing a LP PUCCH with a HP PUCCH with HARQ-ACK, it is beneficial to keep a LP PUCCH without repetition in the set Q, if the overlapped HP PUCCH with HARQ-ACK is also without repetition, because the UE can multiplex the LP PUCCH with the HP PUCCH with HARQ-ACK. FIGS. 15C and 15D provide examples: in FIG. 15C, a LP PUCCH without repetition overlaps with a HP PUCCH 1 with a SR with or without repetition, and a HP PUCCH2 with a HARQ-ACK with repetition. The UE removes the LP PUCCH from set Q. In FIG. 15D, a PUCCH without repetition overlaps with a HP PUCCH 1 with a SR with or without repetition, and a HP PUCCH2 with a HARQ-ACK without repetition. The UE keeps the LP PUCCH in set Q, and the UE first multiplexes the LP PUCCH with the HP PUCCH2. The UE transmits the HP PUCCH1 for the SR, and the HP PUCCH2 with the LP and HP HARQ-ACK.

The time unit for a LP PUCCH resource and HP PUCCH resource may be different, e.g., the HP PUCCH resource is configured with a sub-slot and the LP PUCCH is configured with slot. When the UE determines which sub-slot the LP PUCCH is associated with, the UE selects the overlapped sub-slot with the HP PUCCH resource without repetition. If there is no overlapped sub-slot with the HP PUCCH resource without repetition, the UE selects the first overlapped sub-slot, and removes the LP PUCCH resource from set Q. Alternatively, the UE selects the first overlapped sub-slot with a HARQ-ACK if any, and removes the LP PUCCH resource from set Q, otherwise, the UE selects the first overlapped sub-slot with the HP PUCCH, and removes the LP PUCCH resource from set Q.

Figure 15E:
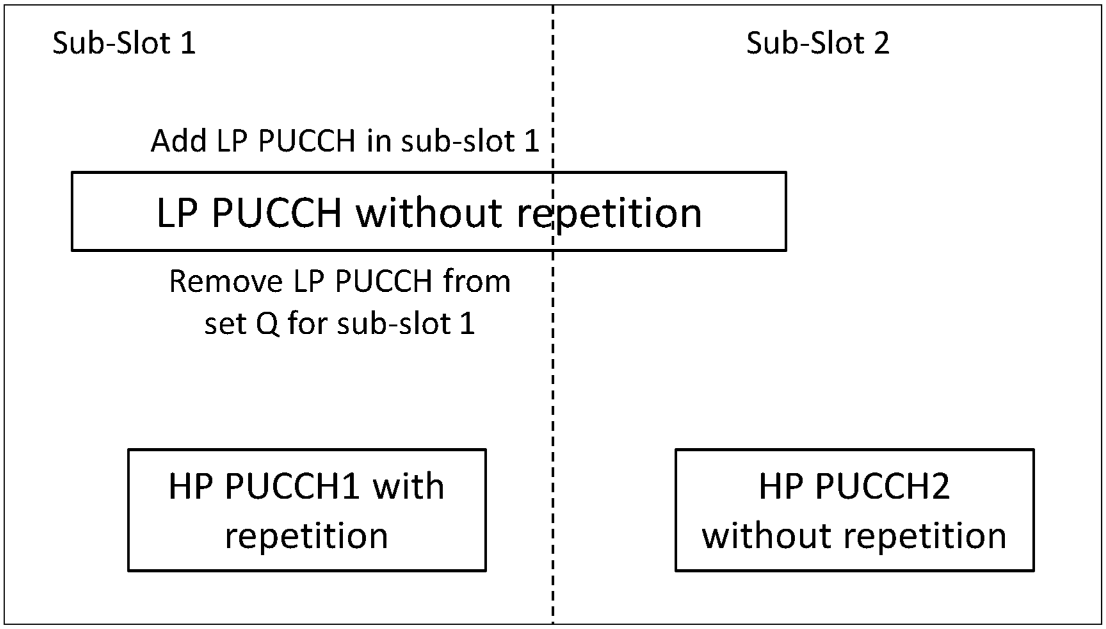
FIG. 15E illustrates LP PUCCH resource removal in accordance with some embodiments.
Figure 15F:
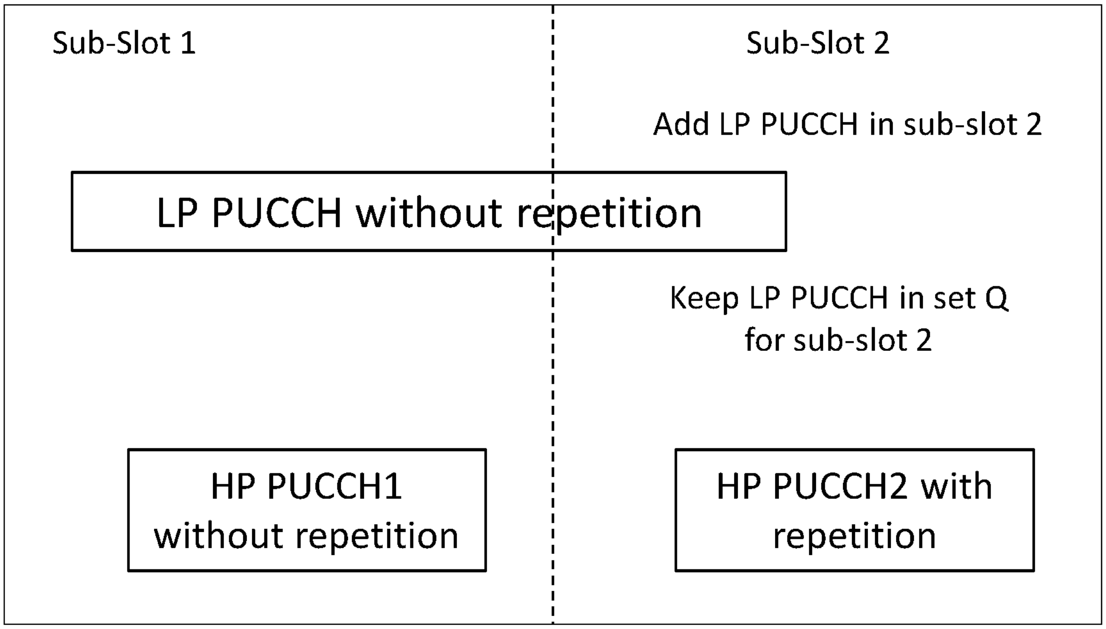
FIG. 15F illustrates LP PUCCH resource addition in accordance with some embodiments.

Alternatively, if the time unit for a LP PUCCH resource and HP PUCCH resource is different, the UE selects the first overlapped sub-slot with a HP PUCCH, or selects the first overlapped sub-slot with a HP PUCCH with the HARQ-ACK if any, and removes the LP PUCCH resource from set Q. FIG. 15E illustrates LP PUCCH resource removal in accordance with some embodiments. FIG. 15F illustrates LP PUCCH resource addition in accordance with some embodiments.

FIGS. 15E and 15F provide examples in which, in FIG. 15E, a LP PUCCH without repetition overlaps with the HP PUCCH1 in sub-slot 1 and the HP PUCCH2 in sub-slot 2. HP PUCCH1 is with repetition, while HP PUCCH2 is without repetition. The UE adds a LP PUCCH in the first overlapped sub-slot 1, but the UE removes the LP PUCCH from set Q for the sub-slot 1. The UE drops the LP PUCCH. In FIG. 15F, a LP PUCCH with repetition overlaps with the HP PUCCH1 with the HARQ-ACK and the HP PUCCH2 with the HARQ-ACK. The UE adds the LP PUCCH in sub-slot 2, because the LP PUCCH2 is without repetition. Then, the LP PUCCH is in set Q for sub-slot 2, and the UE multiplexes the LP UCI onto the HP PUCCH2 after resolving the overlapping between the LP PUCCH and HP PUCCH2. The UE transmits the HP PUCCH1, and the HP PUCCH2 with the LP UCI respectively.

6) If a LP PUCCH resource in the single slot or associated with the single slot overlaps with one or multiple HP PUCCH resources in the single slot or associated with the single slot, and all the HP PUCCH(s) are with repetition, the LP PUCCH resource is removed from set Q.

7) If a LP PUCCH resource in the single slot or associated with the single slot is with repetition, the LP PUCCH resource is removed from set Q.

In this case, whether to transmit or drop the LP PUCCH is determined according to one or more of the options as below:

Option 1: the UE checks whether the LP PUCCH with repetition overlaps with any HP PUCCH or HP PUSCH before the UE resolves the collision between UL channels (not including any LP PUCCH with repetition) with same priority, i.e., before step 1. If yes, the UE drops the LP PUCCH, otherwise, the UE transmits the LP PUCCH.

Figure 15G:
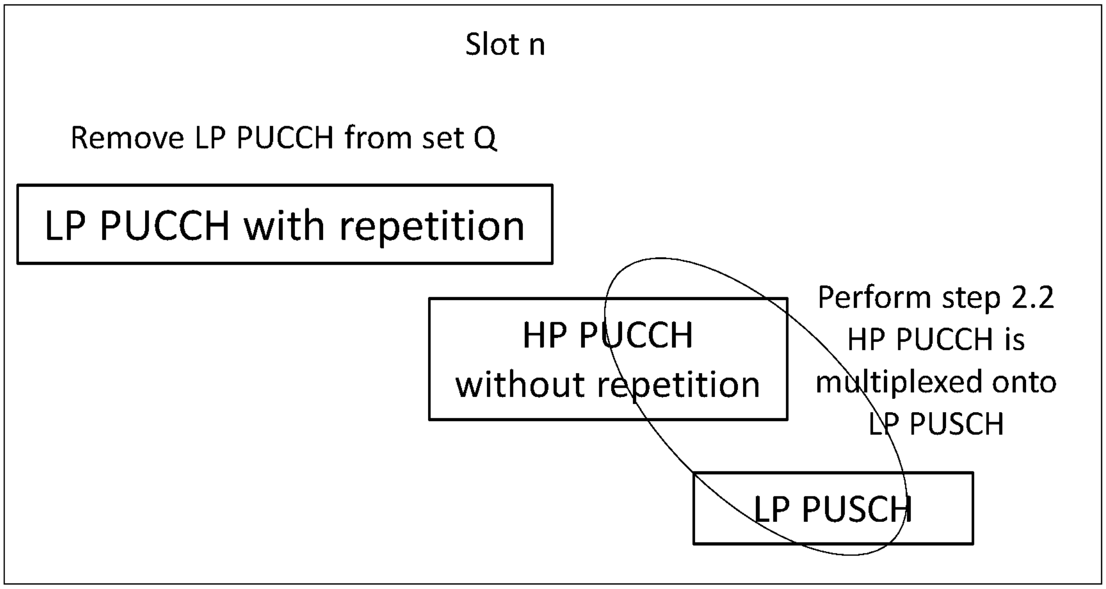
FIG. 15G illustrates HP PUCCH resource removal in accordance with some embodiments.

Option 2: the UE checks whether the LP PUCCH with repetition overlaps with any HP PUCCH or HP PUSCH after the UE resolves the collision between UL channels (not including any LP PUCCH with repetition) with different priorities, i.e., after step 2.2. If yes, the UE drops the LP PUCCH, otherwise, the UE transmits the LP PUCCH. FIG. 15G illustrates LP PUCCH resource removal in accordance with some embodiments. As shown in FIG. 15G, in slot n, a LP PUCCH with repetition overlaps with a HP PUCCH without repetition, and the HP PUCCH without repetition overlaps with a LP PUSCH after step 1. The UE resolves collision between the HP PUCCH and the LP PUSCH, i.e., step 2.2. The HP PUCCH is multiplexed onto the LP PUSCH. Thus, there is no HP PUCCH overlapping with the LP PUCCH with repetition. The UE transmits both the LP PUCCH with repetition, and the LP PUSCH with the HP UCI.

Figure 15H:
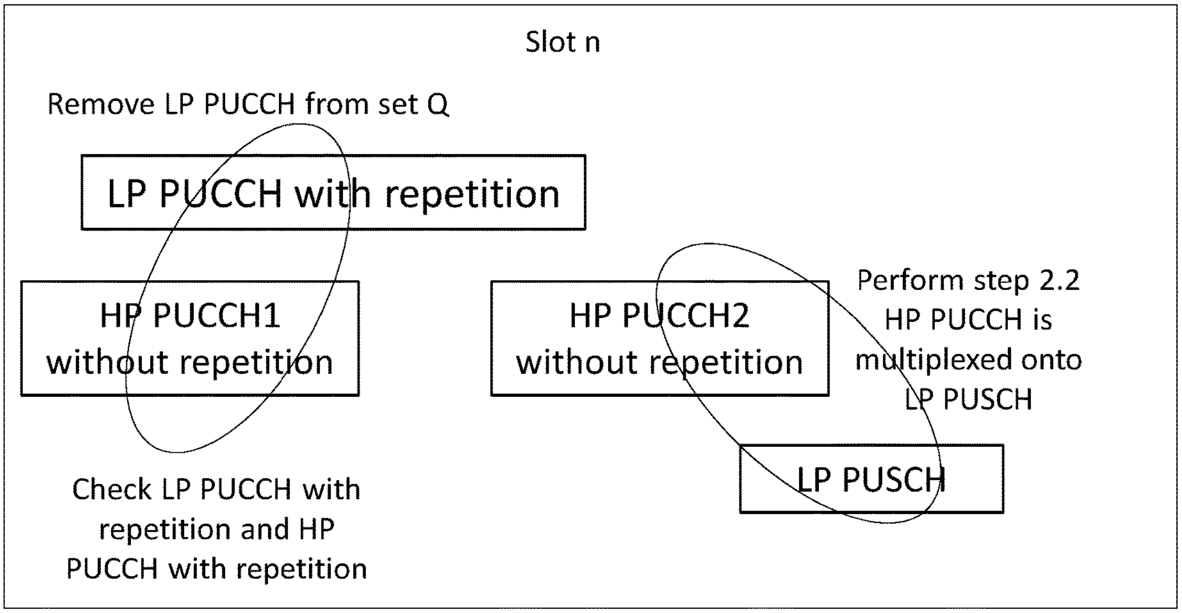
FIG. 15H illustrates LP PUCCH resource removal in accordance with some embodiments.

Option 3: the UE checks whether the LP PUCCH with repetition overlaps with any HP PUCCH or HP PUSCH after the UE resolves the collision between UL channels (not including any LP PUCCH with repetition or any HP PUCCH with repetition) with different priorities, i.e., after step 2.2. The UE also checks whether the LP PUCCH with repetition overlaps with any HP PUCCH with repetition. If the check result is no for both, the UE transmits the LP PUCCH, otherwise, the UE drops the LP PUCCH. FIG. 15H illustrates LP PUCCH resource removal in accordance with some embodiments. As shown in FIG. 15H, in slot n, a LP PUCCH with repetition overlaps with a HP PUCCH1 with repetition and a HP PUCCH2 without repetition, the HP PUCCH 2 without repetition overlaps with a LP PUSCH after step 1. The UE resolves collision between the HP PUCCH 2 and the LP PUSCH, i.e., step 2.2. The HP PUCCH2 is multiplexed onto the LP PUSCH. But the HP PUCCH1 overlaps with the LP PUCCH. Therefore, the UE drops the LP PUCCH, the UE transmits the LP PUSCH with the HP UCI from the HP PUCCH2 and transmits the HP PUCCH1.

Option 4: the UE checks whether the LP PUCCH with repetition overlaps with any HP PUCCH or HP PUSCH after the UE resolves the collision between UL channels (not including any LP PUCCH with repetition) with same priority and before the UE resolves the collision between UL channels (not including any LP PUCCH with repetition) with different priorities, i.e., after step 1 and before step 2.1

In one option, if a PUCCH resource is removed from set Q, the PUCCH is dropped. For example, the LP PUCCH in (1)~(6) is dropped.

In another option, if a PUCCH resource is removed from set Q, whether to transmit the PUCCH depends on whether the PUCCH collides with another PUCCH or PUSCH with different priorities, e.g., the case in (7).

In one option, for (3)~(6), a LP PUCCH resource with repetition is removed from set Q, if the LP PUCCH resource overlaps with a HP PUSCH. In another option, for (3)~(6), if a LP PUCCH resource with repetition is not removed from set Q, but the LP PUCCH with repetition overlaps with a HP PUSCH after step 2.1, the LP PUCCH with repetition is dropped.

If a UE is configured with dynamic indication for multiplexing and no multiplexing for different priorities, the dynamic indication only applies to the PUCCHs within the set Q.

In another example, the UE does not remove the LP PUCCH resource according to (3) or (4) or (5) or (6) or (7), the UE handles the repetition when the UE resolves the overlapping LP and HP PUCCHs within the set Q. If a LP PUCCH resource without repetition overlaps with one or multiple HP PUCCH resources, and at least one of the HP PUCCH resources is without repetition, the UE first resolves the overlapping between the LP PUCCH and the HP PUCCH without repetition. Alternatively, if a LP PUCCH resource without repetition overlaps with one or multiple HP PUCCH resources with the HARQ-ACK, and at least one of the HP PUCCH resources is without repetition, the UE first resolves the overlapping between the LP PUCCH and the HP PUCCH without repetition. Otherwise, the UE resolves overlapping between LP and HP according to a pre-defined rule, e.g., resolve the overlapping between one LP PUCCH and one HP PUCCH in time order, or resolve the overlapping between one LP PUCCH and the first HP PUCCH with HARQ-ACK in time order. If the LP PUCCH with repetition overlaps with a HP PUCCH, the LP PUCCH is dropped. If the LP PUCCH overlaps with a HP PUCCH with repetition, the LP PUCCH is dropped.

Figure 16A:
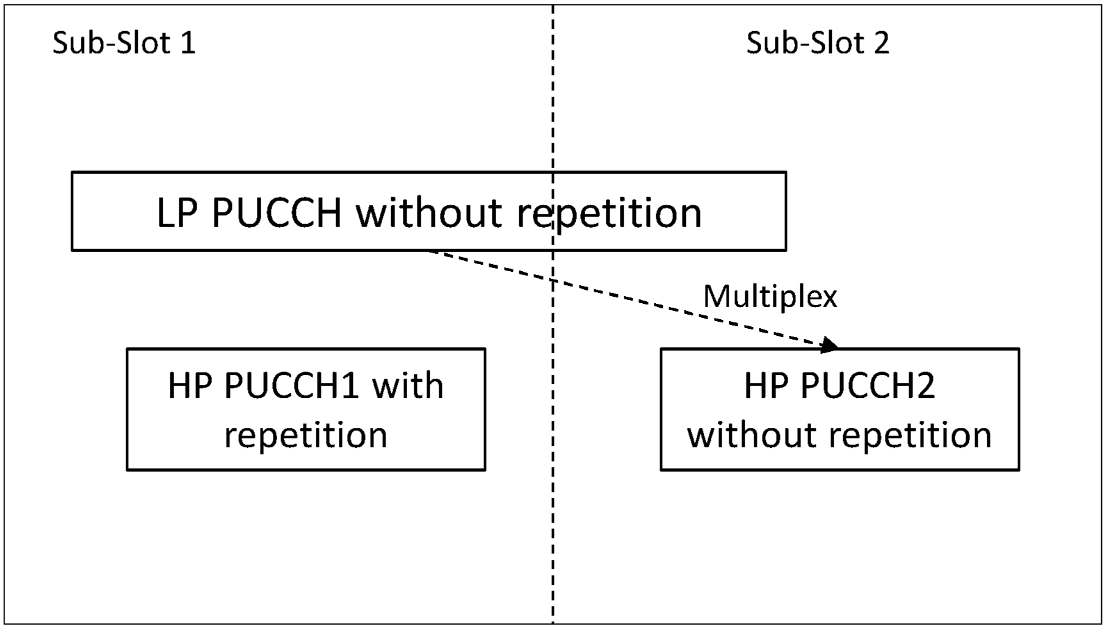
FIG. 16A illustrates LP PUCCH multiplexing in accordance with some embodiments.
Figure 16B:
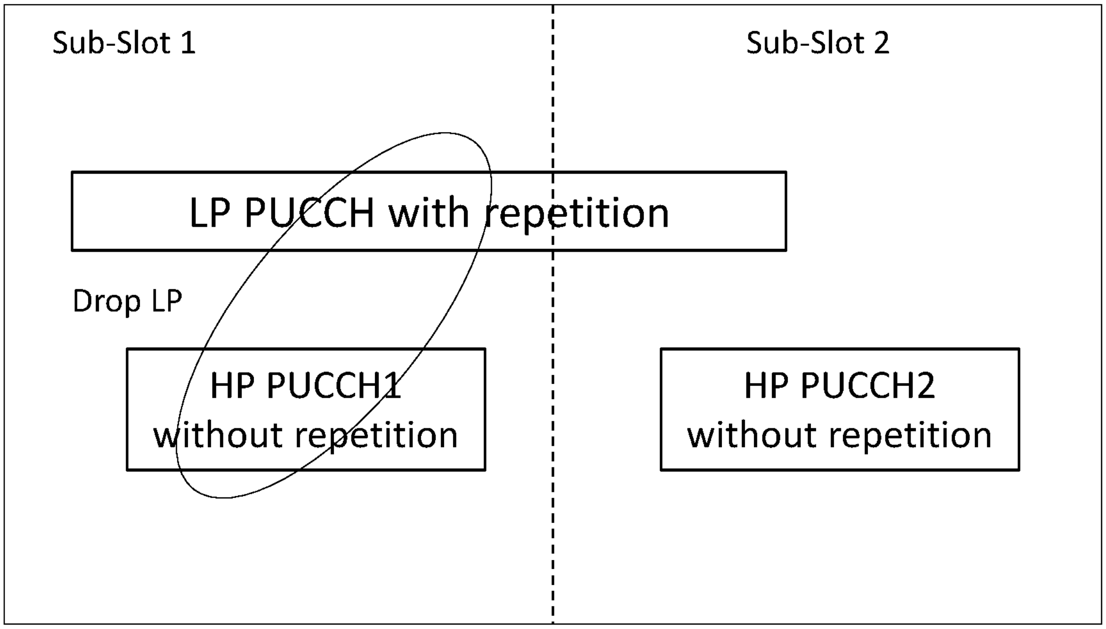
FIG. 16B illustrates LP PUCCH dropping in accordance with some embodiments.

FIG. 16A illustrates LP PUCCH multiplexing in accordance with some embodiments. FIG. 16B illustrates LP PUCCH dropping in accordance with some embodiments. In FIG. 16A, a LP PUCCH without repetition overlaps with a HP PUCCH1 with the HARQ-ACK in sub-slot 1 and a HP PUCCH2 with the HARQ-ACK in sub-slot 2. The HP PUCCH1 is with repetition, while the HP PUCCH2 is without repetition. Therefore, the UE resolves the overlapping between the LP PUCCH and HP PUCCH2, e.g., by adding the LP PUCCH into sub-slot 2 and multiplexes the LP UCI onto the HP PUCCH2. Therefore, the UE can transmit the HP PUCCH1 and HP PUCCH2 with the LP UCI respectively in sub-slot 1 and sub-slot 2. The dropping probability of the LP PUCCH is reduced. In FIG. 16B, a LP PUCCH with repetition overlaps with a HP PUCCH1 with the HARQ-ACK and a HP PUCCH2 with the HARQ-ACK. The UE resolves the overlapping between the LP PUCCH and HP PUCCHs in time order, i.e., the UE first resolves the overlapping between the LP PUCCH and HP PUCCH1. The UE drops LP PUCCH.

In step 2.1, the UE first determines a set Q that includes a set of resources for LP and HP PUCCHs in a single slot/sub-slot, and then, the UE resolves the overlapping LP and HP PUCCHs within the set Q. Before the UE resolves the overlapping LP and HP PUCCHs within the set Q, the UE may remove a HP PUCCH with repetition from set Q.

Figure 17A:
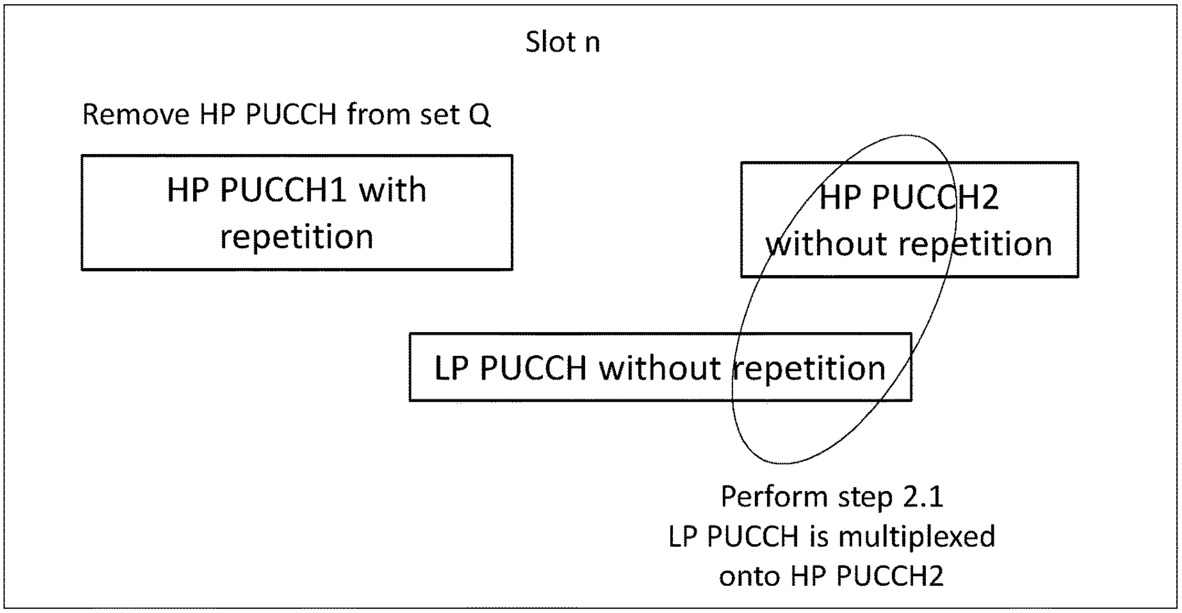
FIG. 17A illustrates LP PUCCH dropping in accordance with some embodiments.

In one option, after step 2.1, the UE checks any overlap between the LP PUCCH in set Q with the HP PUCCH with repetition. If yes, the LP PUCCH is dropped. FIG. 17A illustrates LP PUCCH dropping in accordance with some embodiments. In FIG. 17A, in slot n, a HP PUCCH1 with repetition overlaps with a LP PUCCH without repetition. The LP PUCCH overlaps with the HP PUCCH2 without repetition. In step 2.1, the HP PUCCH1 is removed from set Q. In step 2.1, the LP PUCCH multiplexes onto HP PUCCH2 resource. Then, the UE transmits the HP PUCCH1 with repetition, and the UE transmits the HP PUCCH2 with the LP UCI.

Figure 17B:
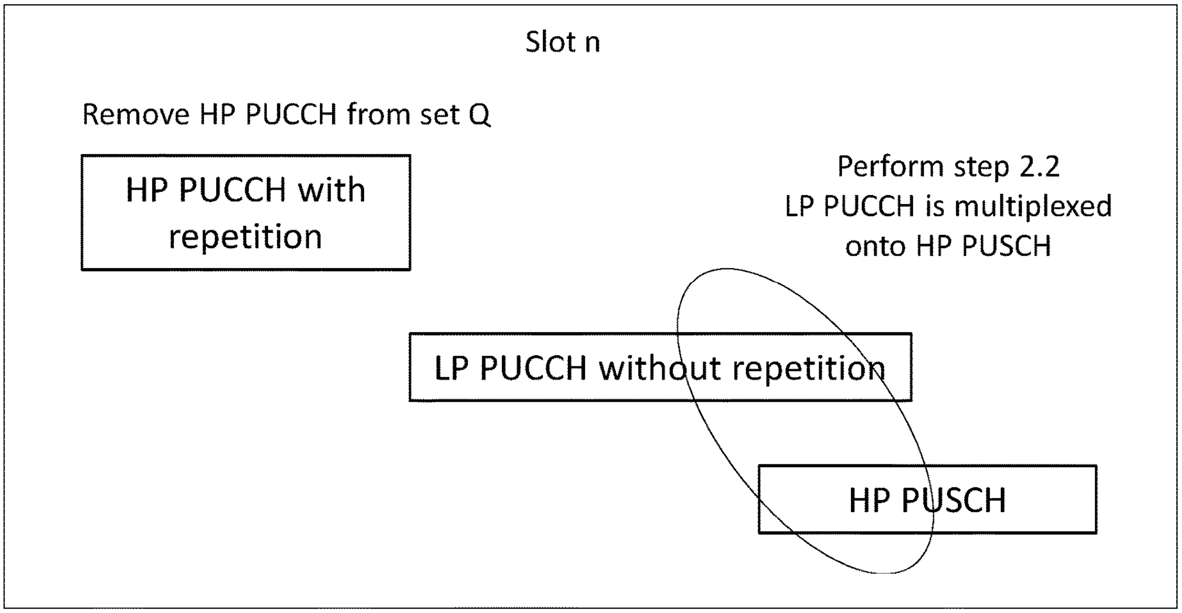
FIG. 17B illustrates LP PUCCH dropping in accordance with some embodiments.

In another option, after step 2.2, the UE checks any overlap between the LP PUCCH in set Q with the HP PUCCH with repetition. In other words, the UE does not check any overlap between the LP PUCCH in set Q with the HP PUCCH with repetition after step 2.1, the UE checks after step 2.2. If after resolving the collision between the LP PUCCH and HP PUSCH in step 2.2, a LP PUCCH in set Q (the LP PUCCH does not overlap with any HP PUSCH in step 2.2) overlaps with a HP PUCCH with repetition, the LP PUCCH is dropped. The HP PUCCH with repetition is transmitted. FIG. 17B illustrates LP PUCCH dropping in accordance with some embodiments. In slot n in FIG. 17B, the HP PUCCH with repetition overlaps with the LP PUCCH without repetition. The LP PUCCH overlaps with the HP PUSCH. In step 2.1, the HP PUCCH1 is removed from set Q. In step 2.2, the LP PUCCH multiplexes onto the HP PUSCH. Then, the UE transmits the HP PUCCH with repetition, and the UE transmits the HP PUSCH with the LP UCI.

In one option, after step 1, the UE checks any overlap between the LP PUSCH and the HP PUCCH with repetition. If after step 1, a HP PUCCH with repetition overlaps with a LP PUSCH, the LP PUSCH is dropped.

Figure 17C:
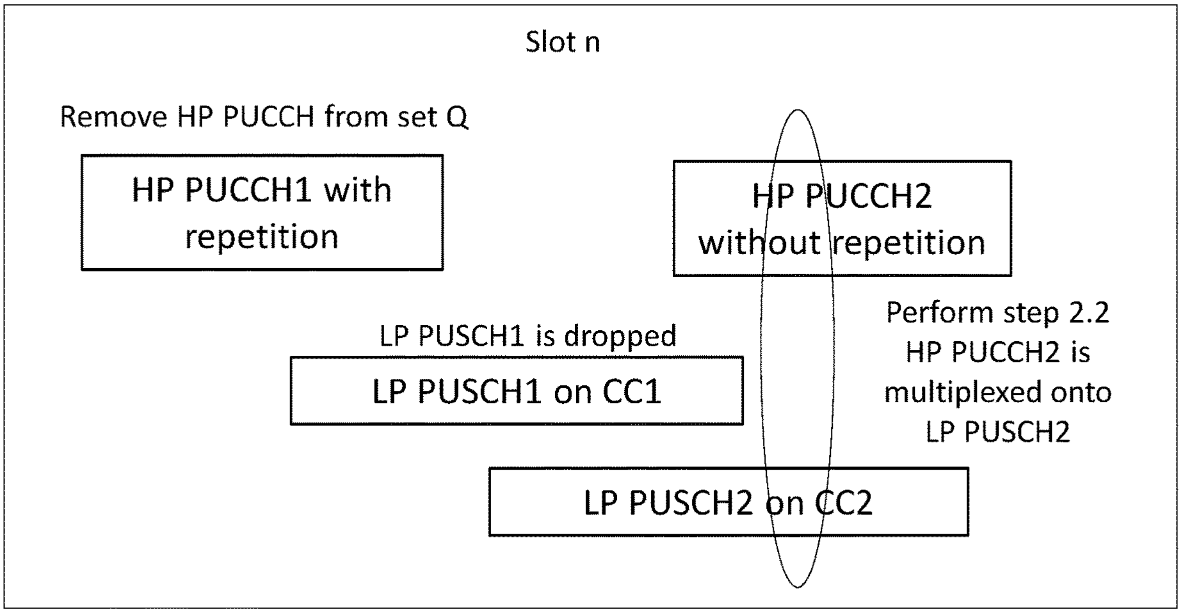
FIG. 17C illustrates LP PUCCH dropping in accordance with some embodiments.

In another option, after step 2.1, the UE checks any overlap between the LP PUSCH and the HP PUCCH with repetition. If a LP PUSCH after step 2.1 for resolving the collision between the LP PUCCH and HP PUCCH without repetition overlaps with a HP PUCCH with repetition, the LP PUSCH is excluded from the set of LP PUSCHs from which a LP PUSCH may be selected to multiplex the HP UCI, and the UE drops the LP PUSCH. FIG. 17C illustrates LP PUCCH dropping in accordance with some embodiments. The LP PUSCH1 overlaps with HP PUCCH1 with repetition. The LP PUSCH1 is dropped and can not be chosen to multiplex with the HP PUCCH2.

Figure 17D:
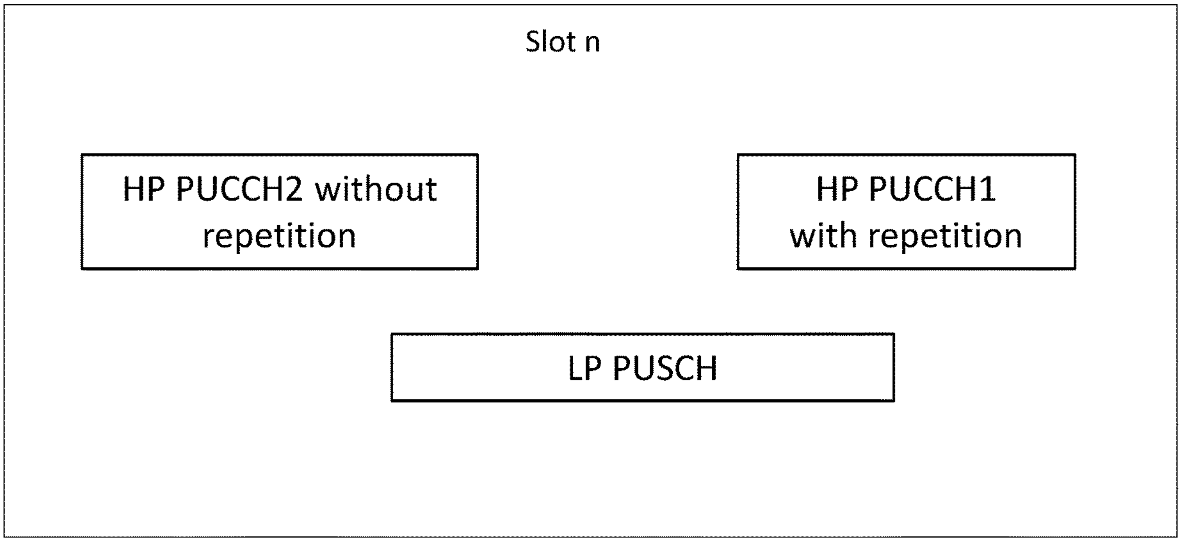
FIG. 17D illustrates an error case in accordance with some embodiments.

In another option, after step 2.2, the UE checks any overlap between the LP PUSCH and the HP PUCCH with repetition. If a LP PUSCH after step 2.2 for resolving the collision between the LP PUSCH and HP PUCCH without repetition overlaps with a HP PUCCH with repetition, the LP PUSCH is dropped. In one case, the UE does not expect a LP PUSCH after step 2.2 carrying any HP UCI to be overlapped with a HP PUCCH with repetition, which would be an error case. FIG. 17D illustrates an error case in accordance with some embodiments.

Alternatively, in step 2.1, a HP PUCCH with repetition can be kept within the set Q. When the UE resolves the collision between a LP PUCCH and the HP PUCCH with repetition in step 2.1, the UE drops the LP PUCCH. In step 2.2, if a LP PUSCH overlaps with a HP PUCCH with repetition, the LP PUSCH is excluded from the set of LP PUSCHs from which a LP PUSCH may be selected to multiplex the HP UCI, and the UE drops the LP PUSCH with repetition. For example, in step 2.2, a UE chooses one of LP PUSCHs from a set X and/or a set M, and a LP PUSCH overlapping with a HP PUCCH with repetition does not belong to set X and/or a set M.

In one option, for a HP PUCCH with repetition, the UE does not expect the HP PUCCH overlaps with more than one LP UL channel. In another option, after step 1, for a HP PUCCH with repetition, the UE does not expect the HP PUCCH with repetition belong to a group of overlapping PUCCH(s)/PUSCH(s) that includes more than 2 UL channels with different priorities.

If a UE is configured with a dynamic indication for multiplexing and no multiplexing for different priorities, the UE does not expect to receive an indication to multiplex, if the PUCCH is with repetition.

Removing a resource from set Q can be equivalent to not including/adding the resource for the set Q. For example, if a LP PUCCH is with repetition and overlaps with a HP PUCCH, the LP PUCCH resource is not included in any set Q for the overlapped slot or sub-slot.

A UE does not expect the repetition factor for a HP PUCCH to change after multiplexing the LP PUCCH and HP PUCCH in step 2.1. For example, if a HP PUCCH for only the HP UCI is without repetition, the UE does not expect the resultant HP PUCCH resource is with repetition after multiplexing of the LP and HP PUCCH. Alternatively, if a resultant HP PUCCH resource in step 2.1 would be associated with different repetition factor compared with the HP PUCCH resource before step 2.1, the UE should drop the LP PUCCH.

EXAMPLES

Example 1 is an apparatus for a user equipment (UE), the apparatus comprising: memory; and processing circuitry, to configure the UE to: receive, from a 5th generation NodeB (gNB), a first resource for a first physical uplink control channel (PUCCH) transmission; receive, from the gNB, a second set of resources for at least one of a second PUCCH transmission and a physical uplink shared channel (PUSCH) transmission; determine that the second set of resources overlaps with the first resource; and determine, in response to a determination that the second set of resources overlaps with the first resource, whether to multiplex uplink control information (UCI) from the first PUCCH in the first resource onto the PUSCH in the second set of resources, whether to drop the PUSCH, and whether to drop the first PUCCH or the second PUCCH in the second set of resources based on characteristics of the first PUCCH, the second PUCCH, and the PUSCH that include, priority, repetition, and value of scheduling request (SR); and wherein the memory is configured to store the characteristics of the first PUCCH, the second PUCCH, and the PUSCH.

In Example 2, the subject matter of Example 1 includes, wherein the processing circuitry configures the UE to: determine that the first PUCCH is a high priority (HP) PUCCH that has a HP Hybrid Automatic Repeat Request Acknowledgment (HARQ-ACK), the PUSCH is a first low priority (LP) PUSCH, and the first LP PUSCH overlaps a HP PUCCH that has a negative SR, and multiplex the HP HARQ-ACK onto the first LP PUSCH.

In Example 3, the subject matter of Example 2 includes, wherein the processing circuitry configures the UE to: determine that multiple LP PUSCHs are to be transmitted using the second set of resources, and select, from the multiple LP PUSCHs, a LP PUSCH having a lowest serving cell index as the first LP PUSCH.

In Example 4, the subject matter of Examples 2-3 includes, wherein the processing circuitry configures the UE to: determine that multiple LP PUSCHs are to be transmitted using the second set of resources, and select, from the multiple LP PUSCHs, a LP PUSCH as the first LP PUSCH based on a set of priorities that include Channel State Information (CSI) and timing.

In Example 5, the subject matter of Example 4 includes, wherein the set of priorities include in order: as a first priority, a PUSCH that includes aperiodic Channel State Information (A-CSI), as a second priority, an earliest PUSCH slot based on a slot start, and when further multiple PUSCHs that overlap with the HP PUCCH in the earliest PUSCH slot, in order: as a third priority, a dynamic grant LP PUSCH over a configured LP PUSCH, as a fourth priority, a PUSCH on a serving cell with a smallest serving cell index, and as a fifth priority, an earliest PUSCH transmission.

In Example 6, the subject matter of Examples 1-5 includes, wherein the processing circuitry configures the UE to: determine that the first PUCCH is a high priority (HP) PUCCH that has a HP Hybrid Automatic Repeat Request Acknowledgment (HARQ-ACK), the PUSCH is a first low priority (LP) PUSCH, and the first LP PUSCH does not overlap a HP PUCCH that has a positive SR, and multiplex the HP HARQ-ACK onto the first LP PUSCH.

In Example 7, the subject matter of Example 6 includes, wherein the processing circuitry configures the UE to drop a LP PUSCH that overlaps the HP PUCCH that has a positive SR.

In Example 8, the subject matter of Examples 1-7 includes, wherein the processing circuitry configures the UE to: determine a first set that includes low priority (LP) PUSCHs that overlap with a high priority (HP) PUCCH that has a HP Hybrid Automatic Repeat Request Acknowledgment (HARQ-ACK) and do not overlap with a HP PUCCH resource with a positive SR, determine a second set that includes LP PUSCHs that overlap with the HP PUCCH with HP HARQ-ACK, under conditions in which the first set is empty and the second set is not empty, drop LP PUSCHs in the second set, transmit the HP PUCCH with HP HARQ-ACK and the HP PUCCH resource with the positive SR, and under conditions in which the first set is not empty, select one LP PUSCH from the LP PUSCHs in the first set to multiplex the HP HARQ-ACK onto.

In Example 9, the subject matter of Examples 1-8 includes, wherein the processing circuitry configures the UE to: after having resolved collisions between low priority (LP) PUCCHs and high priority (HP) PUCCHs, determine whether overlap exists between a LP PUSCH and a HP PUCCH with repetition, and in response to a determination that overlap exists between the LP PUSCH and the HP PUCCH with repetition: exclude the LP PUSCH from a set of LP PUSCHs from which a particular LP PUSCH is to be selected to multiplex HP UCI, and drop the LP PUSCH.

In Example 10, the subject matter of Examples 1-9 includes, wherein the processing circuitry configures the UE to: determine a set that includes a set of resources for low priority (LP) PUCCHs and high priority (HP) PUCCHs in a single slot or sub-slot, determine whether each LP PUCCH resource in the single slot or associated with the single slot is with repetition, for each LP PUCCH resource in the single slot or associated with the single slot with repetition, determine whether the LP PUCCH resource overlaps with at least one HP PUCCH resource in the single slot or associated with the single slot, independent of whether the at least one HP PUCCH resource has repetition, form a modified set by removal of each LP PUCCH resource determined to overlap with the at least one HP PUCCH resource from the set, and resolve overlapping LP PUCCHs and HP PUCCHs within the modified set.

In Example 11, the subject matter of Examples 1-10 includes, wherein the processing circuitry configures the UE to: determine a set that includes a set of resources for low priority (LP) PUCCHs and high priority (HP) PUCCHs in a single slot or sub-slot, determine whether each LP PUCCH resource in the single slot or associated with the single slot is without repetition, for each LP PUCCH resource in the single slot or associated with the single slot without repetition, determine whether the LP PUCCH resource overlaps with at least one HP PUCCH resource in the single slot or associated with the single slot with repetition, form a modified set by removal of each LP PUCCH resource determined to overlap with the at least one HP PUCCH resource from the set, and resolve overlapping LP PUCCHs and HP PUCCHs within the modified set.

In Example 12, the subject matter of Examples 1-11 includes, wherein the processing circuitry configures the UE to: determine a set that includes a set of resources for low priority (LP) PUCCHs and high priority (HP) PUCCHs in a single slot or sub-slot, determine whether each LP PUCCH resource in the single slot or associated with the single slot is with repetition, form a modified set by removal of each LP PUCCH resource in the single slot or associated with the single slot with repetition, and resolve overlapping LP PUCCHs and HP PUCCHs within the modified set.

In Example 13, the subject matter of Example 12 includes, wherein the processing circuitry configures the UE to determine whether each LP PUCCH with repetition overlaps with a HP PUCCH or HP PUSCH after resolution of a collision between uplink channels with a same priority and before resolution of a collision between uplink channels with different priorities.

In Example 14, the subject matter of Examples 1-13 includes, wherein the processing circuitry configures the UE to: determine a set that includes a set of resources for low priority (LP) PUCCHs and high priority (HP) PUCCHs in a single slot or sub-slot, form a modified set by removal of at least one LP PUCCH resource, and determine whether to transmit a particular PUCCH dependent on whether the particular PUCCH collides with another PUCCH or PUSCH with a different priority.

In Example 15, the subject matter of Examples 1-14 includes, wherein the processing circuitry configures the UE to receive, from the gNB, an indication to multiplex uplink transmissions with different priorities.

In Example 16, the subject matter of Examples 1-15 includes, wherein the processing circuitry configures the UE to: resolve at least one of overlapping PUCCHs and PUSCHs with a same priority; after resolution of the at least one of overlapping PUCCHs and PUSCHs with a same priority, resolve at least one of overlapping PUCCHs and PUSCHs with different priorities; after resolution of the at least one of overlapping PUCCHs and PUSCHs with different priorities, resolve collisions between low priority PUCCHs and high priority PUCCHs; and after resolution of the collisions between low priority PUCCHs and high priority PUCCHs, resolve collisions between PUCCHs and PUSCHs of different priorities.

Example 17 is an apparatus for a user equipment (UE) the apparatus comprising memory and processing circuitry to configure the UE to: generate a power headroom report (PHR) for at least one serving cell, the PHR for at least one of a physical uplink control channel (PUCCH) and a physical uplink shared channel (PUSCH), the PHR for the PUCCH based on an actual PUCCH or a reference PUCCH; and select a PUSCH on one of the at least one serving cell on which to transmit the PHR; and wherein the memory is configured to store the PHR.

In Example 18, the subject matter of Example 17 includes, wherein the processing circuitry configures the UE to select between the actual PUCCH and reference PUCCH dependent on at least one of: a timing relation between a downlink assignment for the PUCCH and an uplink grant for the PUSCH on the serving cell carrying the PHR, for a PUSCH based on a configured grant, a timing relation between a starting or ending symbol of the PUCCH and a first uplink symbol for the PUSCH on the serving cell carrying the PHR, or whether a scheduled parameter for PUCCH scheduling has been obtained by the downlink assignment for the PUCCH or a configured parameter for the PUCCH based on a configured grant.

Example 19 is a non-transitory computer-readable storage medium that stores instructions for execution by one or more processors of a user equipment (UE), the one or more processors to configure the UE to, when the instructions are executed: receive, from a 5th generation NodeB (gNB), a first resource for a first physical uplink control channel (PUCCH) transmission; receive, from the gNB, a second set of resources for at least one of a second PUCCH transmission and a physical uplink shared channel (PUSCH) transmission; determine that the second set of resources overlaps with the first resource; and determine, in response to a determination that the second set of resources overlaps with the first resource, whether to multiplex uplink control information (UCI) from the first PUCCH in the first resource onto the PUSCH in the second set of resources, whether to drop the PUSCH, and whether to drop the first PUCCH or the second PUCCH in the second set of resources based on characteristics of the first PUCCH, the second PUCCH, and the PUSCH that include, priority, repetition, and value of scheduling request (SR).

In Example 20, the subject matter of Example 19 includes, wherein the one or more processors further configure the UE to, when the instructions are executed: resolve at least one of overlapping PUCCHs and PUSCHs with a same priority; after resolution of the at least one of overlapping PUCCHs and PUSCHs with a same priority, resolve at least one of overlapping PUCCHs and PUSCHs with different priorities; after resolution of the at least one of overlapping PUCCHs and PUSCHs with different priorities, resolve collisions between low priority PUCCHs and high priority PUCCHs; and after resolution of the collisions between low priority PUCCHs and high priority PUCCHs, resolve collisions between PUCCHs and PUSCHs of different priorities.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B"

includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A user equipment (UE) comprising: memory; and processing circuitry to configure the UE to:

receive, from a 5th generation NodeB (gNB), an indication to multiplex uplink transmissions with different priority indexes;

receive a first resource for a first physical uplink control channel (PUCCH) of a larger priority index and a second resource for at least one of a second PUCCH or a physical uplink shared channel (PUSCH) of a smaller priority index;

determine that the second resource overlaps in time with the first resource; and after a determination that the second resource overlaps with the first resource, resolve overlap of the first resource and the second resource by:

first, resolving overlapping uplink channels of a same priority index;

second, resolving overlapping PUCCHs of different priority indexes; and third, resolving overlapping PUCCHs and PUSCHs of different priority indexes by dropping PUSCH transmissions of smaller priority index that overlap with a PUCCH transmission with repetitions of larger priority index, prior to multiplexing uplink control information (UCI) in a PUSCH transmission of smaller priority index.

2. The UE of claim 1, wherein the processing circuitry further configures the UE to, in resolving overlapping PUCCHs and PUSCHs of different priority indexes, drop PUSCH transmissions of smaller priority index that overlap with a PUCCH transmission of larger priority index with positive scheduling request (SR), prior to multiplexing the UCI in the PUSCH transmission of smaller priority index.

3. The UE of claim 2, wherein when all PUSCH transmissions of smaller priority index that overlap with the PUCCH transmission of larger priority index with HARQ-ACK information also overlap with a PUCCH transmission of larger priority index with positive SR, the processing circuitry further configures the UE to drop the PUSCH transmissions of smaller priority index and transmit the PUCCH transmission of larger priority index with HARQ-ACK information.

4. The UE of claim 1, wherein the processing circuitry further configures the UE to resolve overlapping PUCCHs of different priority indexes by: first resolving overlapping PUCCH transmissions of different priority indexes where at least one PUCCH transmission is with repetitions, and then resolving overlapping PUCCH transmissions of different priority indexes without repetitions.

5. The UE of claim 4, wherein the processing circuitry further configures the UE to, in resolving of overlapping PUCCH transmissions where at least one PUCCH is with repetitions, resolve overlapping between a PUCCH transmission of smaller priority index without repetitions and a PUCCH transmission of larger priority index with repetitions before resolving overlapping PUCCH transmissions without repetitions.

6. The UE of claim 1, wherein the processing circuitry further configures the UE to, in resolving overlapping PUCCHs and PUSCHs of different priority indexes, when a PUCCH transmission with HARQ-ACK information of larger priority index overlaps with one or more PUSCH transmissions of smaller priority index, multiplex the HARQ-ACK information of larger priority index into a selected one of the one or more PUSCH transmissions of smaller priority index when timeline conditions for UCI multiplexing are satisfied.

7. The UE of claim 6, wherein the processing circuitry further configures the UE to select the PUSCH transmission of smaller priority index by:

selecting a PUSCH transmission that includes aperiodic Channel State Information (A-CSI) when available, otherwise, selecting from PUSCH transmissions scheduled by dynamic grant rather than configured grant when available, then otherwise, selecting a PUSCH transmission on a serving cell with a smallest serving cell index; and selecting an earliest PUSCH transmission among PUSCH transmissions on the serving cell with the smallest serving cell index.

8. The UE of claim 6, wherein the processing circuitry further configures the UE to not transmit a PUCCH transmission of larger priority index that carries a negative scheduling request (SR) when multiplexing the HARQ-ACK information of larger priority index into the selected PUSCH transmission of smaller priority index.

9. The UE of claim 6, wherein the PUSCH transmission of smaller priority index and the PUCCH transmission with HARQ-ACK information of larger priority index are in a same serving cell group comprising one or more uplink serving cells within a same frequency band.

10. The UE of claim 1, wherein the processing circuitry further configures the UE to, when configured to simultaneously transmit a PUCCH and a PUSCH with different priority indexes on different serving cells and the PUCCH and the PUSCH are not in a same serving cell group, transmit the PUCCH and the PUSCH simultaneously without applying a multiplexing resolution related to overlapping PUCCHs and PUSCHs.

11. The UE of claim 1, wherein the processing circuitry further configures the UE to, when a PUSCH transmission of smaller priority index overlaps with a first PUCCH transmission of larger priority index with HARQ-ACK information and a second PUCCH transmission of larger priority index with HARQ-ACK information, process the first PUCCH transmission of larger priority index and the second PUCCH transmission of larger priority index in time order, select the PUSCH transmission of smaller priority index to multiplex HARQ-ACK information from the first PUCCH transmission of larger priority index based on the first PUCCH transmission of larger priority index not overlapping another PUCCH transmission of larger priority index with HARQ-ACK information, and exclude the PUSCH transmission of smaller priority index from selection for the second PUCCH transmission of larger priority index after the PUSCH transmission of smaller priority index has been selected for the first PUCCH transmission of larger priority index.

12. A non-transitory computer-readable storage medium that stores instructions for execution by one or more processors of a user equipment (UE), the one or more processors to configure the UE to, when the instructions are executed:

receive, from a 5th generation NodeB (gNB), an indication to multiplex uplink transmissions with different priority indexes;

receive a first resource for a first physical uplink control channel (PUCCH) of a larger priority index and a second resource for at least one of a second PUCCH or a physical uplink shared channel (PUSCH) of a smaller priority index;

determine that the second resource overlaps in time with the first resource; and after a determination that the second resource overlaps with the first resource, resolve overlap of the first resource and the second resource by:

first, resolving overlapping uplink channels of a same priority index;

second, resolving overlapping PUCCHs of different priority indexes; and third, resolving overlapping PUCCHs and PUSCHs of different priority indexes by dropping PUSCH transmissions of smaller priority index that overlap with a PUCCH transmission with repetitions of larger priority index, prior to multiplexing uplink control information (UCI) in a PUSCH transmission of smaller priority index.

13. The non-transitory computer-readable storage medium of claim 12, wherein the one or more processors, when the instructions are executed, configure the UE to, in resolving overlapping PUCCHs and PUSCHs of different priority indexes, drop PUSCH transmissions of smaller priority index that overlap with a PUCCH transmission of larger priority index with positive scheduling request (SR), prior to multiplexing the UCI in the PUSCH transmission of smaller priority index.

14. The non-transitory computer-readable storage medium of claim 13, wherein when all PUSCH transmissions of smaller priority index that overlap with the PUCCH transmission of larger priority index with HARQ-ACK information also overlap with a PUCCH transmission of larger priority index with positive SR, the one or more processors, when the instructions are executed, configure the UE to drop the PUSCH transmissions of smaller priority index and transmit the PUCCH transmission of larger priority index with HARQ-ACK information.

15. The non-transitory computer-readable storage medium of claim 12, wherein the one or more processors, when the instructions are executed, configure the UE to resolve overlapping PUCCHs of different priority indexes by: first resolving overlapping PUCCH transmissions of different priority indexes where at least one PUCCH transmission is with repetitions, and then resolving overlapping PUCCH transmissions of different priority indexes without repetitions.

16. The non-transitory computer-readable storage medium of claim 15, wherein the one or more processors, when the instructions are executed, configure the UE to, in resolving of overlapping PUCCH transmissions where at least one PUCCH is with repetitions, resolve overlapping between a PUCCH transmission of smaller priority index without repetitions and a PUCCH transmission of larger priority index with repetitions before resolving overlapping PUCCH transmissions without repetitions.

17. The non-transitory computer-readable storage medium of claim 12, wherein the one or more processors, when the instructions are executed, configure the UE to, in resolving overlapping PUCCHs and PUSCHs of different priority indexes, when a PUCCH transmission with HARQ-ACK information of larger priority index overlaps with one or more PUSCH transmissions of smaller priority index, multiplex the HARQ-ACK information of larger priority index into a selected one of the one or more PUSCH transmissions of smaller priority index when timeline conditions for UCI multiplexing are satisfied.

18. The non-transitory computer-readable storage medium of claim 17, wherein the one or more processors, when the instructions are executed, configure the UE to select the PUSCH transmission of smaller priority index by:

selecting a PUSCH transmission that includes aperiodic Channel State Information (A-CSI) when available, otherwise, selecting from PUSCH transmissions scheduled by dynamic grant rather than configured grant when available, then otherwise, selecting a PUSCH transmission on a serving cell with a smallest serving cell index; and selecting an earliest PUSCH transmission among PUSCH transmissions on the serving cell with the smallest serving cell index.

19. The non-transitory computer-readable storage medium of claim 17, wherein the one or more processors, when the instructions are executed, configure the UE to not transmit a PUCCH transmission of larger priority index that carries a negative scheduling request (SR) when multiplexing the HARQ-ACK information of larger priority index into the selected PUSCH transmission of smaller priority index.

20. The non-transitory computer-readable storage medium of claim 12, wherein the one or more processors, when the instructions are executed, configure the UE to, when configured to simultaneously transmit a PUCCH and a PUSCH with different priority indexes on different serving cells and the PUCCH and the PUSCH are not in a same serving cell group, transmit the PUCCH and the PUSCH simultaneously without applying a multiplexing resolution related to overlapping PUCCHs and PUSCHs.

* * * * *